US012036571B2

(12) United States Patent
Maas et al.

(10) Patent No.: US 12,036,571 B2
(45) Date of Patent: Jul. 16, 2024

(54) METERED AND ACTIVE SPRAYER DEVICES WITH AEROSOL FUNCTIONALITY—FLAIROSOL II

(71) Applicant: Dispensing Technologies B.V., Helmond (NL)

(72) Inventors: Wilhelmus Johannes Joseph Maas, Someren (NL); Petrus Lambertus Wilhelmus Hurkmans, Someren (NL); Paulo Nervo, Duizel (NL); Aaron S. Haleva, Oakhurst, NJ (US)

(73) Assignee: Dispensing Technologies B.V., Helmond (NL)

(*) Notice: Subject to any disclaimer, the term of this patent is extended or adjusted under 35 U.S.C. 154(b) by 0 days.

(21) Appl. No.: 17/508,038

(22) Filed: Oct. 22, 2021

(65) Prior Publication Data

US 2022/0184648 A1 Jun. 16, 2022

Related U.S. Application Data

(60) Continuation of application No. 16/744,618, filed on Jan. 16, 2020, now Pat. No. 11,154,886, which is a (Continued)

(51) Int. Cl.
*B05B 9/08* (2006.01)
*B05B 11/00* (2023.01)
(Continued)

(52) U.S. Cl.
CPC .......... *B05B 9/0822* (2013.01); *B05B 9/0883* (2013.01); *B05B 11/00446* (2018.08); (Continued)

(58) Field of Classification Search
CPC ................ B05B 9/0822; B05B 9/0883; B05B 11/00446; B05B 11/1001; B05B 11/1047; (Continued)

(56) References Cited

U.S. PATENT DOCUMENTS 3,779,464 A 12/1973 Malone
3,940,029 A 2/1976 Horvath
(Continued)

FOREIGN PATENT DOCUMENTS

EP 0011394 A1 5/1980
EP 0034246 A2 8/1981
(Continued)

*Primary Examiner* — Vishal Pancholi

(57) ABSTRACT

Dispensing devices are provided. Such devices utilize a combination of Flair® technology, pre-compression valves and aerosol-like pressurization of the dispensed liquid. An example dispensing device has, for example, a main body comprising a pressure chamber, the latter being provided with a pressure piston and a pressure spring. The device further has a piston and a piston chamber which draws liquid from a container and fills the pressure chamber with that liquid as a user operates a trigger in various compression and release strokes. The piston chamber has both an inlet valve and an outlet valve. Liquid exiting the piston chamber under pressure enters a central vertical channel which is in fluid communication with both the pressure chamber and a dome valve, with pre-defined opening pressure, provided near the outlet channel at the top of the dispensing head.

14 Claims, 70 Drawing Sheets

Related U.S. Application Data continuation of application No. 15/426,758, filed on Feb. 7, 2017, now Pat. No. 10,537,906, which is a division of application No. 13/623,860, filed on Sep. 20, 2012, now Pat. No. 9,714,133.

(60) Provisional application No. 61/626,067, filed on Sep. 20, 2011.

(51) Int. Cl.

| | |
|---|---|
| ***B05B 11/10*** | (2023.01) |
| ***B65D 83/62*** | (2006.01) |
| *B05B 11/02* | (2023.01) |
| *B65D 83/70* | (2006.01) |

(52) U.S. Cl.

CPC ....... *B05B 11/1001* (2023.01); *B05B 11/1011* (2023.01); *B05B 11/1047* (2023.01); *B05B 11/1056* (2023.01); *B05B 11/1059* (2023.01); *B65D 83/62* (2013.01); *B05B 11/0064* (2013.01); *B05B 11/0075* (2013.01); *B05B 11/026* (2023.01); *B05B 11/1039* (2023.01); *B05B 11/104* (2023.01); *B65D 83/70* (2013.01)

(58) Field of Classification Search

CPC ............ B05B 11/1056; B05B 11/1059; B05B 11/0064; B05B 11/0075; B05B 11/026; B05B 11/1039; B05B 11/104; B05B 11/1077; B05B 11/1057; B65D 83/62; B65D 83/70

See application file for complete search history.

(56) References Cited

U.S. PATENT DOCUMENTS

| | | | |
|---|---|---|---|
| 4,155,485 | A | 5/1979 | Spatz |
| 5,031,798 | A | 7/1991 | Wild |
| 5,437,398 | A | 8/1995 | Ritsche |
| 7,938,298 | B2 | 5/2011 | Lee |
| 2002/0008164 | A1 | 1/2002 | Yanagida |
| 2002/0108970 | A1 | 8/2002 | Shanklin et al. |
| 2008/0230563 | A1 | 9/2008 | Maas et al. |
| 2009/0020565 | A1 | 1/2009 | Nicolle et al. |

FOREIGN PATENT DOCUMENTS

| | | | |
|---|---|---|---|
| JP | H01-299660 | A | 12/1989 |
| JP | H2-121160 | A | 5/1990 |
| JP | H04-282084 | A | 10/1992 |
| JP | H0975798 | A | 3/1997 |
| JP | H10-137642 | A | 5/1998 |
| JP | 2002-035655 | A | 2/2002 |
| JP | 2009-000516 | A | 1/2009 |
| WO | 9953388 | A1 | 10/1999 |
| WO | 2009096777 | A1 | 8/2009 |

FIG. 2C
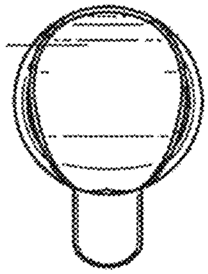
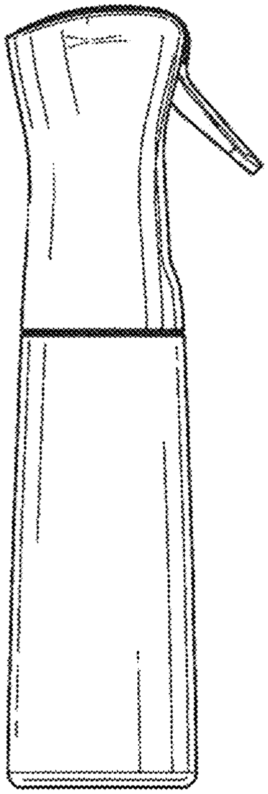
FIG. 2B
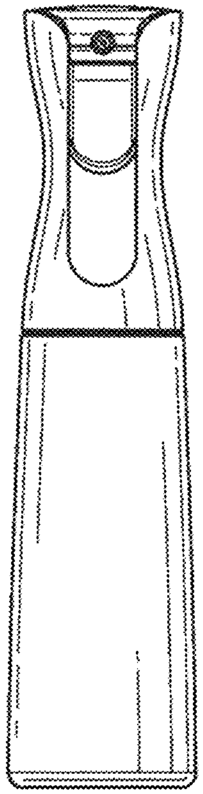
FIG. 2A

Can have dip tube for refillable and canbe without dip tube for non-refillable embodiments Preparing For Use User pulls the ring of the Trigger Lock to move the trigger forward.

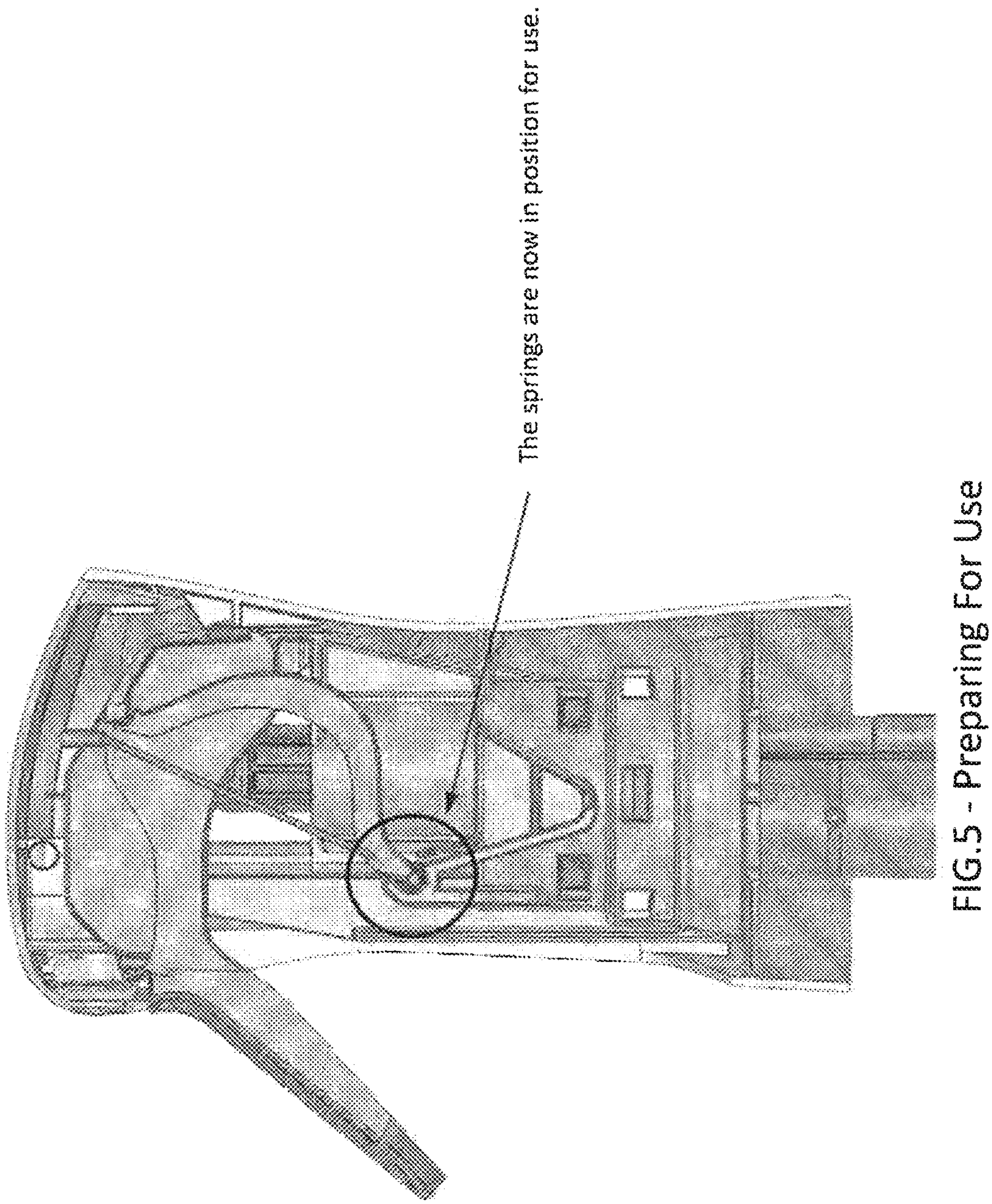
FIG.5 - Preparing For Use

Trigger is released and moves out.

1 Piston moves up and sucks liquid into the piston chamber

2 Outlet valve is closed (underpressure moves it upwards into closed position).

3 Inlet valve opens to let the liquid pass to the piston chamber. (underpressure moves it upwards into open position)

Trigger is pulled and moves in.

5. The dome valve will open because of the liquid pressure. The liquid passes towards the orifice creating the desired spray.

The trigger is released and moves out.

Liquid overflow

Dome valve closing

1 The dome valve will close when the pressure is too low. The tension of the dome will make it close at a preset pressure value and it then closes very suddenly.

This ensures a good spray pattern from start to finish and prevents dripping.

Fig. 14 – Exemplary Parts

| # | Description | Part number |
|---|---|---|
| 1 | Frame | 991-1004401 |
| 2 | Valve Housing | 991-1004402 |
| 3 | Reservoir | 991-1004403 |
| 4 | Reservoir Piston | 991-1004404 |
| 5 | Reservoir Piston Seal | 991-1004405 |
| 6 | Reservoir Spring Lock | 991-1004406 |
| 7 | Dome Valve | 991-1004407 |
| 8 | Dome Fixer - Orifice | 991-1004408 |
| 9 | Piston | 991-0901002 |
| 10 | Trigger | 991-1004409 |
| 11 | Trigger Lock | 991-1004410 |
| 12 | Shroud Metered | 991-1004411 |
| 13 | Shroud Top Metered | 991-1004412 |
| 14 | Valve (2x) | 991-1004450 |
| 15 | Tube 3,75 x 2,75 | 991-1004451 |
| 16 | Spring 47N | 991-1004452 |

Frame Views

Valve Housing Views

Assemble reservoir piston and reservoir piston seal

Lubricate the seal diameter with, e.g., silicone lubricant

Lubricate the seal diameter

Assemble reservoir piston assembly into reservoir

Insert Spring

Compress Spring

Spinweld Reservoir
Spring Lock to Reservoir

Insert first valve

Assemble Valve housing

Add second Valve

Assemble Frame

Lubricate the piston bore

Lubricate the seals of the piston

Insert the Piston

Assemble Trigger

Make connection to the piston by pulling the trigger

Make sure the trigger springs are in place and the trigger is connected to the piston Seal 1 = only under pressure
Seals 2 to 5 = maximum pressure of , for example, 10 bar Insert the dome valve Assemble the Dome fixer - Orifice Placement Of The Trigger And Trigger Lock Placement Of The Trigger And Trigger Lock Placement Of The Spring 4. Place the springs of the trigger in the correct position, which is on the horizontal rib of the frame

Placement Of The Spring

6. Put the opening of the strings are attached to the springs over the pins. Fixation can be done by welding Placement Of The Shrouds 6. Place the shrouds Place Shroud Top Place Shroud Flairosol with dip tube for refill purposes and without dip tube for non-refill.

Trigger Unlocked.

1a The trigger lock is removed by pulling

1b. The trigger lock pulls the springs of the trigger into position as the trigger lock is removed Trigger is released and moves out.

The trigger is pulled and moves in.

Trigger is pulled and moves in.

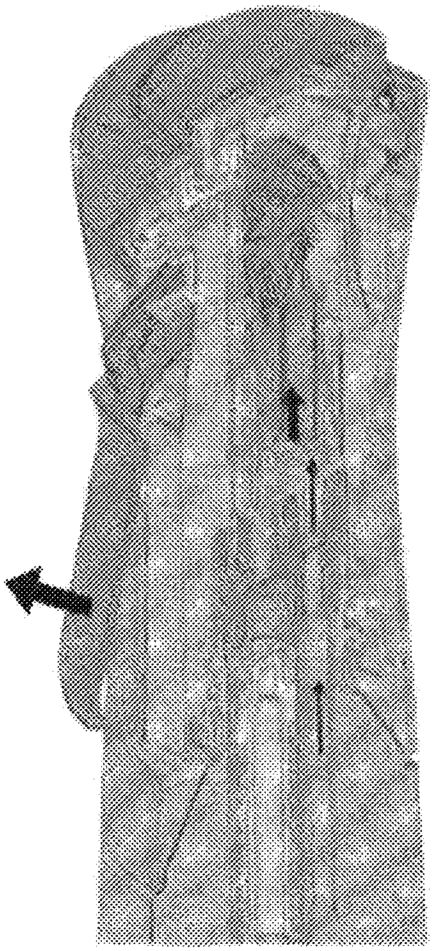
1
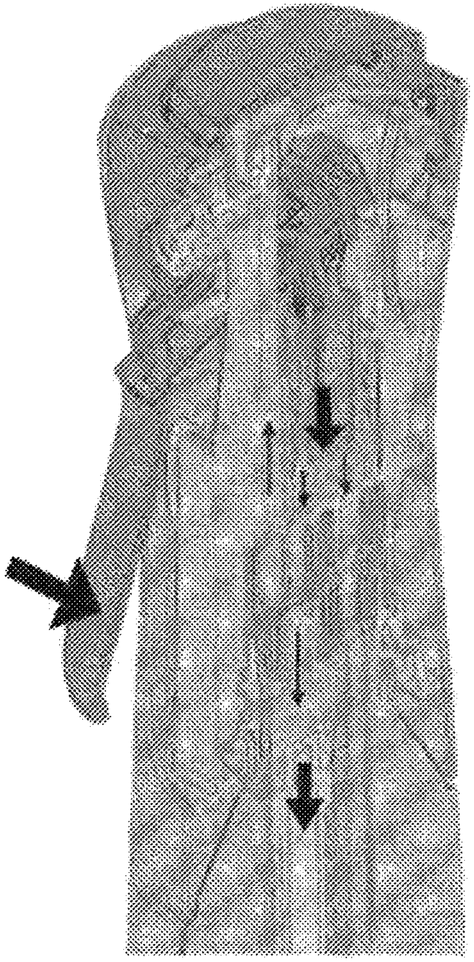
2
The following two steps are repeated 4 times to fill up the pressure chamber in order to get a spray for X seconds
1 The trigger is pulled.
2 The trigger is released.
FIG.53

Liquid overflow

Dome valve closing.

Dome valve opening.

Exemplary Parts

| # | Description | Part number |
|---|---|---|
| 1 | Frame | 991-1004401 |
| 2 | Valve Housing | 991-1004402 |
| 3 | Reservoir Activated | 991-1004415 |
| 4 | Reservoir Piston | 991-1004404 |
| 5 | Reservoir Piston Seal | 991-1004405 |
| 6 | Reservoir Spring Lock | 991-1004406 |
| 7 | Dome Valve | 991-1004407 |
| 8 | Dome Fixer - Orifice | 991-1004408 |
| 9 | Piston | 991-0901002 |
| 10 | Trigger | 991-1004409 |
| 11 | Trigger Lock | 991-1004410 |
| 12 | Shroud Metered | 991-1004411 |
| 13 | Shroud Top Activated | 991-1004414 |
| 14 | Valve (2x) | 991-1004450 |
| 15 | Tube 3.75 x 2.75 | 991-1004451 |
| 16 | Spring 47N | 991-1004452 |
| 17 | Dome Lock | 991-1004413 |

METERED AND ACTIVE SPRAYER DEVICES WITH AEROSOL FUNCTIONALITY—FLAIROSOL II

CROSS REFERENCE TO RELATED APPLICATIONS

This application is a continuation of U.S. application Ser. No. 16/744,618, filed Jan. 16, 2020, now U.S. Pat. No. 11,154,886, issued Oct. 26, 2021, which is a continuation of U.S. application Ser. No. 15/426,758, filed Feb. 7, 2017, now U.S. Pat. No. 10,537,906, issued Jan. 21, 2020, which is a divisional of U.S. application Ser. No. 13/623,860, filed Sep. 20, 2012, now U.S. Pat. No. 9,714,133, issued on Jul. 25, 2017, which claims priority to U.S. Provisional Application No. 61/626,067, filed Sep. 20, 2011, the complete disclosures of each of which are hereby fully incorporated herein by reference.

TECHNICAL FIELD

The present invention relates to dispensing technologies, and In particular to a sprayer device that can place liquids under pressure and dispense them in a manner equivalent to that of an aerosol device or can, and can do so in either (i) a continuous spray manner or (ii) a user actuated manner.

BACKGROUND OF THE INVENTION

Liquid dispensing devices such as spray bottles are well known. Some offer pre-compression so as to insure a strong spray when the trigger is pulled and prevent leakage. Sprayers can be easily manufactured and filled, and are often used to dispense cleaners of all types, for example. However, in many circumstances it is preferred not to have to continually pump a dispensing device to push out the dispensed liquid. Thus, aerosols are also well known. Aerosols hold a liquid or other dispensate under pressure such that when a user activates the device (e.g., by pressing a button), the pressurized contents are allowed to escape. However, aerosols present both significant environmental hazards as well as packaging drawbacks, which result from the necessity of using an aerosol propellant in them, and the further necessity of pressurizing them. This requires filling such devices under pressure, using packaging strong enough to withstand the pressure, and taking steps to insure that the propellant maintains a uniform pressure over the life of the can or container. Such conditions often require use of non-environmentally friendly materials and ingredients.

To overcome these drawbacks, what Is needed In the art is a spray device that can provide aerosol type functionality without the numerous drawbacks of actual aerosols.

SUMMARY OF THE INVENTION

In exemplary embodiments of the present invention, “Flairosol” dispensing devices can be provided. Such devices utilize a combination of Flair® technology, pre-compression valves and aerosol-like pressurization of the dispensed liquid. Such a dispensing device has, for example, a main body comprising a pressure chamber, the latter being provided with a pressure piston and a pressure spring. The device further has a piston and a piston chamber which draws liquid from a container, for example, the inner container of a Flair® bottle, and fills the pressure chamber with that liquid as a user operates a trigger in various compression and release strokes. The piston chamber has both an inlet valve and an outlet valve, which serve to prevent backflow. Liquid exiting the piston chamber under pressure (supplied by a user’s pumping the trigger) enters a central vertical channel which is in fluid communication with both the pressure chamber (above the pressure piston) and a dome valve provided near the outlet channel at the top of the dispensing head. The dome valve has a preset pressure, that once exceeded by the liquid, opens and allows for a spray. If the liquid pressure drops below such preset pressure the dome valve closes off the outlet channel, which serves to regulate the strength of the flow and preclude leakage.

By repeatedly pumping the trigger so as to keep a certain volume of liquid in the pressure chamber, a continuous spray can be achieved. By designing the input volume to be amply greater than the volume of the pressure chamber, continuous spray with fewer pumping strokes can be implemented, or by doing the reverse, a larger number of easily implemented pumping strokes can be used to implement such continuous spray. Or, for example, in an activated version, the liquid can be stored in a larger pressure chamber under pressure, and then dispensed by a user holding open a dome lock thus allowing the dome valve to open, assuming sufficient pressure has been reached. Such activation can occur by pressing on an activation button, and spray can be abruptly stopped by a user ceasing to push on such button, allowing the dome lock to force the dome valve once again closed.

BRIEF DESCRIPTION OF DRAWINGS

It is noted that the U.S. patent or application file contains at least one drawing executed in color. Copies of this patent or patent application publication with color drawings will be provided by the U.S. Patent Office upon request and payment of the necessary fee.

FIGS. 2A, 2B, and 2C depict front, side, and top views of the exemplary Flairosol device of FIG. 1;

FIG. 5 depicts the exemplary device of FIG. 4 with the trigger unlocked and the trigger springs being pulled into their final position, ready for use;

FIGS. 31A-44B illustrate an exemplary assembly procedure for an exemplary metered Flairosol device according to exemplary embodiments of the present invention; these figures refer to the various example parts shown in FIG. 14;

FIGS. 31A through 31D illustrate, respectively, assembly of the reservoir and reservoir piston seal, lubrication of the seal inner diameter, lubrication of the sealed diameter in the reservoir, and assembly of the piston assembly into the reservoir:

FIG. 36 illustrates the various seals operative according to exemplary embodiments of the present invention;

FIG. 38 illustrates how the dip tube can be affixed according to exemplary embodiments of the present invention;

FIGS. 39A-44B illustrate remaining assembly steps for the trigger and the shroud according to exemplary embodiments of the present invention;

FIGS. 39A and 39B illustrate, respectively, hooking the trigger lock under the trigger and pressing it into place:

FIG. 44B shows the device after placement of the shroud top;

FIG. 53 illustrates repeating the steps of pulling and releasing the trigger ta build up sufficient pressure for an X second spray (once the dome valve is unlocked) according to exemplary embodiments of the present invention:

FIGS. 58-60B illustrate steps in an exemplary assembly procedure tor an exemplary activated Flairosol device that differ from those provided above in FIGS. 31A-44 in connection with assembly of the metered Flairosol device according to exemplary embodiments of the present invention;

FIG. 58 depicts a point in assembly where the assembly procedures are different from that of the metered Flairosol, as described above;

FIGS. 60A and 60B respectively illustrate placement of the shroud top, and finally the Flairosol dispensing head attached to the bottle;

DETAILED DESCRIPTION OF THE INVENTION

Figure 1:
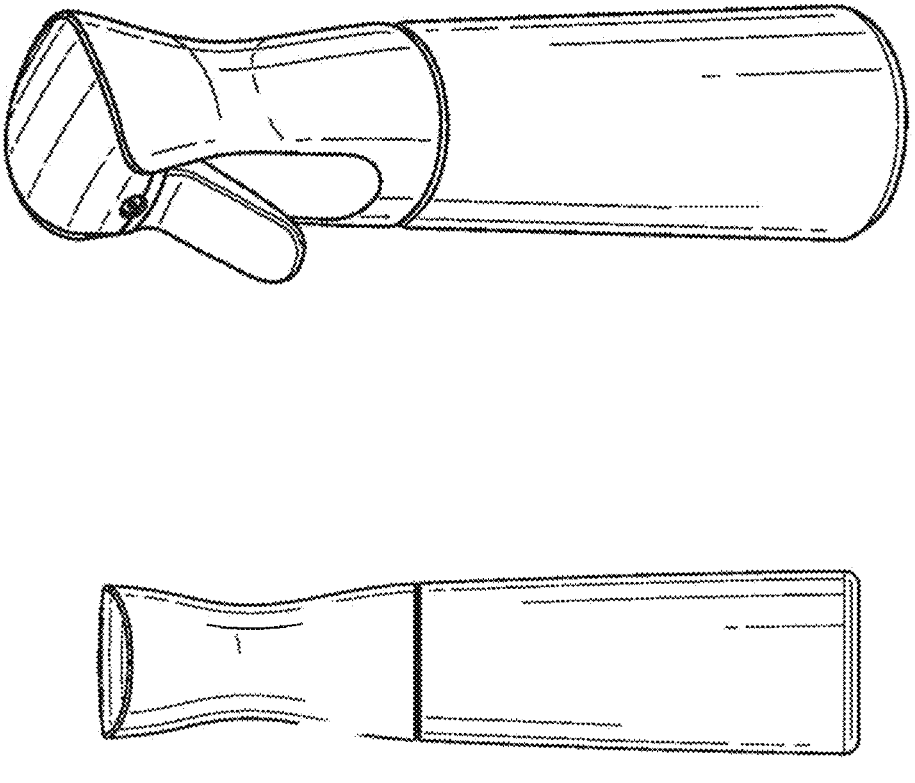
FIG. 1 depicts perspective and rear views of an exemplary metered Flairosol device according to an exemplary embodiment of the present invention.

In exemplary embodiments of the present invention, a liquid spraying device offers the benefits of both a liquid sprayer and an aerosol device. Such an exemplary device is referred to herein as a “Flairosol” device, given that it uses the “bag within a bag” Flair® technology developed and provided by Dispensing Technologies B.V. of Helmond, The Netherlands, and combines that technology with means to internally pressurize the liquid prior to spraying so as to emulate aerosol devices.

It is noted that the functionalities described herein could, for example, be implemented without Flair® “bag within a bag” technology, and thus exemplary embodiments of the present invention are not strictly limited thereto. However, such a non-Flair® technology implementation would be more expensive and more cumbersome to produce and use. The “bag within a bag” Flair® technology, which causes the inner container to shrink around the pressure chamber and input tube, and thus obviates headspace in the inner container, obviates the need for a full length dip tube, and also obviates the need to attach the liquid container at the bottom of the unit to prevent crimping and failure to dispense the full contents. Because in Flair® technology the pressure applied to the inner bag results from a displacing medium that is provided between the inner container and the outer container (for example, air), direct venting of the liquid container is not required.

In exemplary embodiments of the present invention, a dispensing device can be provided with an internal pressure chamber. The liquid to be dispensed can be caused to fill the pressure chamber and, as it is tilled, push against a pressure piston that is supported by pressure spring that is provided in the pressure chamber. Thus, when a user pumps liquid into the pressure chamber, this liquid pushes on the pressure piston, which loads (compresses) the pressure spring, which puts the liquid in the pressure chamber under pressure in a manner similar to the pressurized contents of an aerosol can. In exemplary embodiments of the present invention, such a pressure spring can be a spring in the broadest sense, and thus can be any resilient device which can store potential energy, including, for example, an air or gas shock absorber or spring, a spring of various compositions and materials, and the like. In some exemplary embodiments of the present invention, such pressure in the pressure chamber can, few example, reach approximately 3-5 bar. In other embodiments it can be 10-20 bar, for example, and in still others, 500-800 milibar, for example. It all depends upon the liquid dispensed, its viscosity, the fineness of spray desired, etc. Further details of the pressure chamber, the pressure spring and its motion are described below.

In an activated Flairosol embodiment, once the liquid is pressurized in the pressure chamber, a user can release an outlet valve and the liquid will spray out. In exemplary embodiments of the present invention, a central channel can be provided above the pressure chamber, and be in fluid communication with both the pressure chamber and an upper outlet valve (dome valve) leading ultimately to a spray nozzle. Because the outlet valve has a minimum “deforming pressure,” a certain minimum pressure is required before any liquid can be sprayed, thus providing the consistency of spray and non-leakage features of a pre-compression system. The minimum deforming pressure can, in various exemplary embodiments, be varied by thickness, shape, composition and strength of the valve. In some exemplary embodiments of the present invention, the minimum deforming pressure can be low, for example, ½ bar, for a system where the pressure spring varies between 3-5 bar as a function of its minimum and maximum compressions within the pressure chamber, for example. Thus, in such embodiments, while the pressure spring actually controls the outlet pressure of the liquid, once the user releases the activation button, or the pressure chamber is emptied, the upper outlet valve helps bring a “hard stop” to the fluid flow, thus preventing dripping or leaking at the end of a spray.

Details of the invention are next described in connection with FIGS. 1A through 70, in which FIGS. 1A-44B depict a “metered” Flairosol variant where a user can cause a continuous spray to be provided by repeated pumping of a trigger, and where FIGS. 45-60B depict a second “activated” Flairosol variant, where a spray is only provided if a user activates the device, such as, for example, by pressing a button provided on top of a shroud or cover of the dispensing device. In either variant, Flairosol involves the combination of one or more pre-compression valve members, a Flair®, bottle (inner container and outer container with displacing medium between them) and a pressure chamber and pressure piston and pressure spring, that can store mechanical energy in a resilient or spring device. Finally, in FIGS. 61A-70, a “liquid seal” variant exemplary embodiment is provided, which involves isolation of the pressure chamber and the bottle from the spring or other resilient device used to pressurize said pressure chamber. The liquid seal variation can be implemented with either the metered or the activated embodiments of Flairosol.

A. Metered Flairosol

FIG. 1 depict perspective and rear views of an exemplary metered Flairosol device according to an exemplary embodiment of the present invention. It is noted that the term “metered” refers to the dispensing of a defined amount of liquid. FIGS. 2A, 2B and 2C respectively depict a front view. side view, and top view of the exemplary Flairosol device of FIG. 1.

Figure 3C:
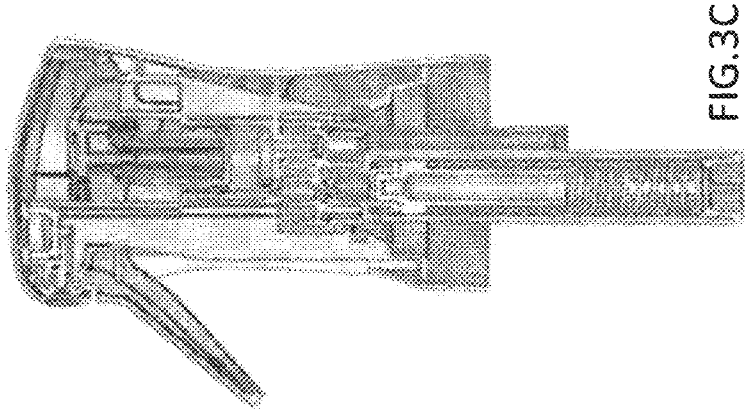
FIGS. 3B and 3C depict schematic cross-sectional views of the exemplary Flairosol dispensing head of FIG. 3A by itself, with and without a dip tube.
Figure 3B:
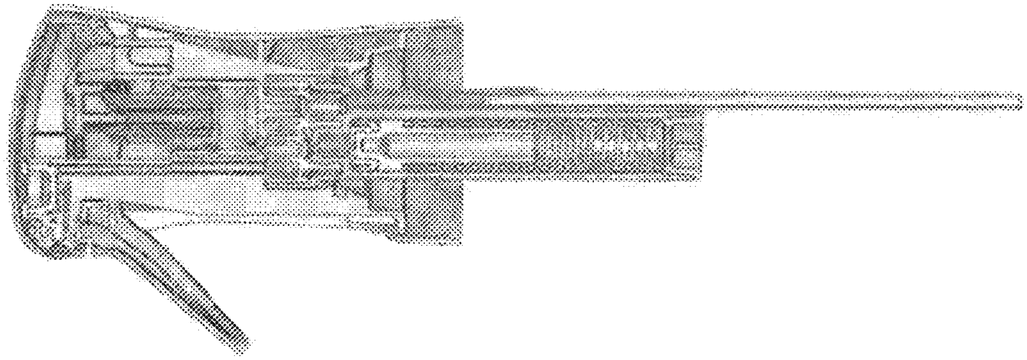
Figure 3A:
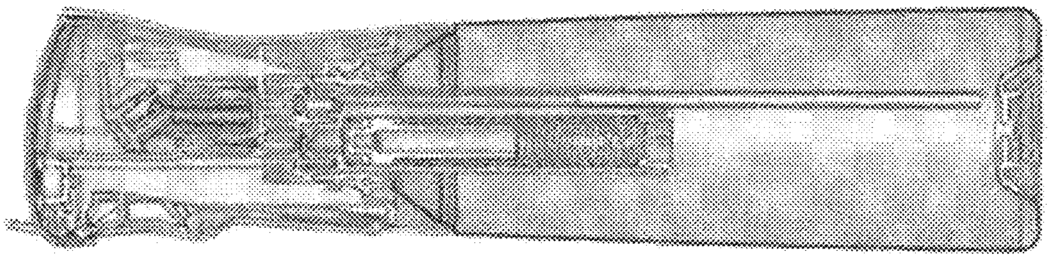
FIG. 3A depicts a schematic cross-sectional view of an exemplary Flairosol dispensing head as attached to a bottle and with the trigger lock attached according to an exemplary embodiment of the present invention.

FIG. 3A depicts a schematic cross-sectional view of an exemplary Flairosol dispensing head as attached to a bottle, with a trigger lock in place. FIGS. 3B and 3C depict schematic cross-sectional views of the exemplary Flairosol dispensing head by itself, with and without a dip tube. FIG. 3B illustrates the exemplary Flairosol dispensing head by itself with the trigger lock having been removed as described below, and FIG. 3C shows the exemplary device without a dip tube according to an exemplary embodiment of the present invention. It is noted that the dip tube is commonly used for refillable embodiments of the device and where an exemplary device is not refilled, there is no need for a dip tube.

Figure 4B:
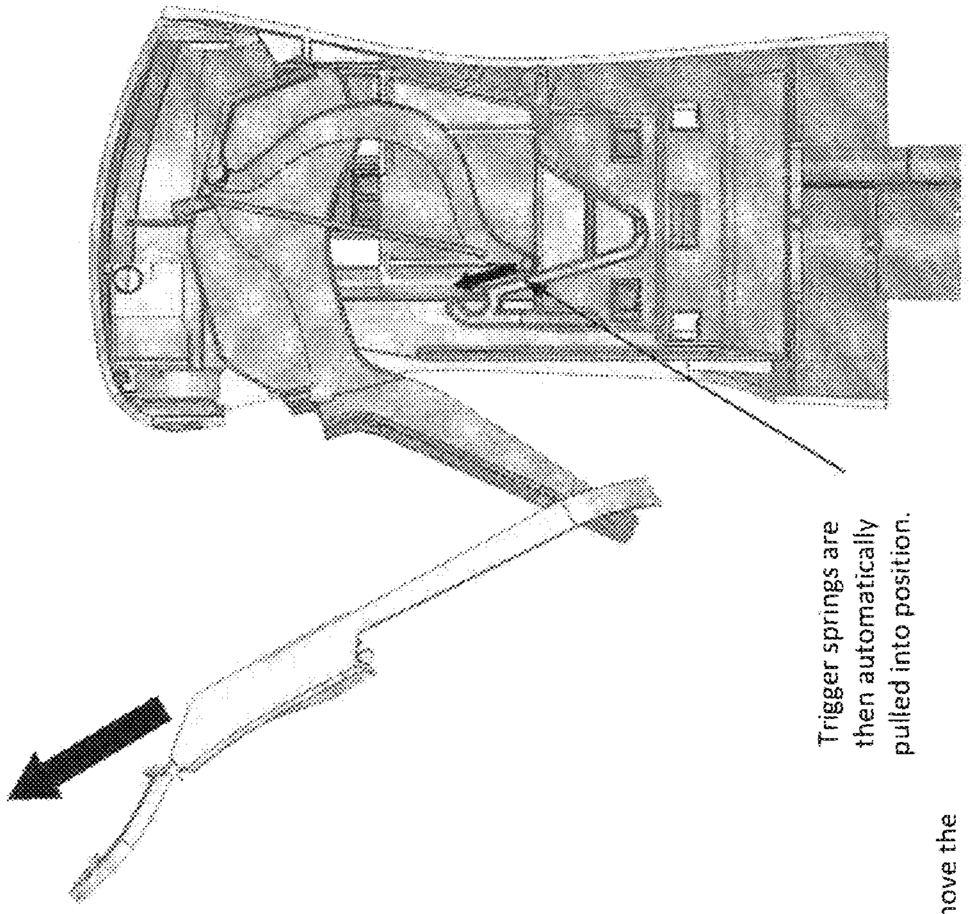
FIGS. 4A and 4B depict cut-away views of the exemplary Flairosol dispensing device of FIGS. 3A-3C in successive stages as a user removes the trigger lock.
Figure 4A:
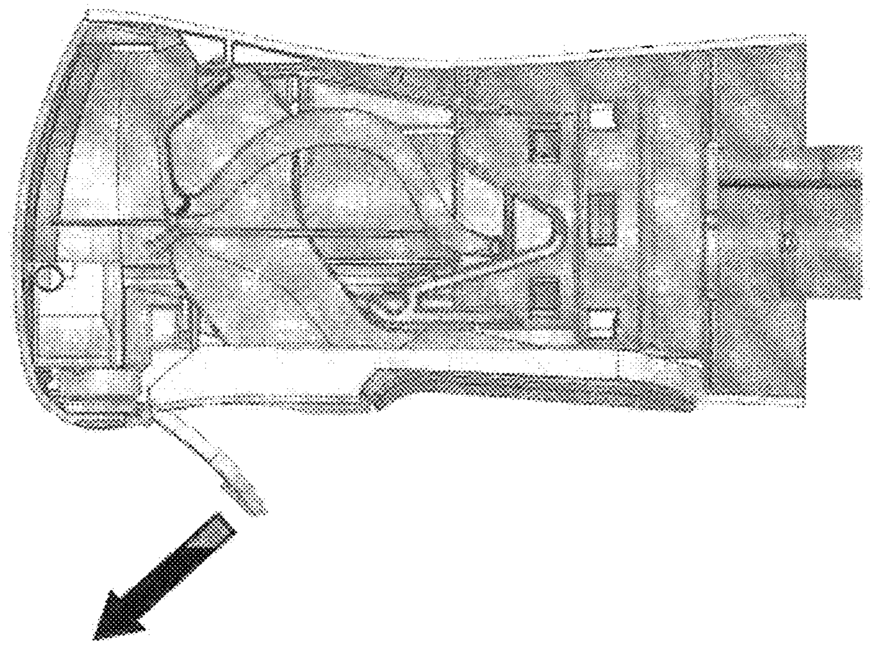

FIGS. 4A and 48 illustrate the process of removing the trigger lock to facilitate the trigger mobility according to exemplary embodiments of the present invention. It is noted that the device is generally shipped with a trigger lock, in place and filled with a liquid so that the function of a trigger lock is to prevent the trigger from becoming loose and somehow being pushed so that liquid sprays out in shipment or on a shelf.

In FIG. 4A, the user pulls a ring of the trigger lock to begin to remove it and, as shown in FIG. 4B, once the trigger lock is pulled away, the trigger springs move from their resting place, as shown in FIG. 4A to their final position as shown in FIG. 5. In such final position, as shown in FIG. 5, the trigger springs now fully tension the trigger so that when one pulls on it, it will be biased towards moving up and outwards again.

Figure 6:
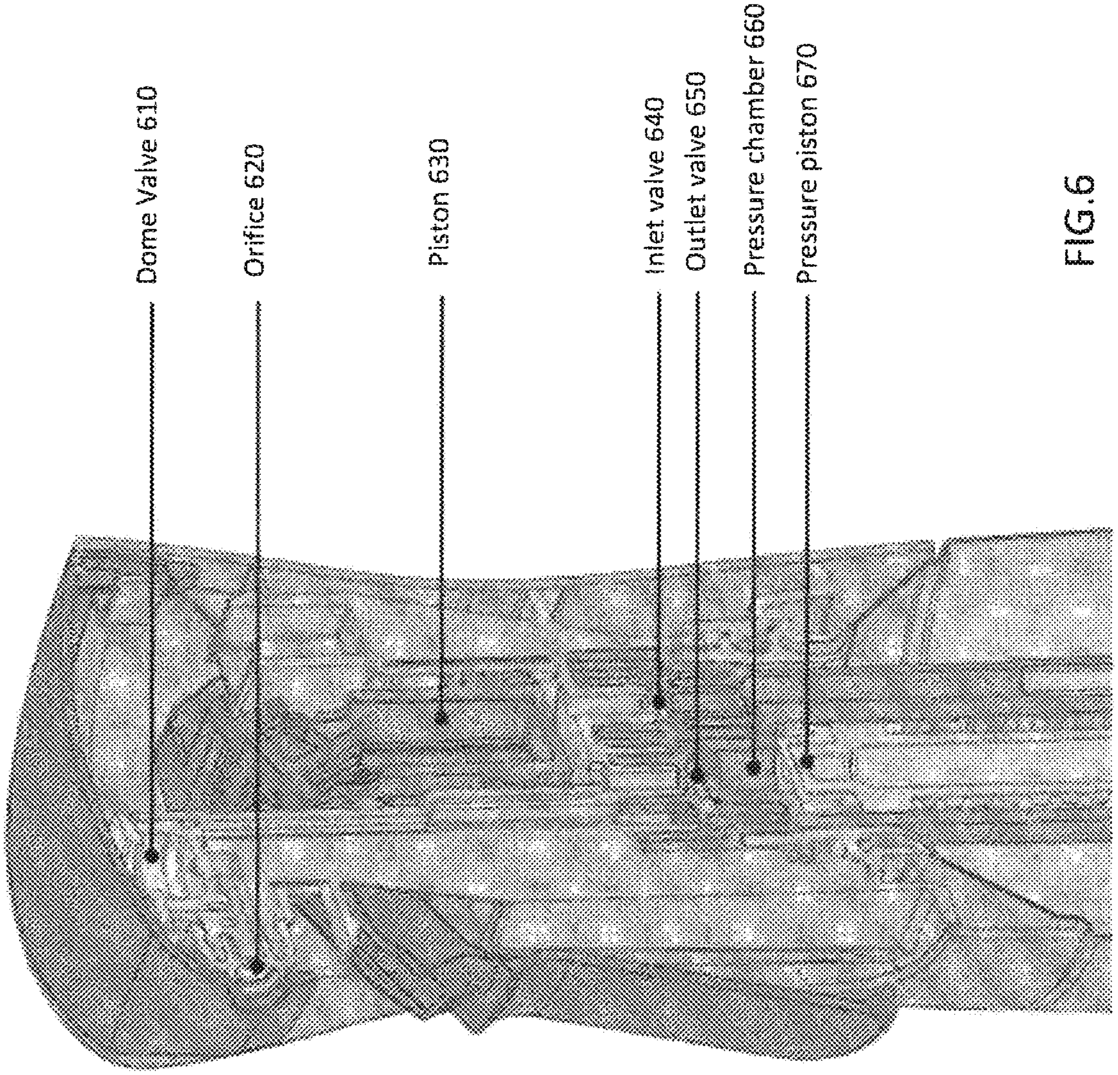
FIG. 6 depicts detail of various elements of the exemplary device of FIGS. 4A and 4B according to exemplary embodiments of the present invention.

FIG. 6 depicts various elements of the exemplary Flairosol device of FIGS. 4A. and 4B, including a dome valve 610 provided at the top of the device. This dome valve is what controls whether there is an outlet spray or not. The dome valve 610 has a defined pressure; when the pressure of the liquid exceeds such defined pressure, the dome valve opens and a spray results. When the pressure falls below the defined pressure of dome valve 610, the dome valve closes, thereby insuring that only properly pressurized liquids can proceed to the outlet, thus insuring a continuity of spray. This is a form of pre-compression, using the dome valve 610 as a pre-compression valve. There is also seen the orifice 620 from which the liquid flow is emitted, and a piston 630 provided in a piston chamber wherein liquid is up taken from the bottle and later transmitted to either orifice 620 or the pressure chamber 660. As shown, there is an inlet vale 640 which controls liquid uptake into the piston chamber. Outlet valve 650 controls liquid being pushed to pressure chamber 660 in a downstroke of the piston and pushed against pressure piston 670. In said downstroke, liquid is also allowed to move upwards toward dome valve 610 for spraying.

Figure 7A:
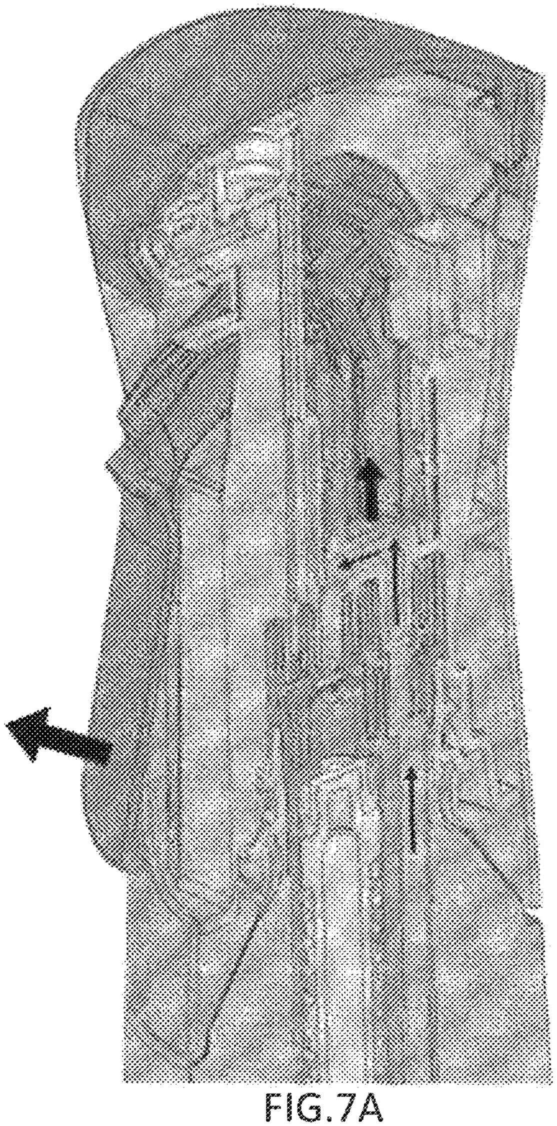
FIGS. 7A and 7B illustrate full and magnified views, respectively, of a trigger release and fluid intake step of an exemplary Flairosol device according to exemplary embodiments of the present invention.
Figure 7B:
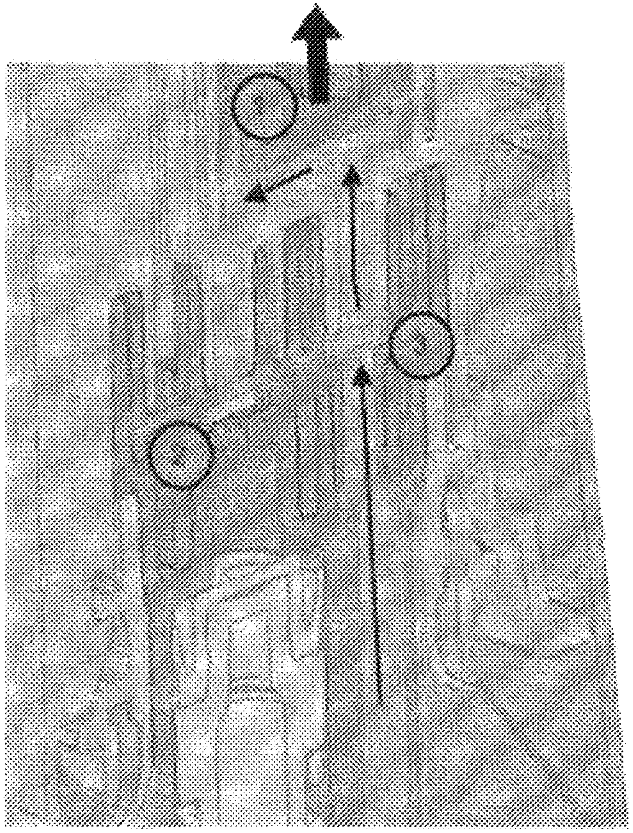

FIGS. 7A and 7B illustrate what happens in a trigger release and fluid intake step of an exemplary Flairosol device. As shown therein, at 1 initially the piston moves up and draws liquid into the piston chamber. Next, at 2 the outlet valve is closed (the underpressure moves it upwards into a closed position), and at 3, the inlet valve opens to let liquid pass to the piston chamber (the underpressure moves that valve upwards into its open position).

Figure 8B:
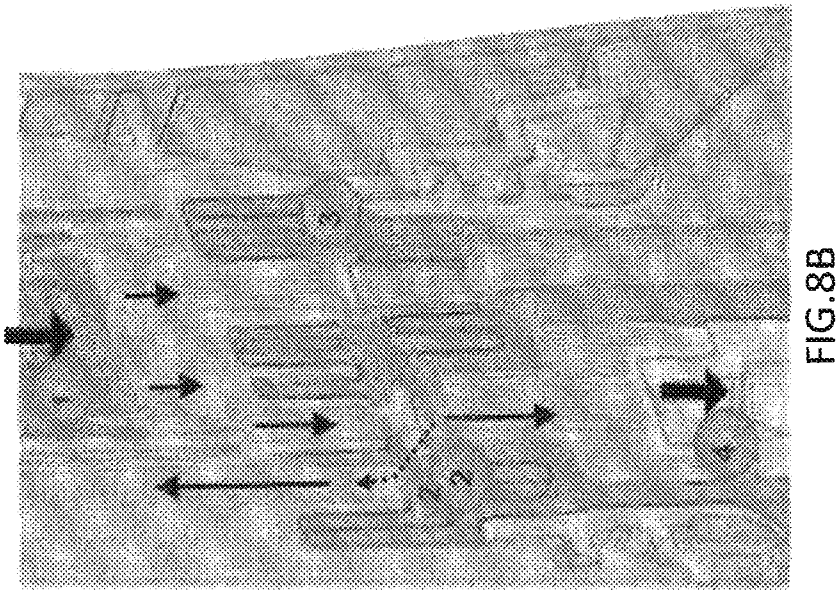
FIGS. 8A and 8B illustrate corresponding views to those of the exemplary Flairosol device of FIGS. 7A and 7B where the trigger is pulled, the liquid passes to the pressure chamber and towards a dome valve, and a spray results.
Figure 8A:
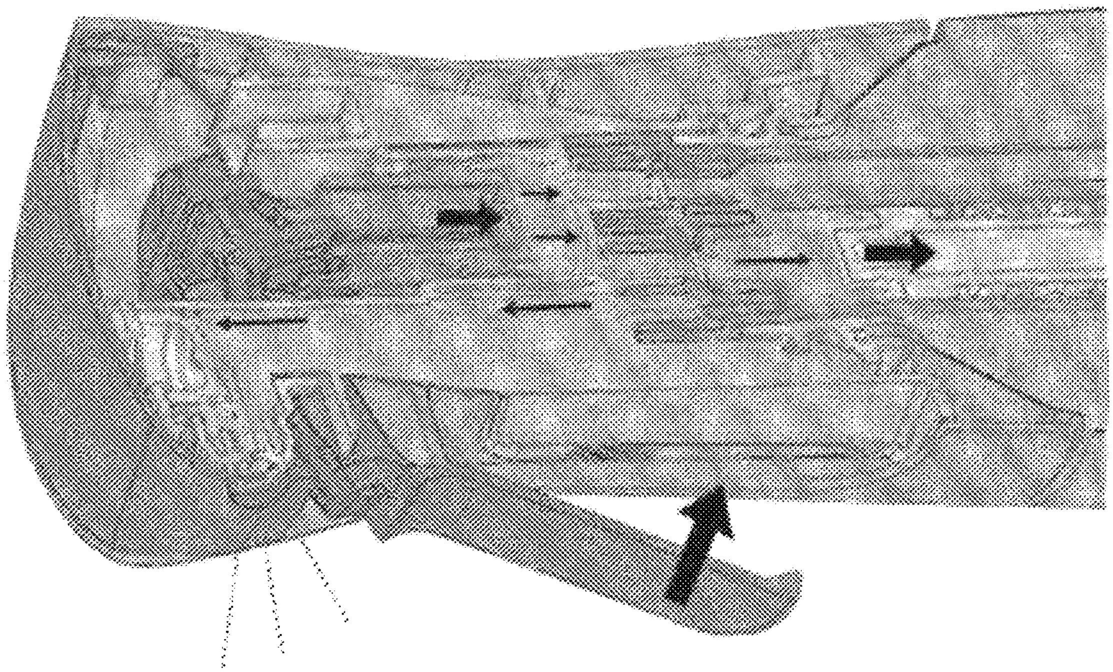
Figure 9A:
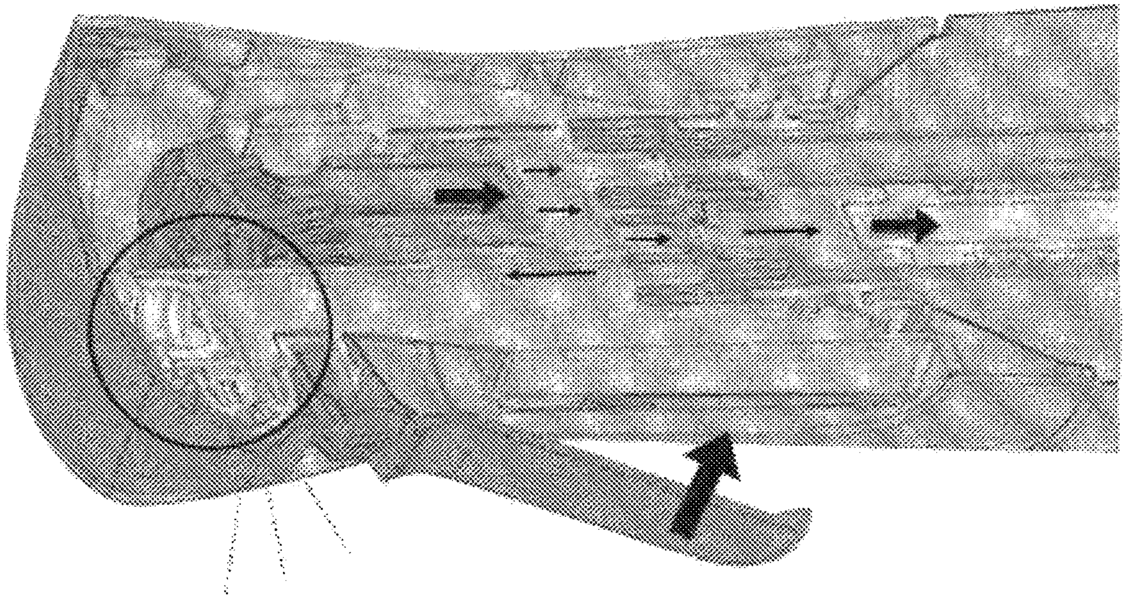
FIGS. 9A and 9B illustrate corresponding full and magnified views, respectively, of the exemplary Flairosol device of FIGS. 7A and 7B with the dome valve opening due to liquid pressure, and a resulting spray.
Figure 9B:
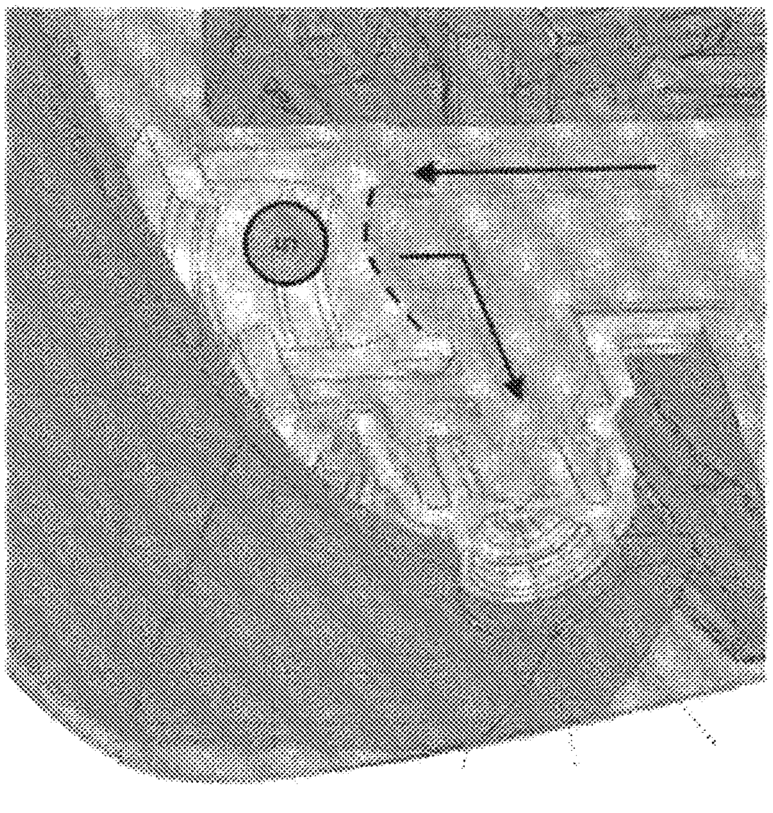

FIGS. 8A and 8B and 9A and 9B illustrate the exemplary Flairosol device of FIGS. 7A and 7B where the trigger is now pulled in (downward by a user), which creates a downstroke in the piston chamber, thus causing liquid to enter the pressure chamber and flow towards the dome valve. With reference to FIG. 8B, at 1, the piston moves down and pushes liquid into the pressure chamber towards the dome valve. At 2, the outlet valve is opened, thus letting the liquid pass to the pressure chamber and to the dome valve (pressure moves it downwards into its open position). At 3, the inlet valve closes, preventing the liquid from being pushed back into the container (pressure moves it downwards into closed position). At 4, the pressure of the liquid pushes down on the pressure piston, and the spring underneath the pressure piston is thereby compressed, thus allowing liquid to be stored under pressure (pressurized) in the pressure chamber. Finally, as shown in FIG. 9B, at 5, the dome valve will open because of the liquid pressure in the column, and the liquid thus passes towards the orifice creating a desired spray.

Figure 10B:
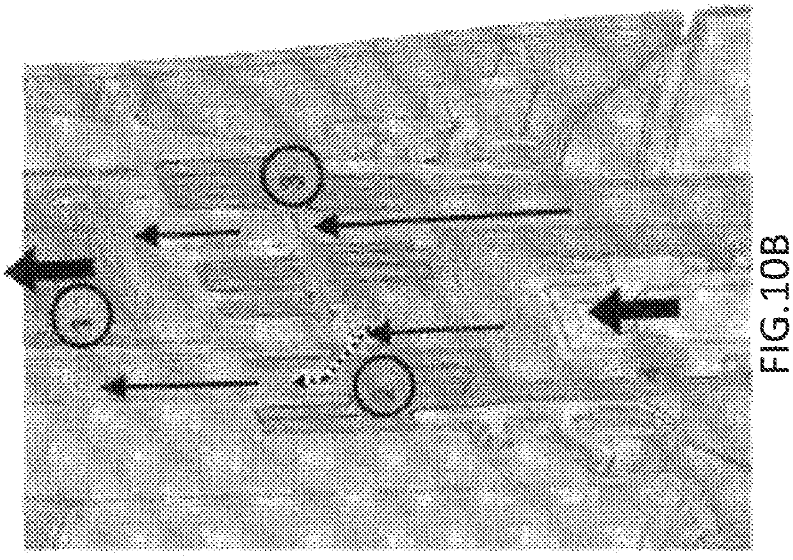
FIGS. 10A and 10B show corresponding full and magnified views, respectively, of the exemplary Flairosol device of FIGS. 7A and 7B in a subsequent filling stroke, similar to that of FIGS. 7A and 7B, according to exemplary embodiments of the present invention.
Figure 10A:
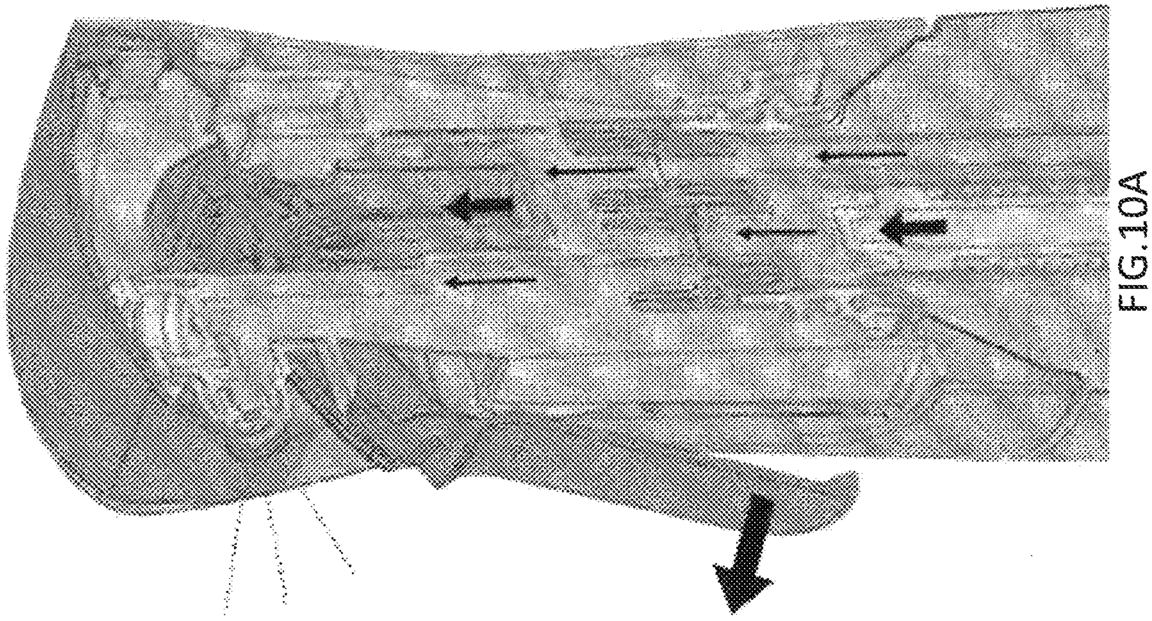

FIGS. 10A and 10B show a subsequent filling stroke, similar to that depicted in FIGS. 7A and 7B. As shown in FIG. 10B, the trigger is released by a user and under the pressure of the trigger springs the trigger is pushed upwards and outwards. This causes an upstroke in the piston chamber and therefore, as shown at 1, the piston moves up and sucks liquid into the piston chamber. At 2, the outlet valve is closed because the liquid from the pressure chamber moves it into the closed position. It is noted that liquid from the pressure chamber can still pass to the dome valve as indicated by the white dotted arrow. At 3 the inlet valve opens to let the liquid pass to the piston chamber (the underpressure moves it upwards into open position).

Finally, at 4 the remaining liquid in the pressure chamber is pushed toward the dome valve, the compressed spring providing the needed force. Thus, although the Flairosol device is in a subsequent trigger release and liquid intake step, liquid can still pass by the dome valve and through the orifice to continue the spray. It is in this manner that a user can cause a continuous spray using the metered Flairosol embodiment—as long as the user continues to pump the trigger such that the liquid intake strokes keep up with the spray, liquid continues to be drawn up and sent to the pressure chamber and the dome valve. In this context it is noted that by varying the relative volumes of the piston chamber and the pressure chamber, various speeds of pumping can be designed For example, if the pressure chamber is larger, by say a factor of two or three, than the piston chamber, which is a common design in exemplary embodiments of the present invention, then it takes a number of strokes per unit time to fill it or to replenish the sprayed amounts so as to keep a continuous spray going. However, larger strokes for a smaller piston chamber mean easier pumping, suitable for any user, such as even older ladies who may be spraying cleaning fluids. On the other hand, for a lesser number of strokes per unit time to keep a continuous spray going, the force needed to push the liquid out of the piston chamber and into the pressure chamber or outlet channel will be higher. Similarly, the volume of the pressure chamber is a function of the displacement of the pressure chamber spring, and for a given force constant there is a larger force delivered by the spring at a greater compression, and thus at a larger pressure chamber volume. The higher the pressure that the liquid is held under, the finer the spray will be, for a given viscosity of liquid, that is. All of these considerations can be used in designing or parameterizing an exemplary Flairosol device in various exemplary embodiments of the present invention.

Figure 11:
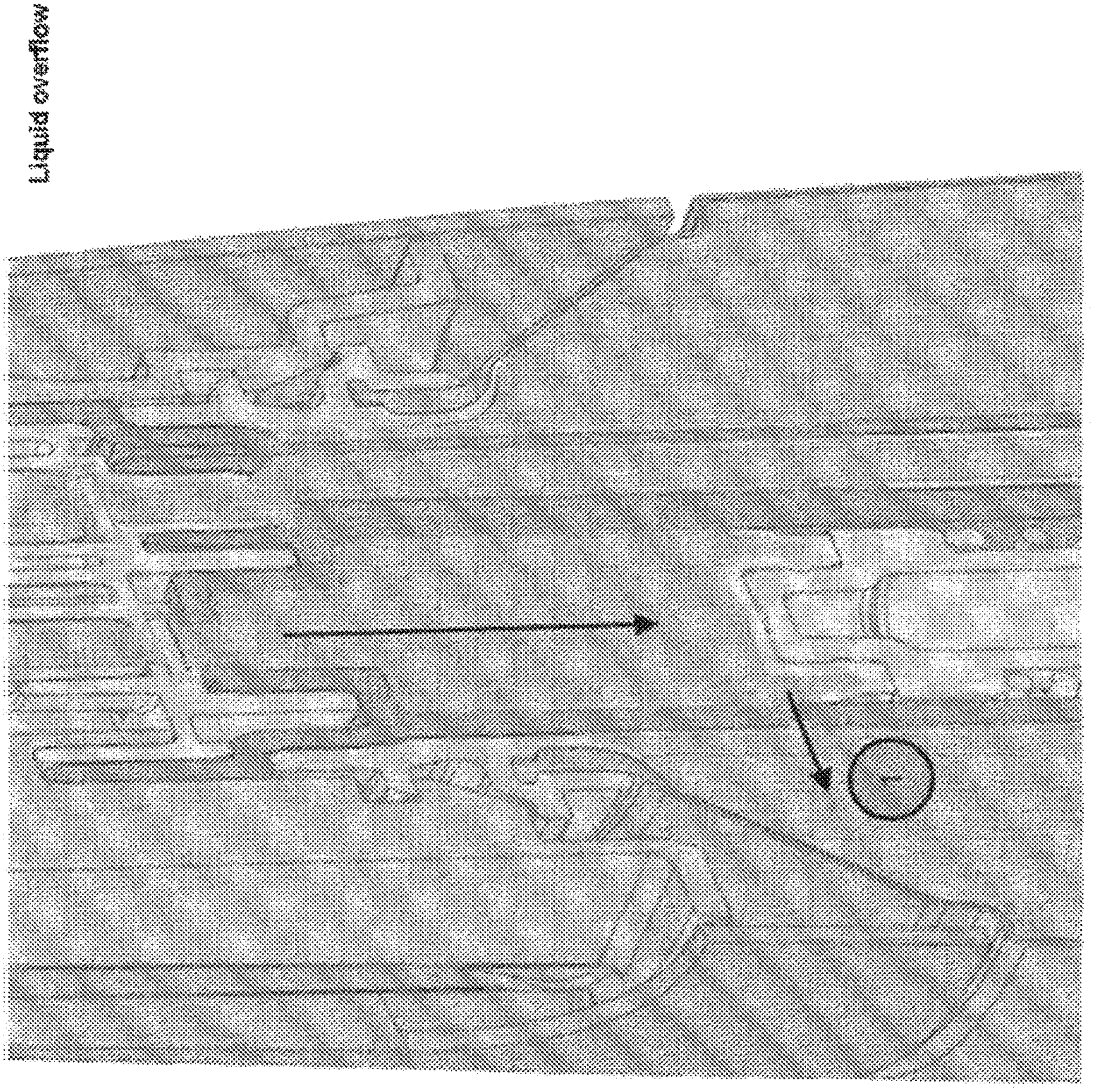
FIG. 11 illustrates an overflow outlet of an exemplary pressure chamber of the exemplary Flairosol device of FIGS. 7A and 7B according to exemplary embodiments of the present invention.

FIG. 11 illustrates a liquid overflow situation. As shown in FIG. 11, at 1 there is an opening at a certain depth of the pressure chamber. This is done to prevent too much buildup of liquid pressure, and thus is a kind of outlet at a certain defined point beyond which the pressure piston can travel no farther downwards. Thus, when the pressure piston moves beyond a certain paint (at maximum desired pressure/spring force). liquid will flow back into the container through the overflow valve, keeping the pressure piston no lower than said venting hole(s). In an exemplary embodiment of the present invention, the liquid overflow valve can be set for a maximum spring pressure in the chamber of for example, 0.5 to 1.0 bar above the preset opening pressure of the dome valve. In other embodiments it can be set to 0.5 to 2.5 bar above said opening pressure. In exemplary embodiments of the present invention, such dome valve opening pressure can be, for example, 1.5, 2.5, 3.5 or even 6 bar or more. It is noted that in exemplary embodiments of the present invention, the dome valve has a lower opening pressure than the maximum pressure that can develop in the pressure chamber. In this way the dome valve will open, and spray can occur, well before the pressure chamber is fully filled with liquid and thus reaching its maximum pressure. This allows for continuous spray conditions.

Figure 12A:
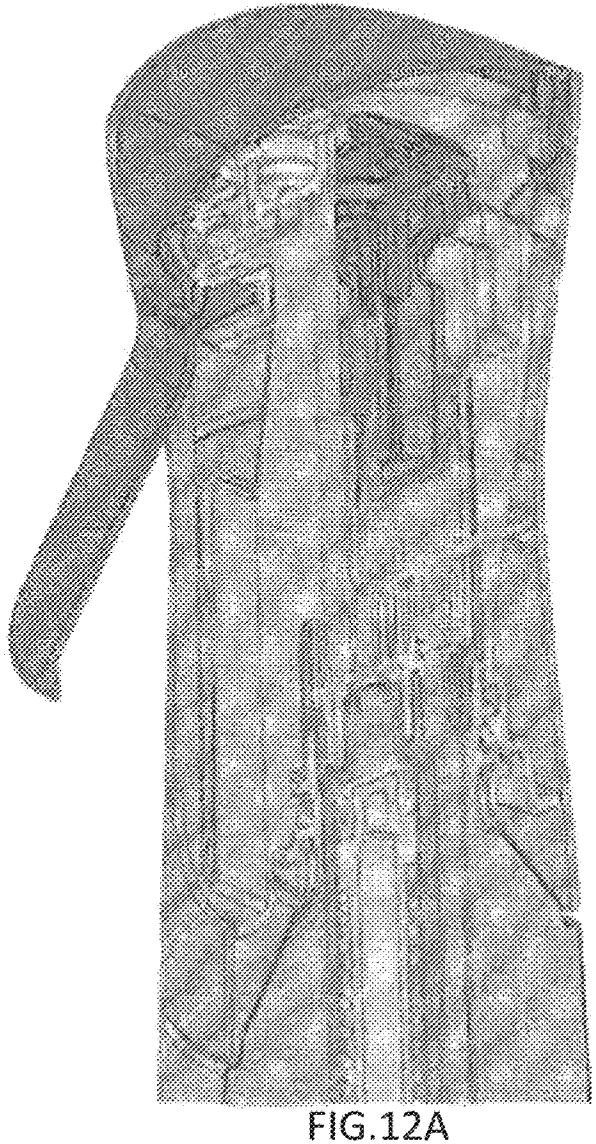
FIGS. 12A and 12B illustrate full and magnified views. respectively, of the dome valve closing in the exemplary Flairosol device of FIGS. 7A and 7B according to exemplary embodiments of the present invention.
Figure 12B:
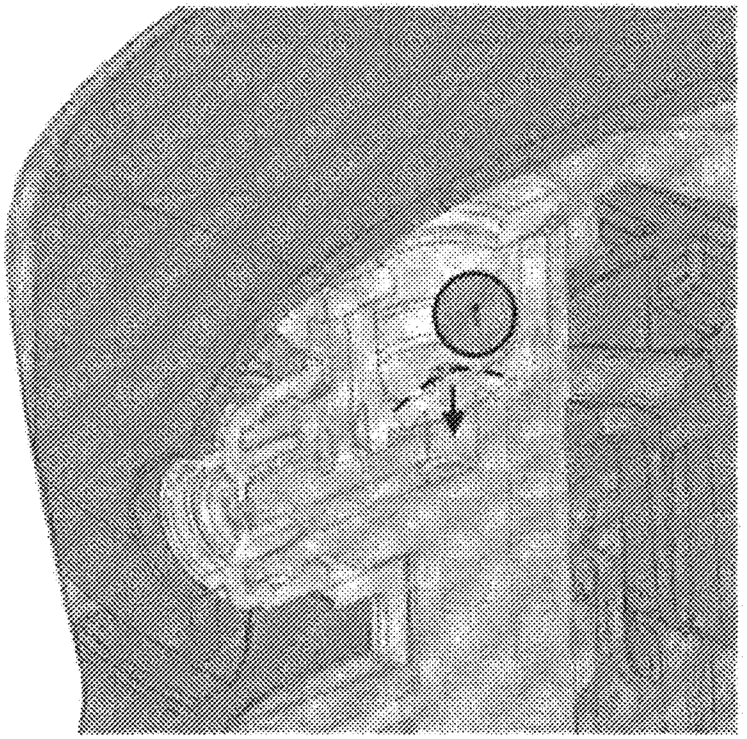

Finally, when the pressure drops low enough, the dome valve will close, as shown in FIG. 12B at 1. Here the tension of the dome will make it close at a preset pressure and when that pressure valve is reached, in exemplary embodiments of the present invention, the dome valve closes very suddenly. This ensures a good spray pattern from start to finish and prevents dripping. As noted above, the preset pressure of the dome valve provides a pre-compression hurdle which the liquid must overcome before any of the liquid will be allowed out through the orifice. Various known valves can be used in place of the dome, such as mechanical valves, spring loaded, spring assisted, elastomeric, and other types. for example.

Figure 13D:
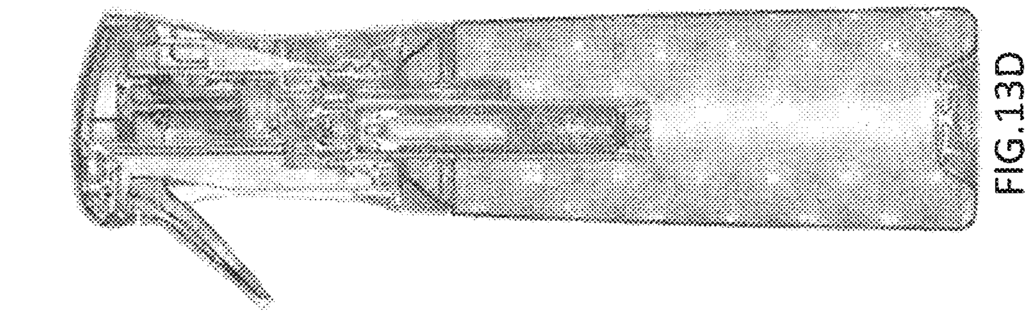
FIGS. 13A, 13B, 13C and 13D illustrate successive views of what happens as a user removes and reconnects a Flairosol dispensing head from and to a bottle according to exemplary embodiments of the present invention.
Figure 13C:
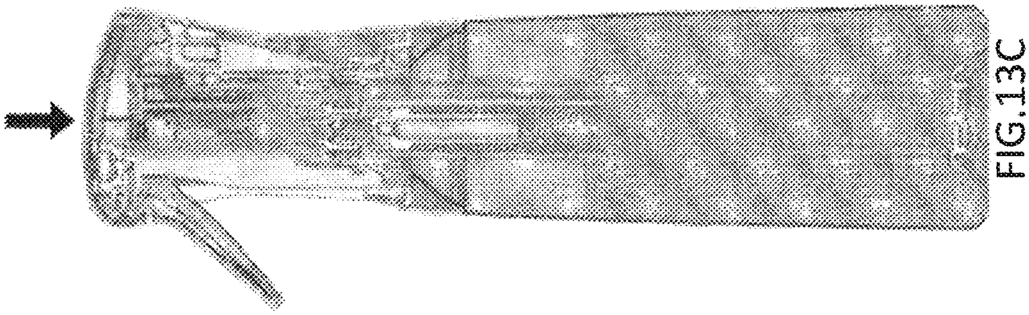
Figure 13B:
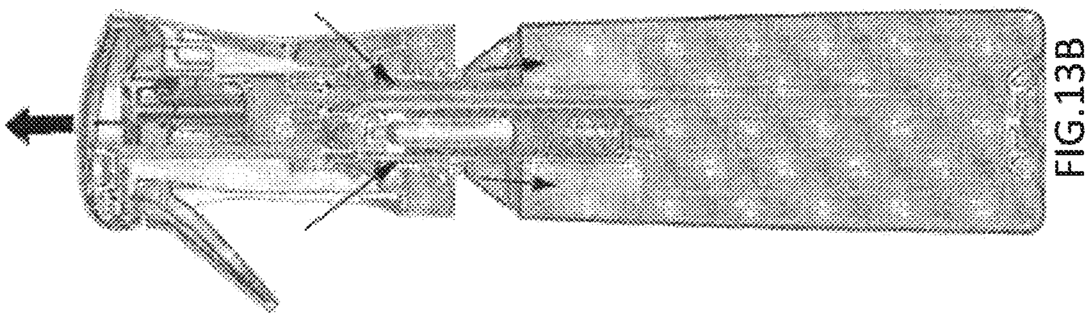
Figure 13A:
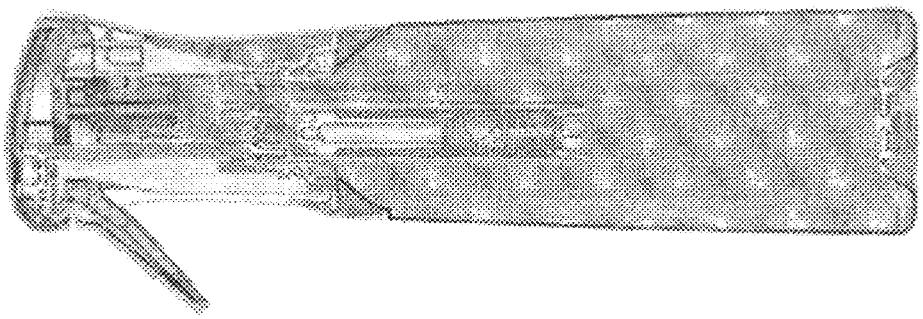

FIGS. 13A through 13D illustrate what happens when a user removes and reconnects a Flairosol dispensing head from and to a bottle according to an exemplary embodiment of the present invention. Proceeding from the left side of FIG. 13, in FIG. 13A, the underpressure created by the liquid being sucked out of the bottle is compensated for by air being sucked in by the inside and outside layers of the Flair bottle. Next, in FIG. 13B, when a consumer removes the Flairosol dispenser head from the bottle, air flows into the bottle, making the inside layer (inner container) sag. Next, in FIG. 13C, when a consumer then places the Flairosol dispensing head on a partially full bottle, the dip tube makes sure that liquid is sucked into the Flairosol dispensing head as opposed to air. Thus, the dip tube extends below the head space in the inner container. And finally as shown in FIG. 13D, when the Flairosol dispenser head cannot be removed from the bottle, a dip tube is obviously not necessary, as no head space develops, due to the Flair technology.

The inner Flair container will shrink toward and around the intake opening as the displacing medium (air) is sucked in by the outside layers of the Flair bottle as shown in the first image.

Figure 14:
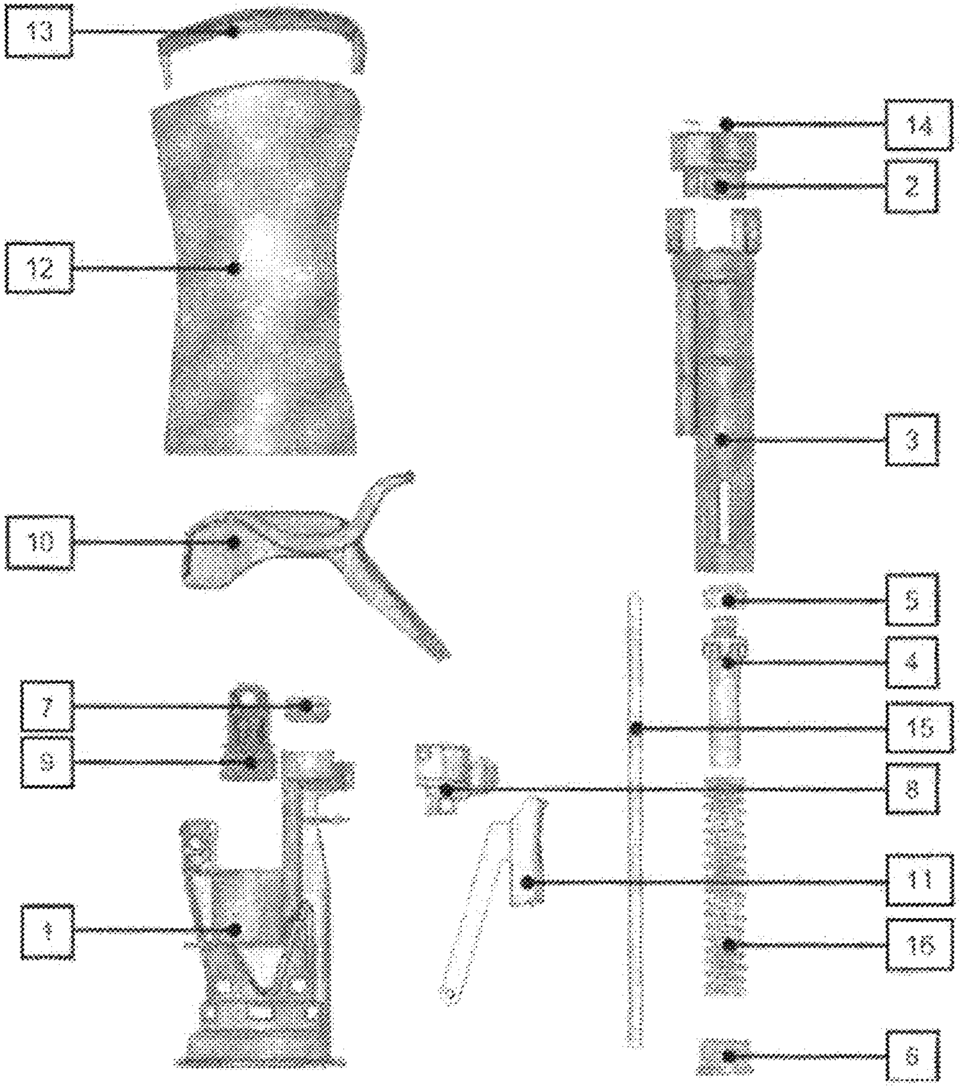
FIG. 14 depicts exemplary parts for an exemplary metered Flairosol embodiment.

FIG. 14 shows exemplary parts of the exemplary metered Flairosol device according to exemplary embodiments of the present invention. These parts will next be described in some detail in the following figures. They include a frame 1, a valve housing 2, a reservoir 3, a reservoir piston 4, a reservoir piston seal 5, a reservoir spring lock 6, a dome valve 7, a dome fixer—orifice 8, a piston 9, a trigger 10, a trigger lock 11, a shroud metered 12, a shroud top metered 3, a valve 14, a tube 15, and 1 spring, for example, 47 N here, 16.

Figure 15A:
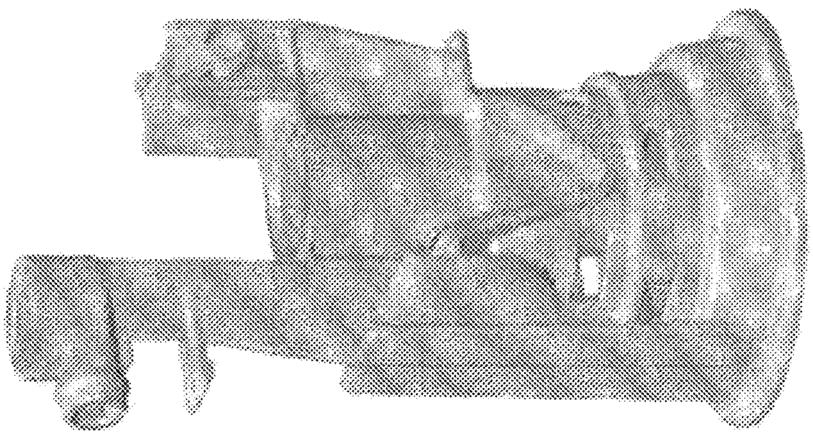
FIGS. 15A, 15B and 15C illustrate perspective, side and cut-away views, respectively, of the frame of FIG. 14 in detail according to exemplary embodiments of the present invention.
Figure 15B:
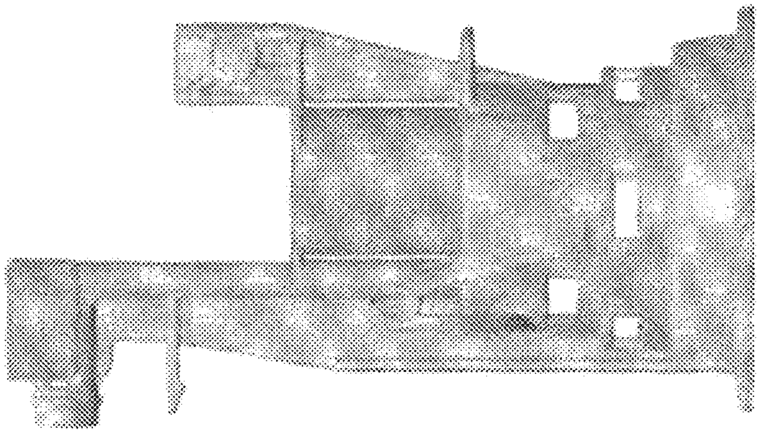
Figure 15C:
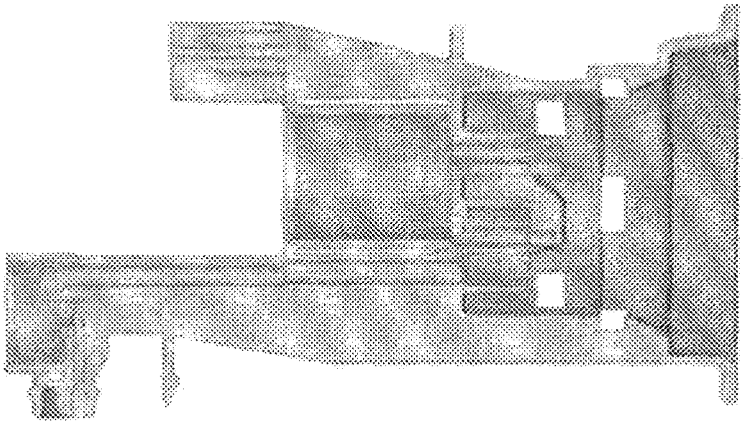
Figure 16A:
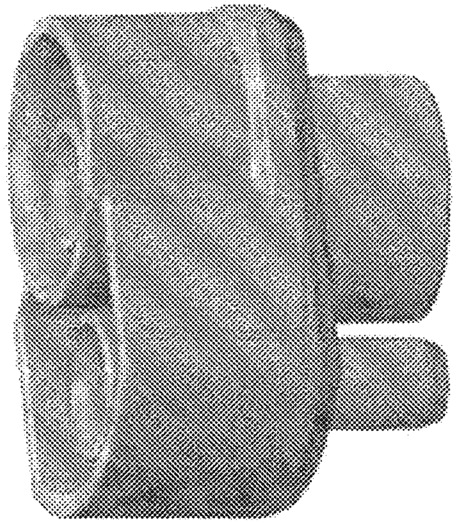
FIGS. 16A, 16B and 16C illustrate perspective, side and cut-away views, respectively. of the valve housing of FIG. 14 in detail according to exemplary embodiments of the present invention.
Figure 16B:
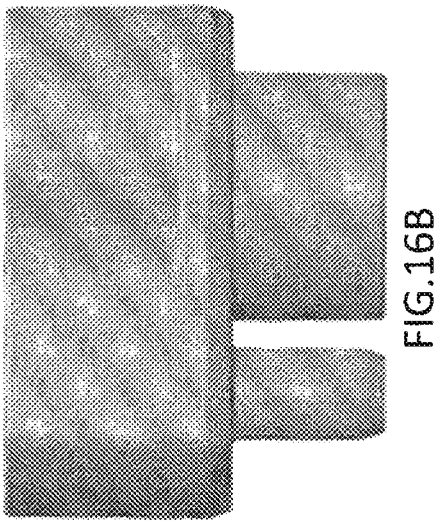
Figure 16C:
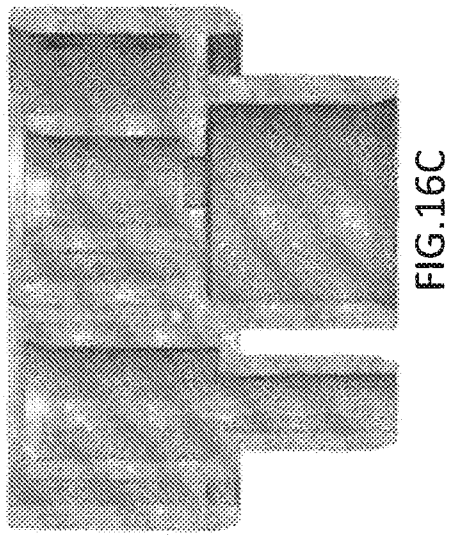
Figure 17C:
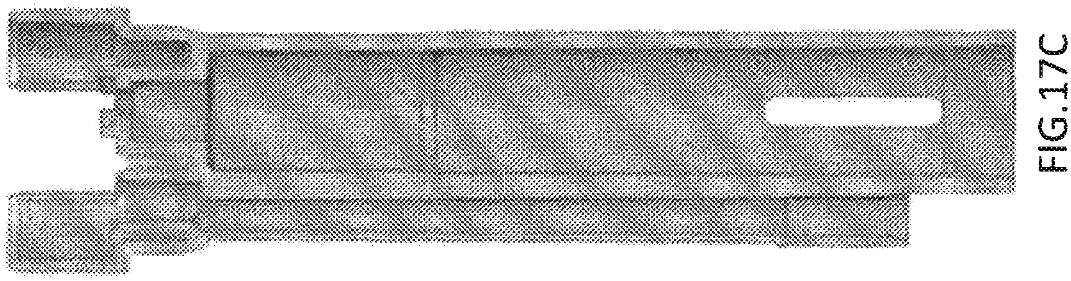
FIGS. 17A, 17B and 17C illustrate perspective, side and cut-away views, respectively, of the reservoir of FIG. 14 in detail according to exemplary embodiments of the present invention.
Figure 17B:
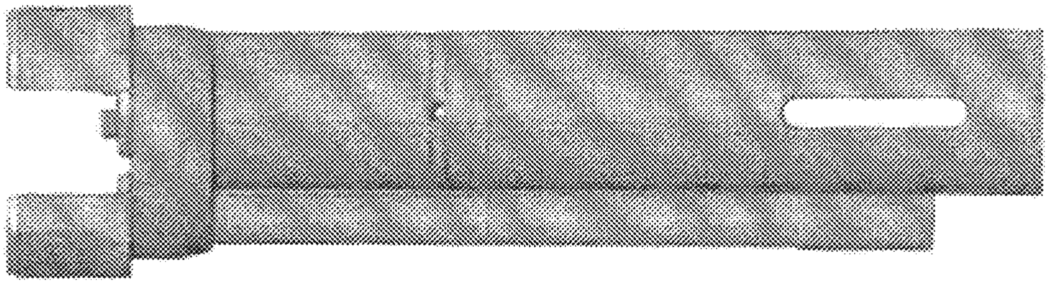
Figure 17A:
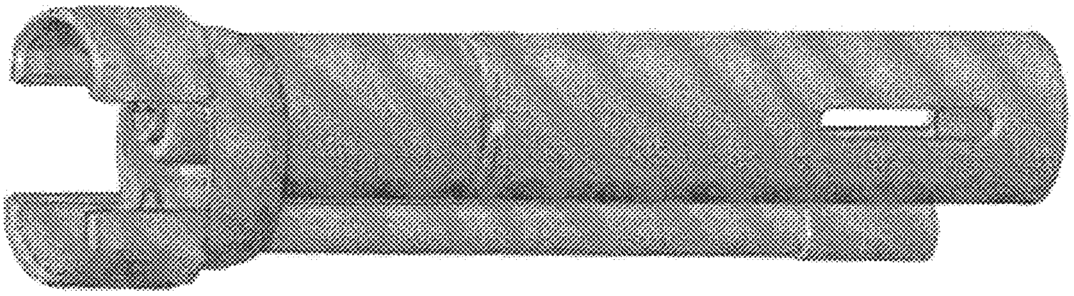
Figure 18C:
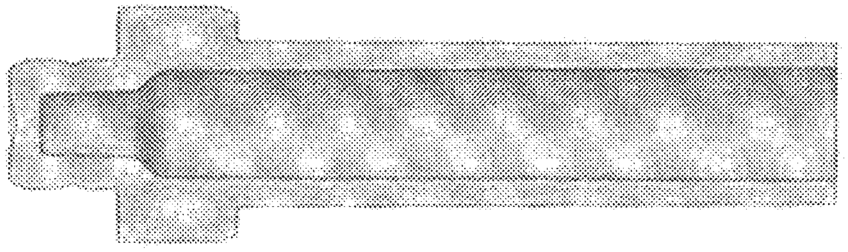
FIGS. 18A, 18B and 18C illustrate perspective, side and cut-away views, respectively, of the reservoir piston of FIG. 14 in detail according to exemplary embodiments of the present invention.
Figure 18B:
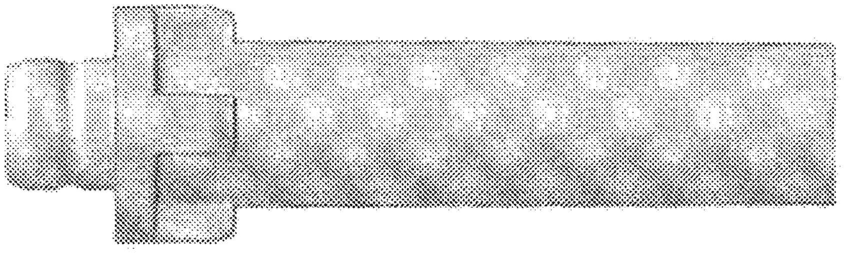
Figure 18A:
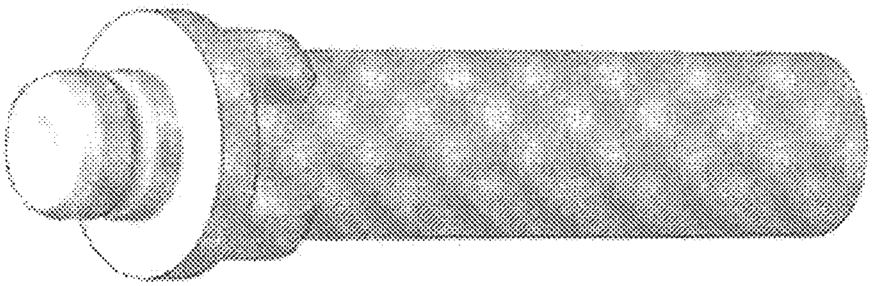
Figure 19C:
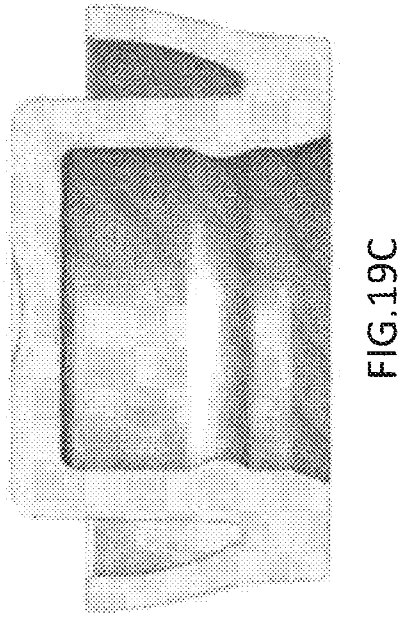
FIGS. 19A, 19B and 19C illustrate perspective, side and cut-away views, respectively, of the reservoir piston seal of FIG. 14 in detail according to exemplary embodiments of the present invention.
Figure 19A:
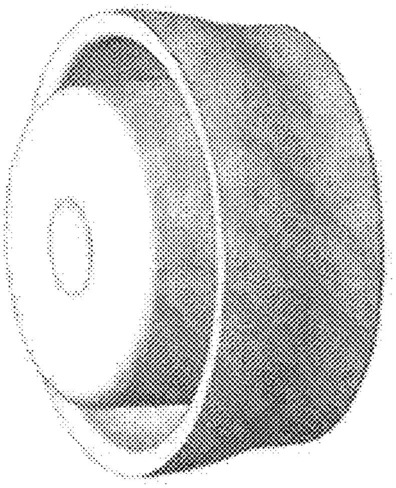
Figure 19B:
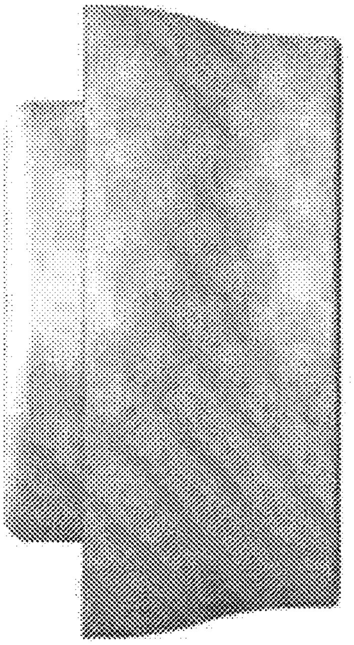
Figure 20A:
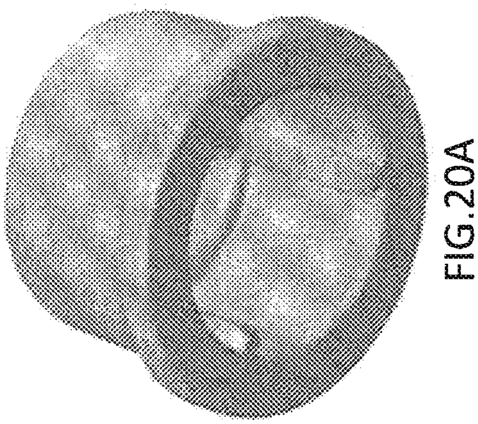
FIGS. 20A, 20B and 20C illustrate perspective, side, and cut-away views, respectively, of the reservoir spring lock of FIG. 14 in detail according to exemplary embodiments of the present invention.
Figure 20B:
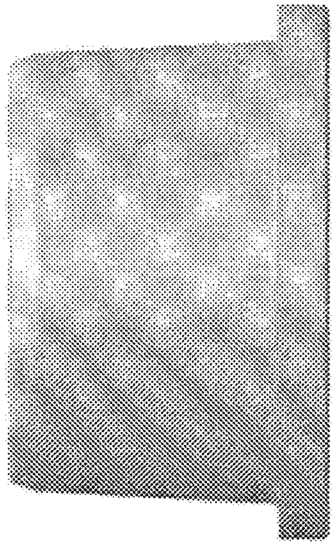
Figure 20C:
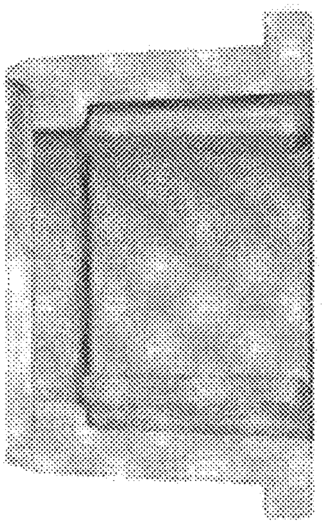
Figure 21A:
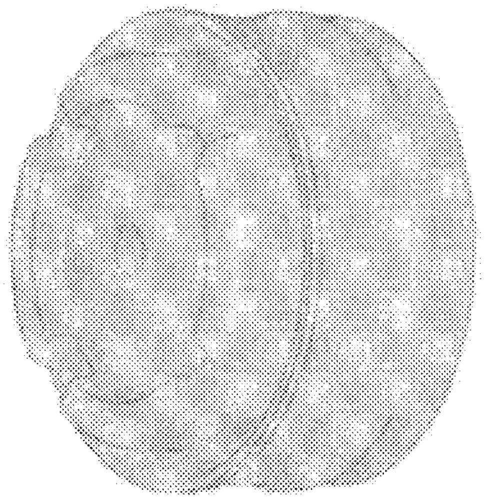
FIGS. 21A, 21B and 21C illustrate perspective, side and cut-away views, respectively, of the dome valve of FIG. 14 in detail according to exemplary embodiments of the present invention.
Figure 21B:
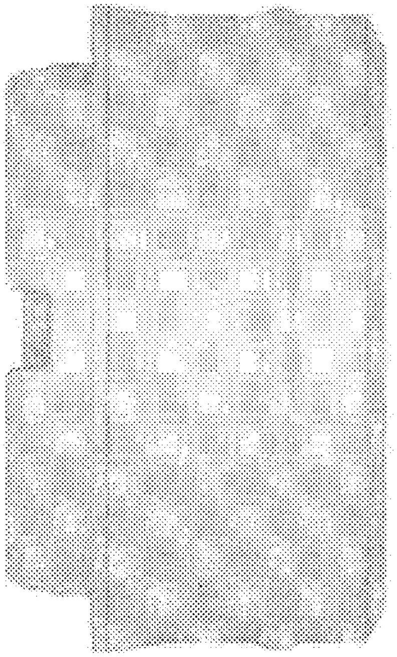
Figure 21C:
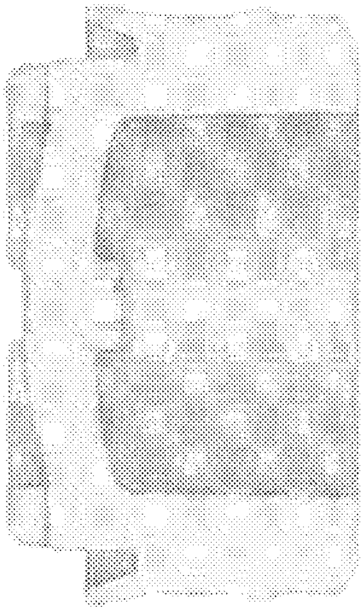

FIGS. 15A through C depict the frame in detail according to exemplary embodiments of the present invention; FIGS. 16A through C depict the valve housing in detail according to exemplary embodiments of the present invention; FIGS. 17A through C illustrate the reservoir in detail according to exemplary embodiments of the present invention; and FIGS. 18A through C illustrate the reservoir piston in detail according to exemplary embodiments of the present invention. FIGS. 19A through C show the reservoir piston seal, and FIGS. 20A through C show the reservoir spring lock.

Figure 22A:
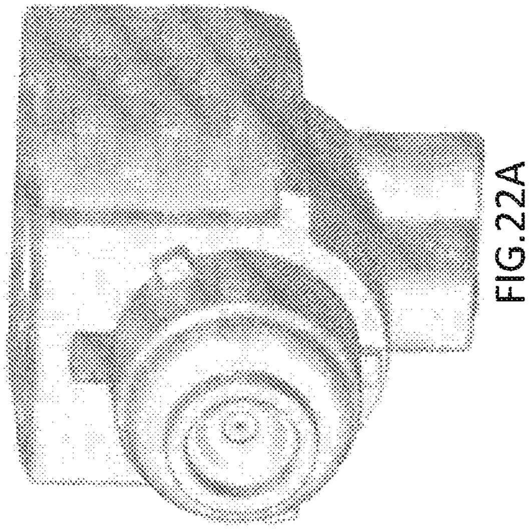
FIGS. 22A, 22B and 22C illustrate perspective, side and cut-away views, respectively, of the dome fixer and orifice of FIG. 14 in detail according to exemplary embodiments of the present Invention.
Figure 22B:
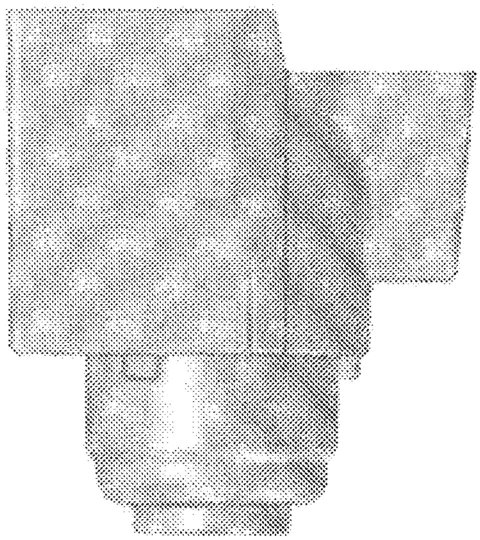
Figure 22C:
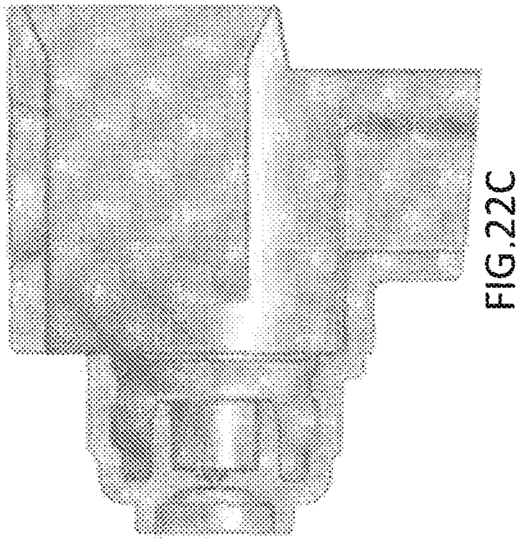
Figure 23C:
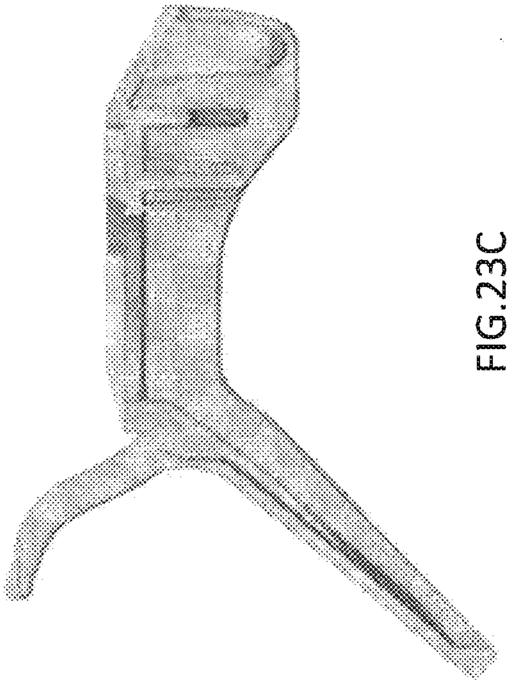
FIGS. 23A, 23B and 23C illustrate perspective, side and cut-away•views, respectively, of the trigger of FIG. 14 in detail according to exemplary embodiments of the present invention.
Figure 23A:
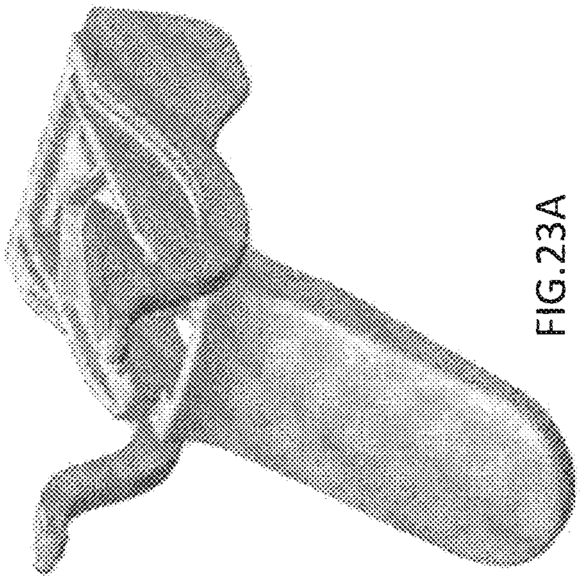
Figure 23B:
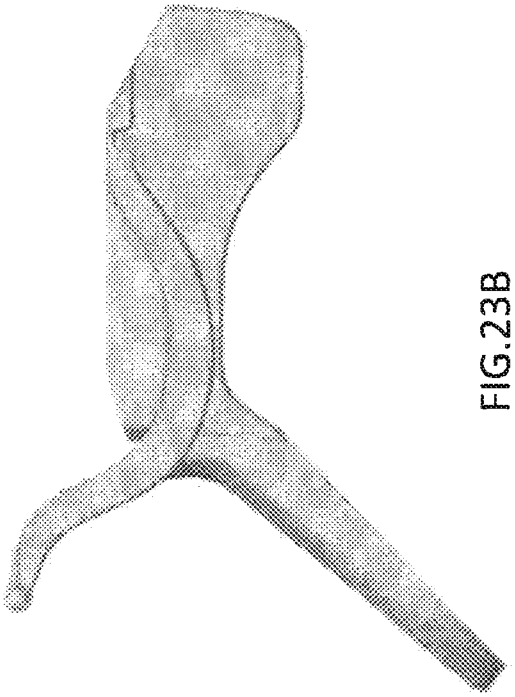
Figure 24B:
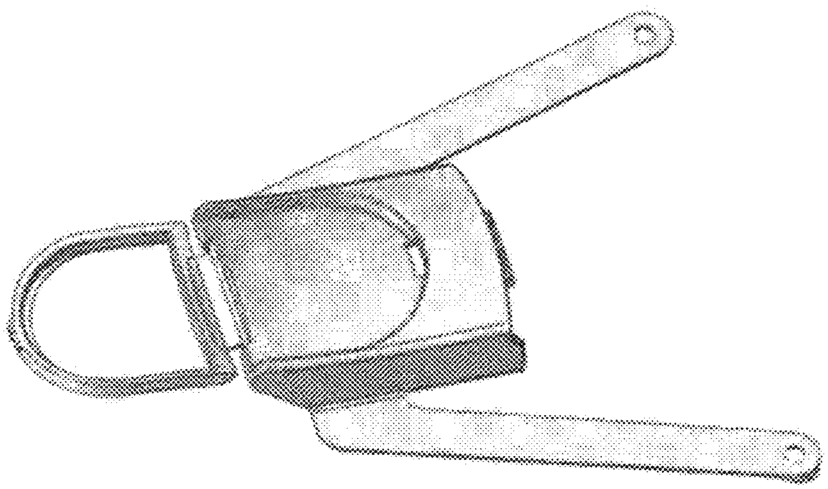
FIGS. 24A and 24B illustrate top and bottom views of the trigger lock of FIG. 14 in detail according to exemplary embodiments of the present invention.
Figure 24A:
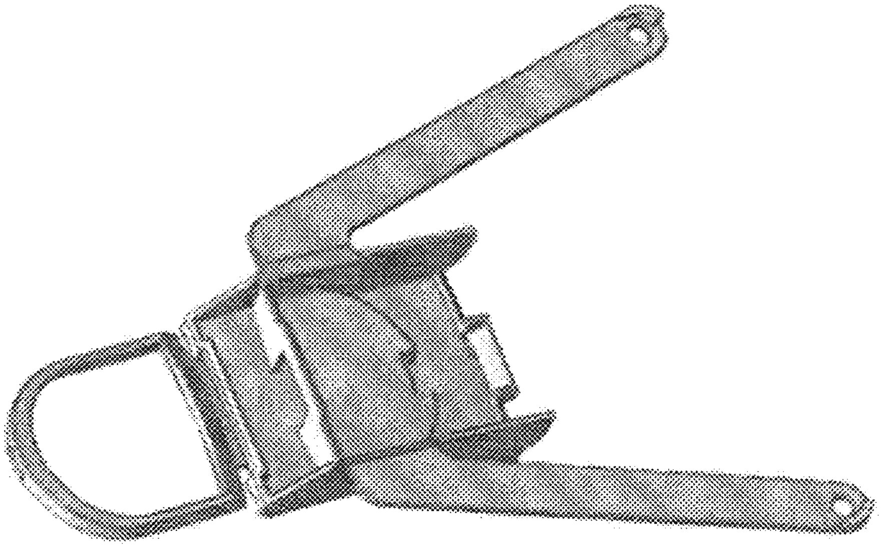
Figure 25C:
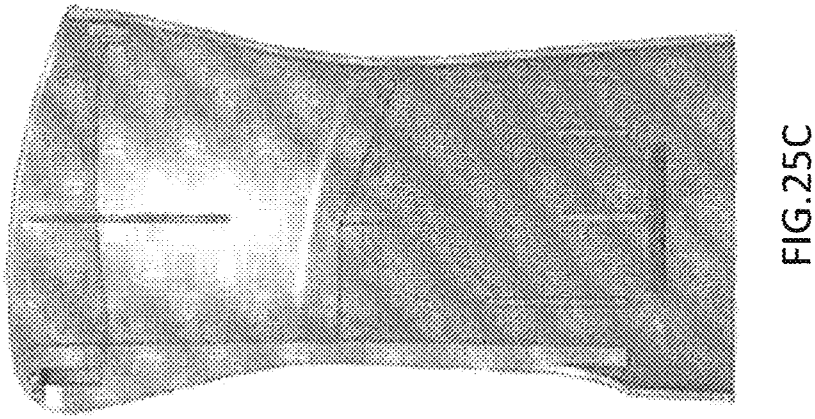
FIGS. 25A, 25B and 25C illustrate perspective, side and cut-away•views, respectively, of the shroud of FIG. •14 in detail according to exemplary embodiments of the present invention.
Figure 25B:
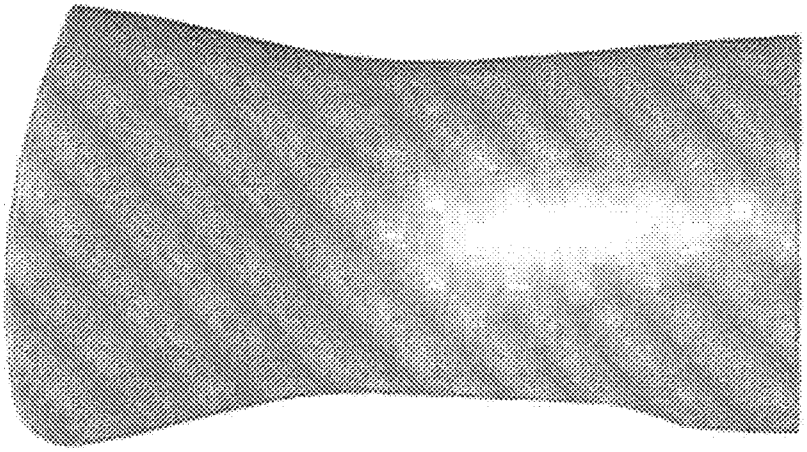
Figure 25A:
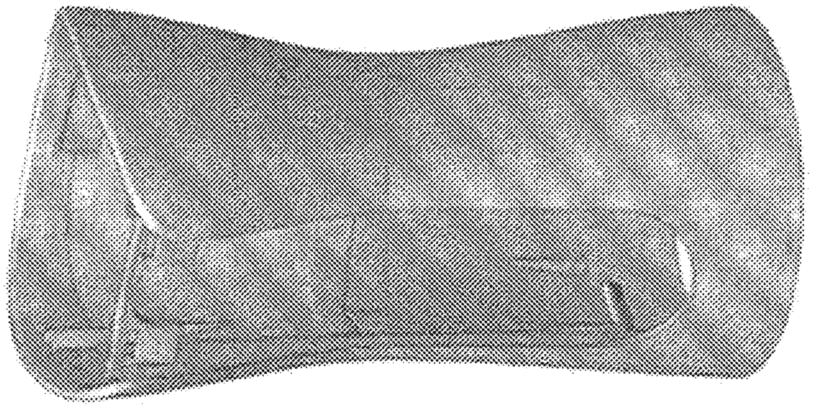
Figure 26A:
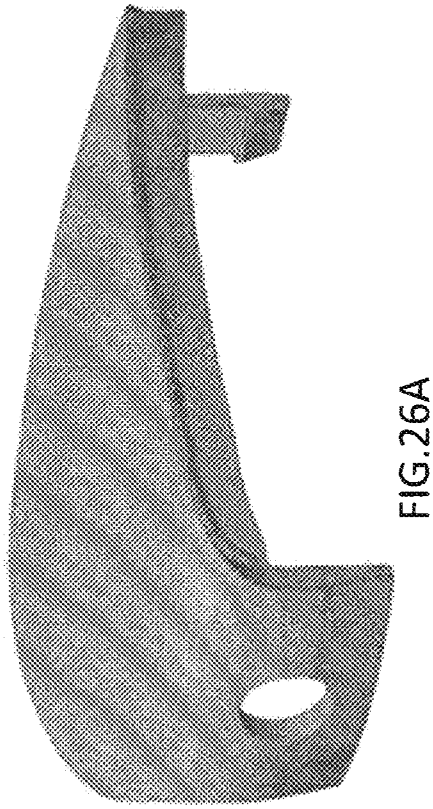
FIGS. 26A, 26B and 26C illustrate perspective, side and cut-away views, respectively, of the shroud top of FIG. 14 in detail according to exemplary embodiments of the present invention.
Figure 26B:
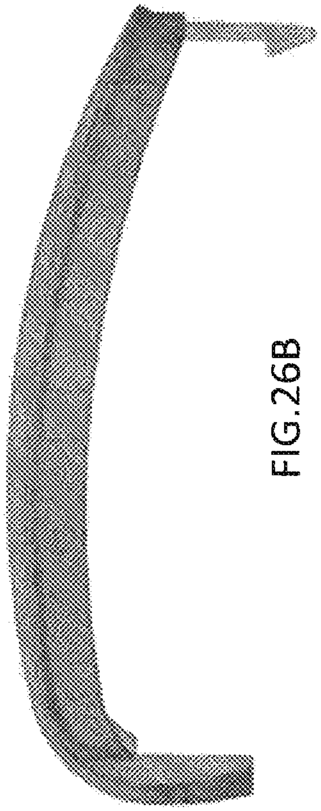
Figure 26C:
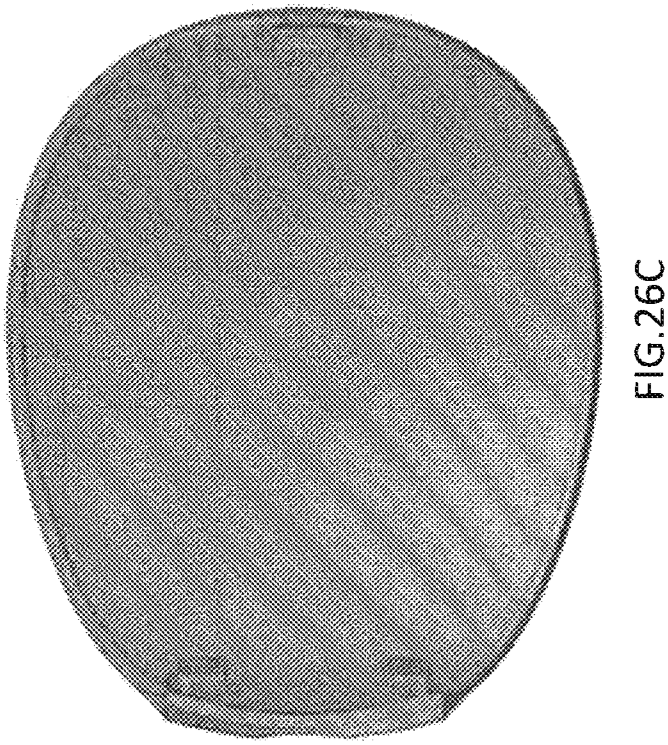
Figure 27B:
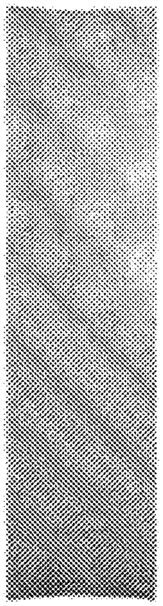
FIGS. 27A and 27B illustrate perspective and side views, respectively, of the disc inlet and outlet valves of FIG. 14 in detail according to exemplary embodiments of the present invention.
Figure 27A:
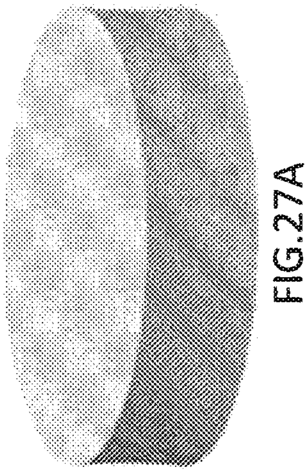

FIGS. 21A through G illustrate the dome valve in detail, FIGS. 22A through C illustrate the dome valve fixer and orifice, FIGS. 23A through C illustrate the trigger, and FIGS. 24A and 24B illustrate the trigger lock. FIGS. 25A through C illustrate the shroud, and FIGS. 26A through C illustrate the shroud top. FIGS. 27A and 27B illustrate the disk valve in detail. It is noted with reference to FIGS. 27A and 27B (and the exemplary parts list on FIG. 14) that the two disk valves are used for the intake valve and outlet valve of FIGS. 8A and 8B and FIGS. 10A and B, as described above.

Figure 28B:
FIGS. 28A and 28B illustrate the spring and dip tube of FIG. 14 in detail according to exemplary embodiments of the present invention.
Figure 28A:
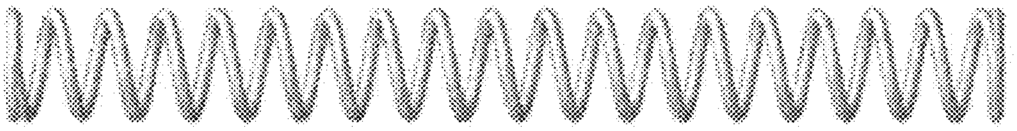
Figure 29B:
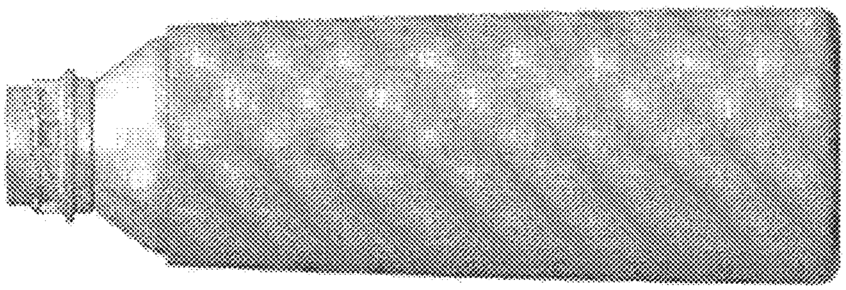
FIGS. 29A and 29B illustrate perspective and side views, respectively, of an exemplary Flair® bottle according to exemplary embodiments of the present invention.
Figure 29A:
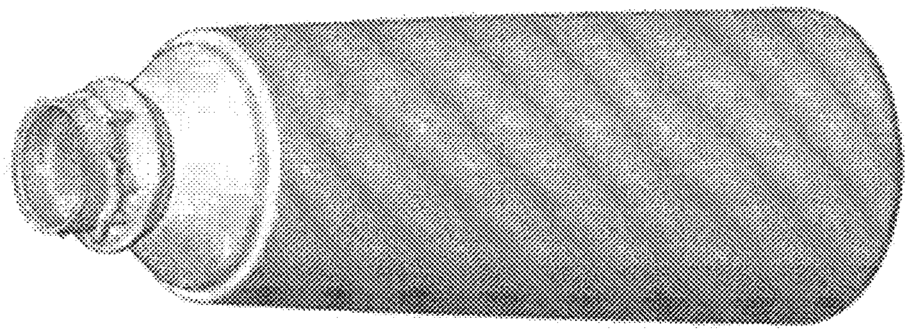
Figure 30B:
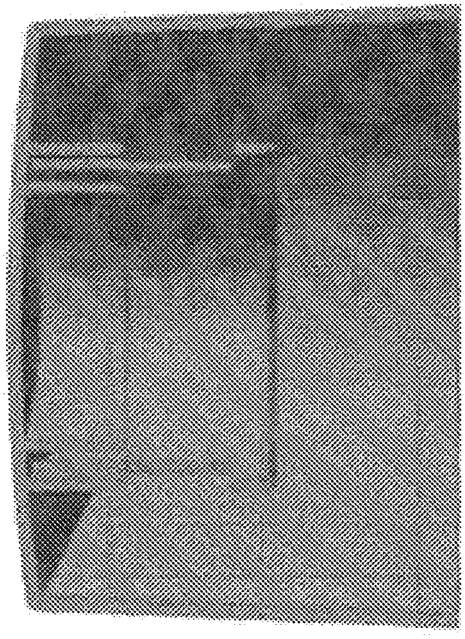
FIGS. 30A and 30B illustrate perspective and cut-away views, respectively, of an exemplary refill cap with four lugs according to exemplary embodiments of the present invention.
Figure 30A:
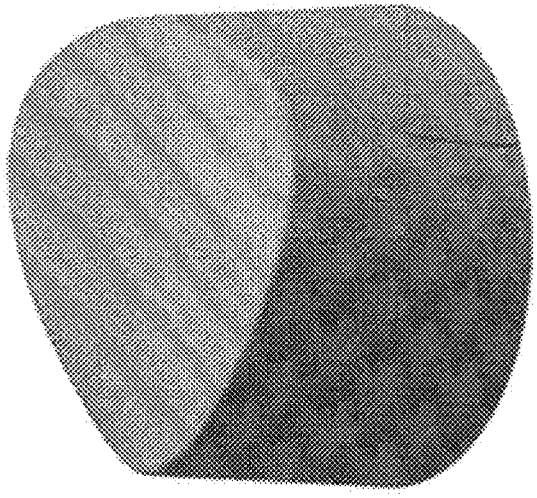
Figure 31A:
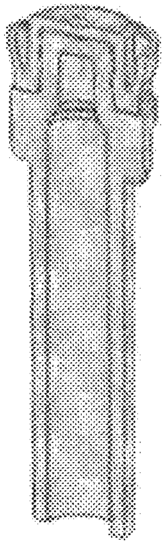
Figure 31B:
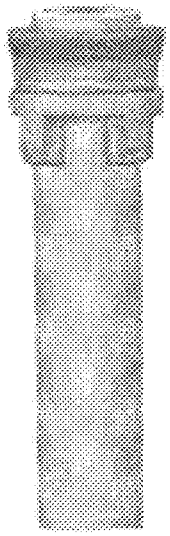
Figure 31C:
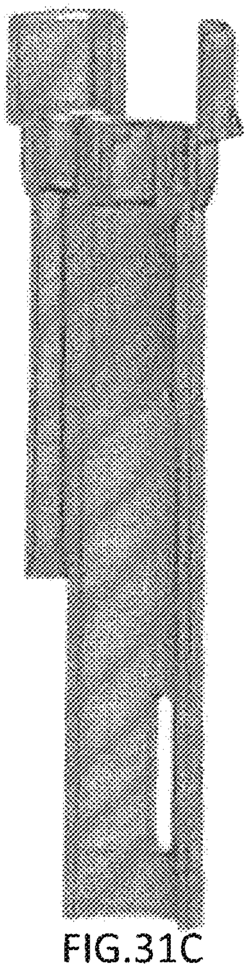
Figure 31D:
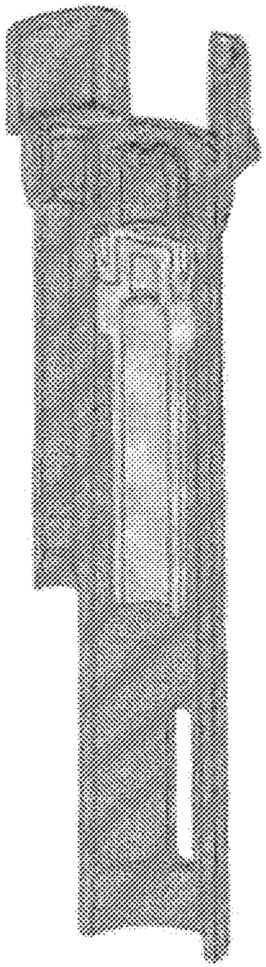
Figure 32A:
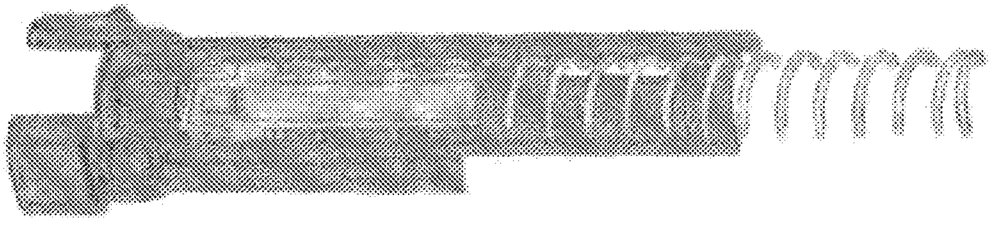
FIGS. 32A through 32D illustrate, respectively, insertion of the pressure chamber spring Underneath the reservoir piston, its compression, attaching the spring lock to the reservoir bottom, and expansion of the spring toward the bottom of the pressure chamber and pushing against the spring lock.
Figure 32B:
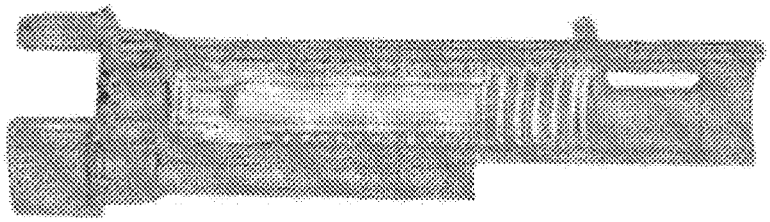
Figure 32C:
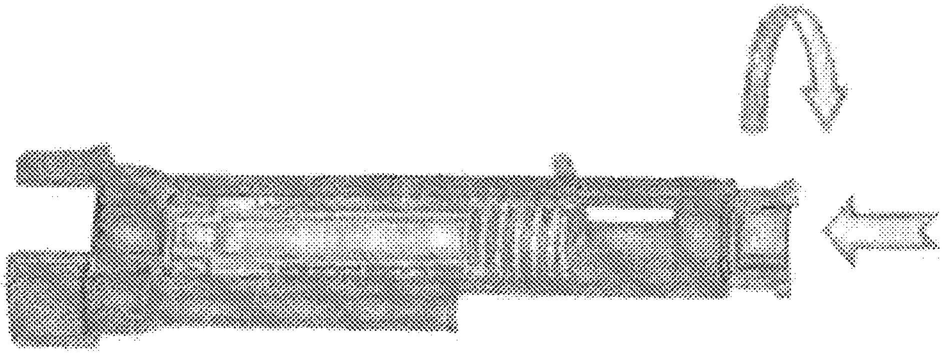
Figure 32D:
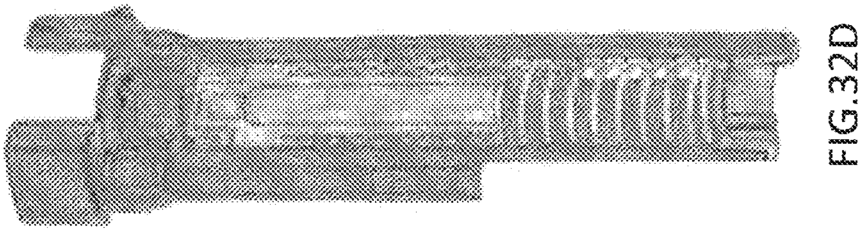

FIGS. 28A and 28B illustrate the spring used in the pressure chamber as well as the dip tube, FIGS. 29A and 29B illustrate an exemplary Flair bottle, and FIGS. 30A and 30B illustrate an exemplary refill cap with four lugs, all according to exemplary embodiments of the present invention. It is noted that the refill cap is not part of the Flairosol dispensing head, but can be, for example, shipped with a refill bottle, such as is shown in FIGS. 30A and 30B. A user purchases, for example, a refill bottle filled with liquid and then attaches the Flairosol head to it as shown above with reference to FIG. 13C.

FIGS. 31A-41B illustrate an exemplary assembly procedure for an exemplary metered Flairosol device according to exemplary embodiments of the present invention. With reference to FIGS. 31A through 31D, respectively, initially the reservoir and reservoir piston seal are assembled, the seal inner diameter is lubricated, such as, for example, with silicone, mineral oil, or the like, and the sealed diameter in the reservoir is also lubricated, e.g., with silicone, and finally, the piston assembly is assembled into the reservoir.

With reference to FIGS. 32A through 32D, respectively, the pressure chamber spring can be inserted underneath the reservoir piston and then compressed. The spring lock can be, for example, attached to the bottom of the reservoir, for example, by spin welding, screw cap, pin, or any known connecting technique, for example. Then, the spring which has been held in a highly compressed state can be allowed to expand toward the bottom of the pressure chamber and push against the spring lock.

Figure 33A:
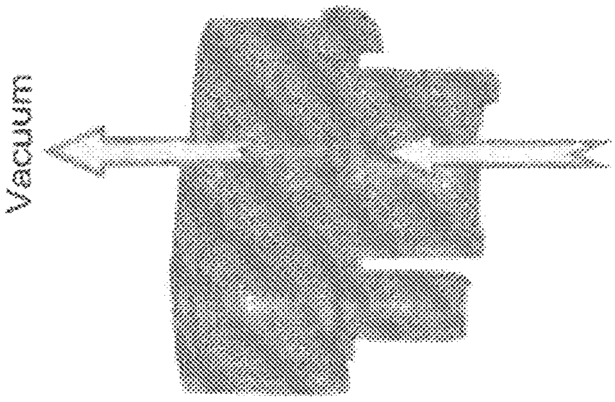
FIGS. 33A through 33D illustrate, respectively, insertion of the first valve, an outlet valve, under a vacuum, inserting the valve housing into the reservoir, adding a second valve, namely the intake or inlet valve, also under a vacuum, and placing the frame on top of the reservoir and valve housing.
Figure 33B:
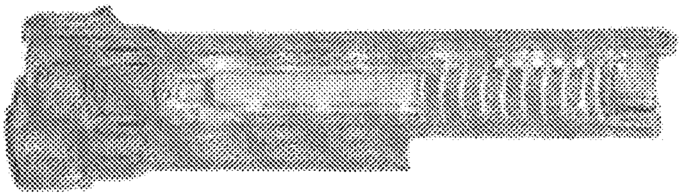
Figure 33C:
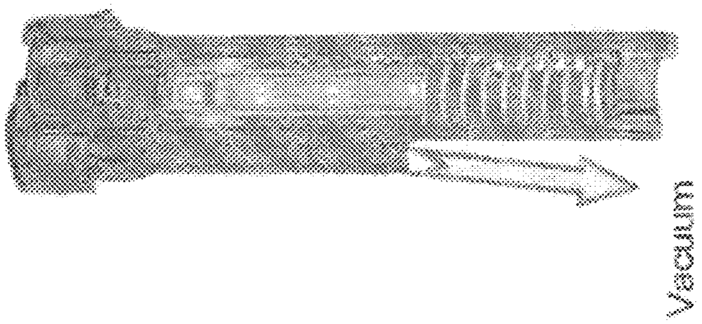
Figure 33D:
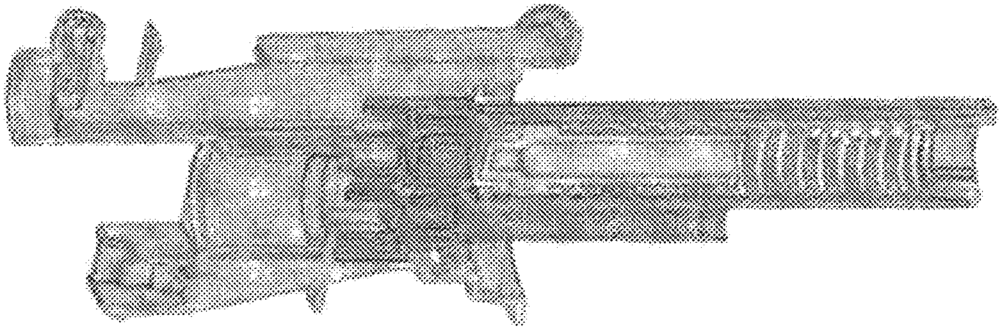

With reference to FIGS. 33A through 33D, respectively, taking the valve housing, the first valve, being the outlet valve, can be inserted under a vacuum, then the valve housing can be inserted into the reservoir. Next, a second valve, namely the intake or inlet valve, can also be inserted under a vacuum, for example, but in the other direction, and finally the frame can be placed on top of the reservoir and valve housing as shown in FIG. 33D.

Figure 34A:
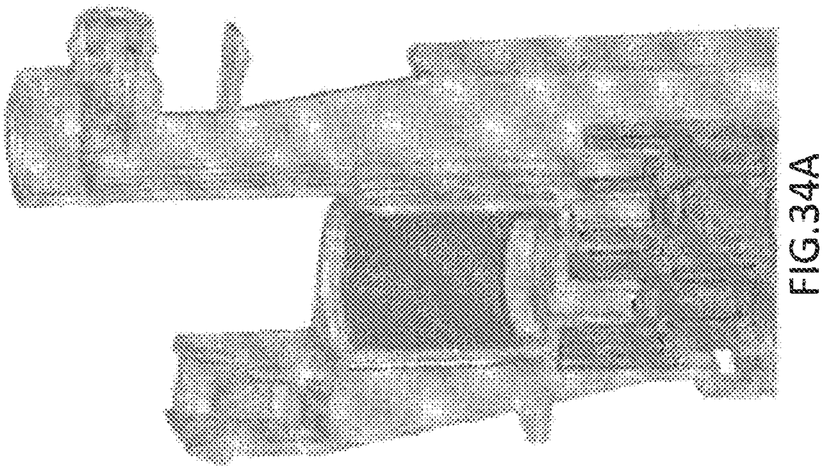
FIGS. 34A through 34C illustrate, respectively, lubrication of the piston chamber bore, lubrication of the piston seals, and insertion of the piston.
Figure 34B:
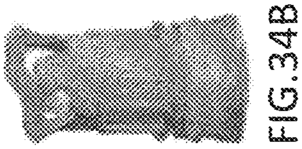
Figure 34C:
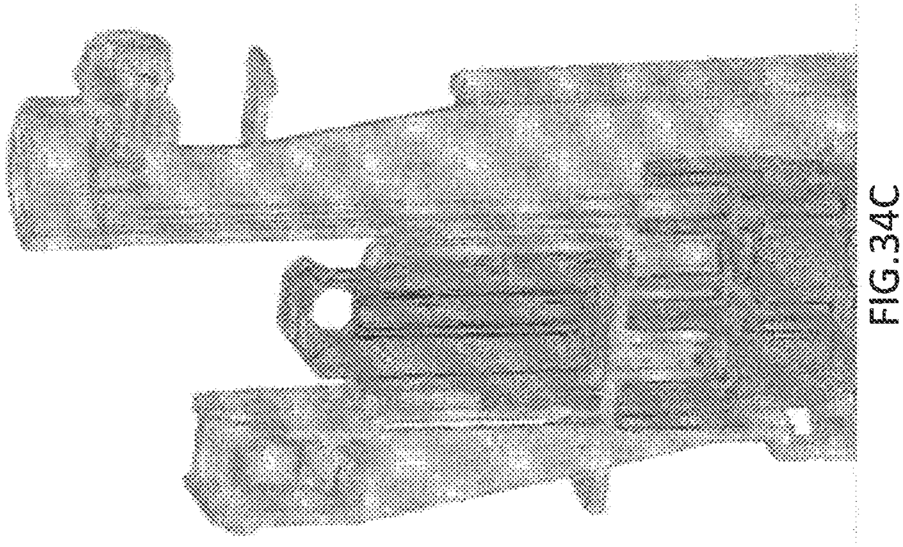

FIGS. 34A-41B illustrate the assembly procedures on top of the frame. With reference to FIG. 34A the piston chamber bore can be lubricated with a silicone type lubricant as well as the seals of the piston itself, as shown in FIG. 34B. Finally, the piston can be inserted into the piston bore as shown in FIG. 34C. FIGS. 35A through 35C respectively depict the assembly of the trigger. As shown therein, the trigger is attached to the piston and the trigger springs can be provided in place and also connected to the piston. It is noted that in FIG. 35 there is shown an alternate exemplary embodiment of the present invention where the trigger springs initially rest at the bottom vertex as shown in FIG. 35C. In an alternate exemplary embodiment according to the present invention, as shown in FIGS. 4A-5, the springs actually sit on a horizontal rib which makes it easier to pull them across via the trigger lock. Thus, FIG. 35C can be replaced with the exemplary embodiment shown in FIGS. 4A, 4B and 5 if desired.

Figure 36:
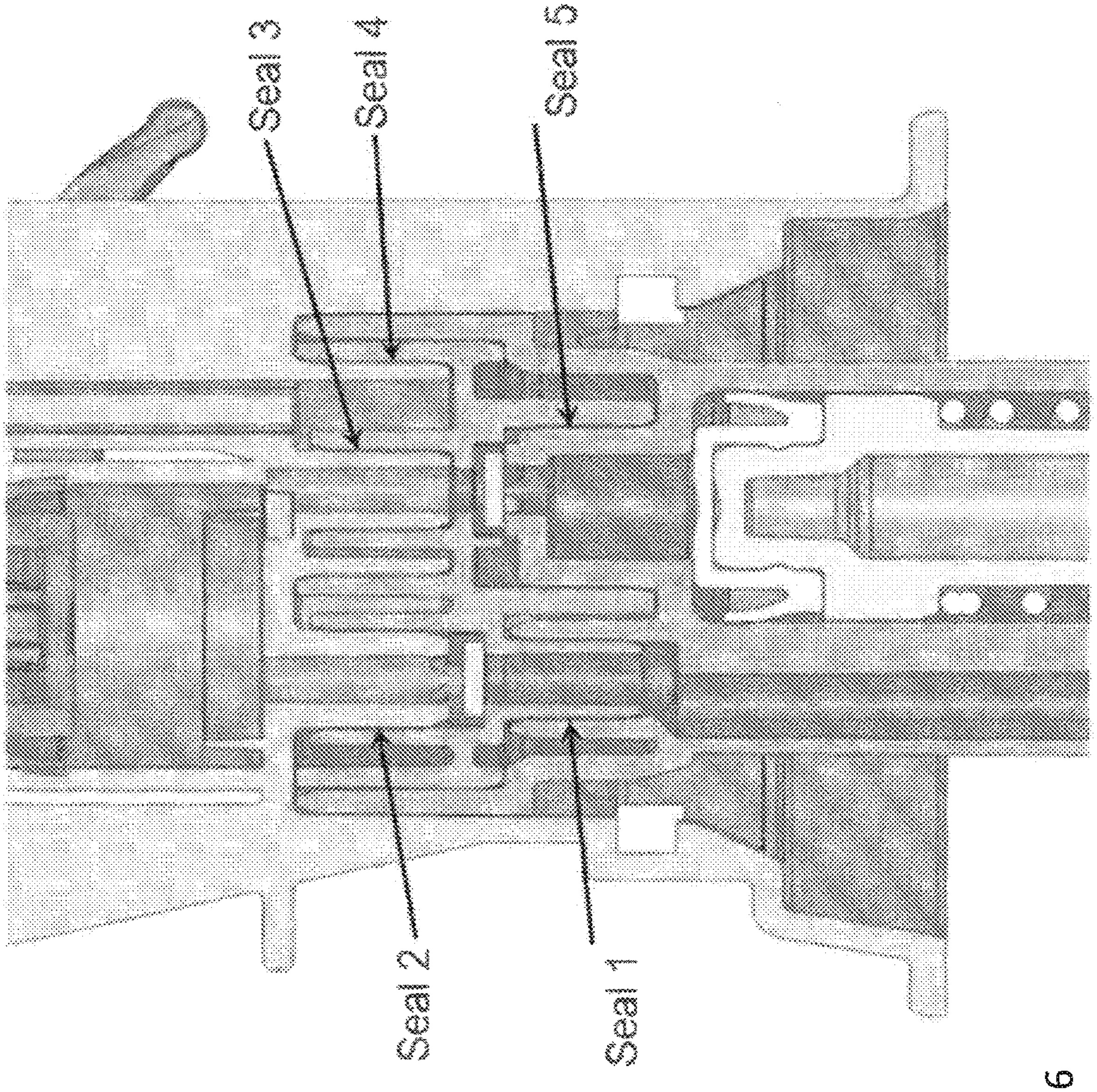
Figure 37A:
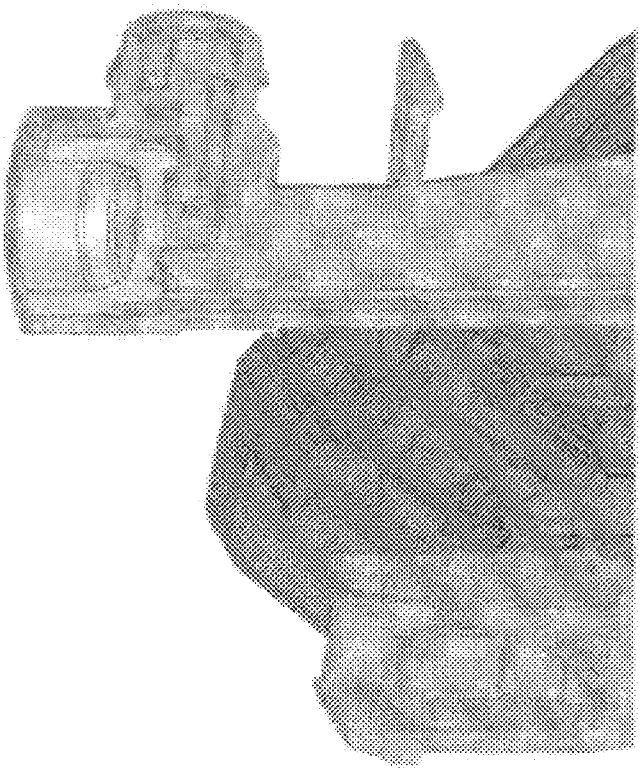
FIGS. 37A and 37B illustrate, respectively, insertion of the dome valve, and covering of the dome valve with the dome fixer and orifice.
Figure 37B:
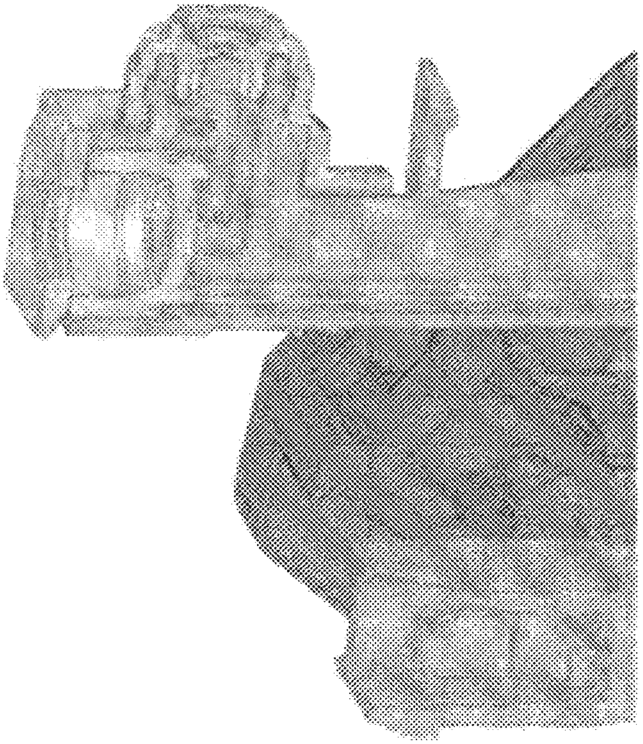
Figure 38:
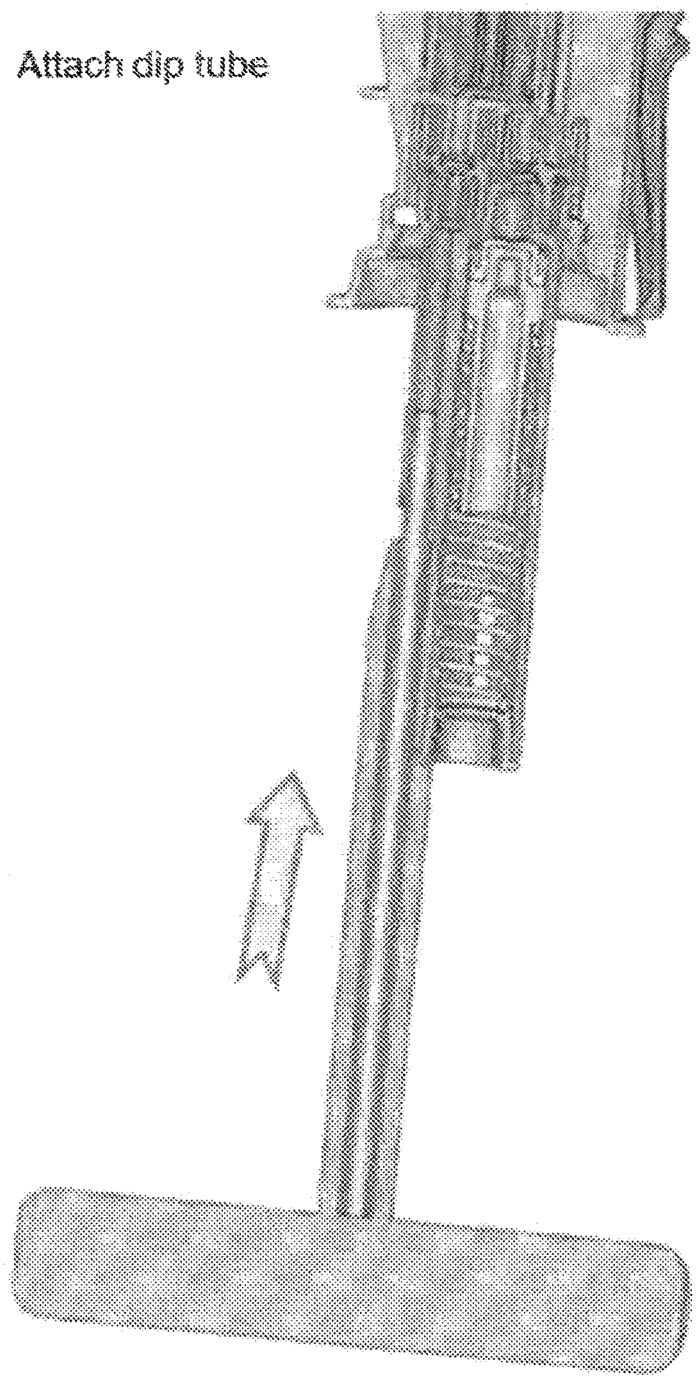
Figure 39A:
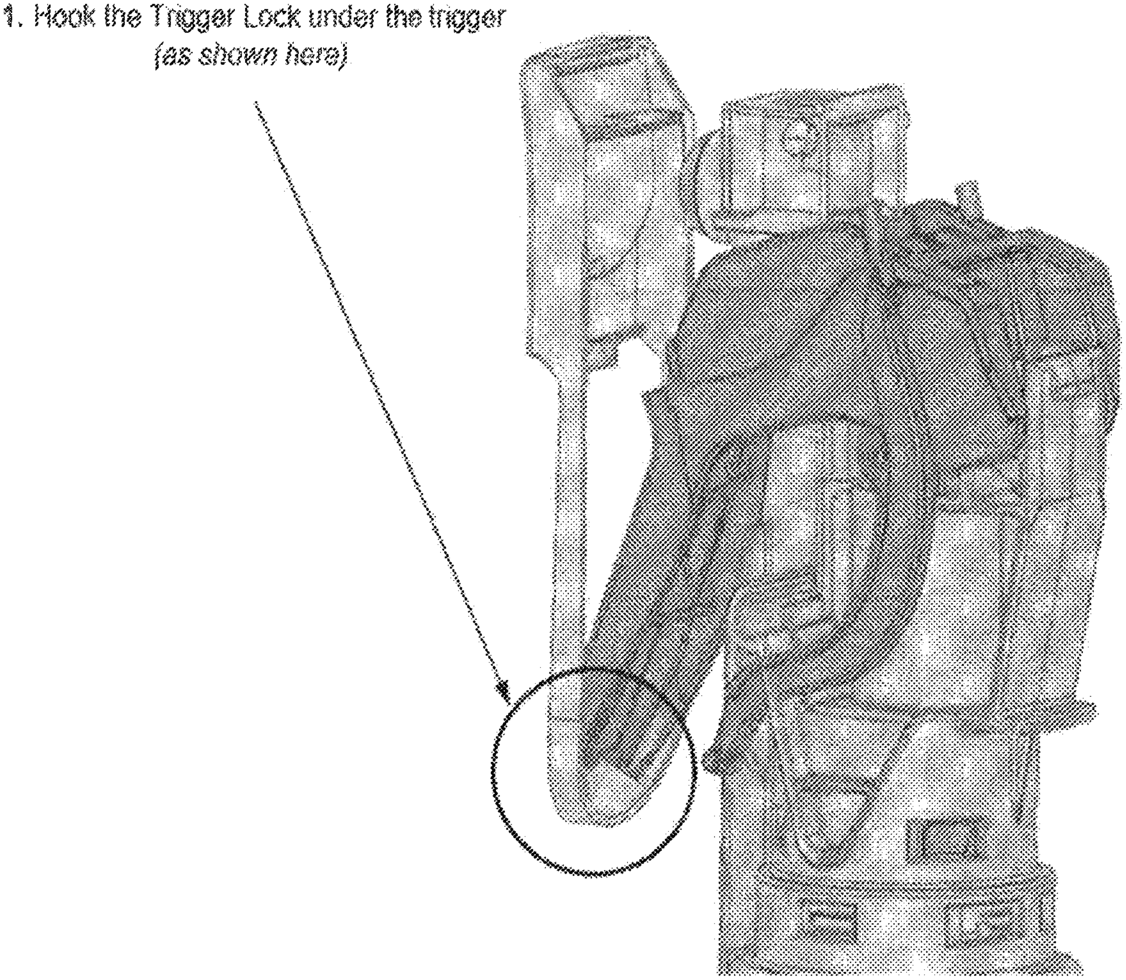
Figure 39B:
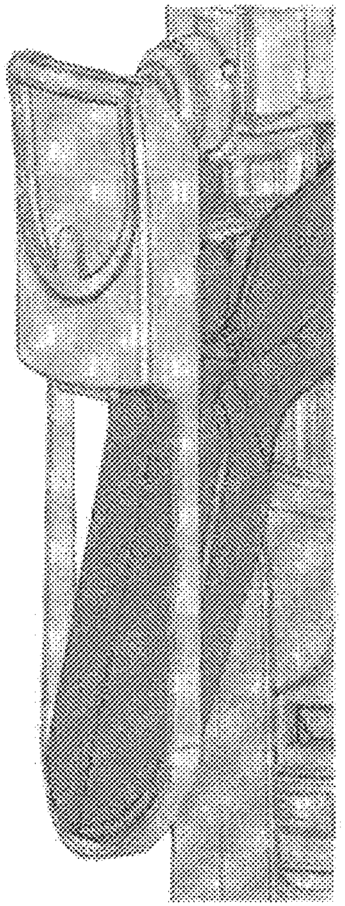
Figure 40A:
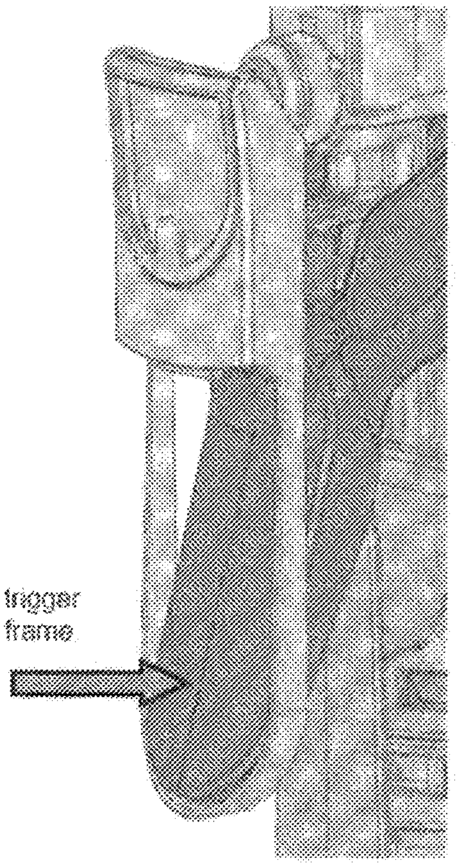
FIGS. 40A through 40C illustrate, respectively, pushing the trigger towards the frame, snapping the frame to the trigger lock, and pushing the trigger lock into position.
Figure 40B:
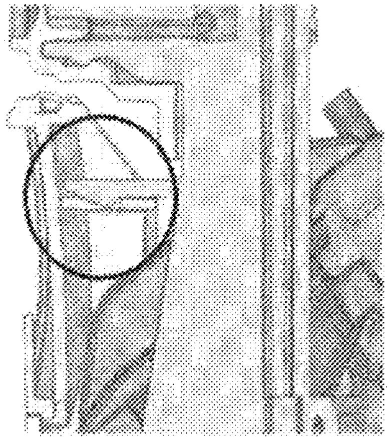
Figure 40C:
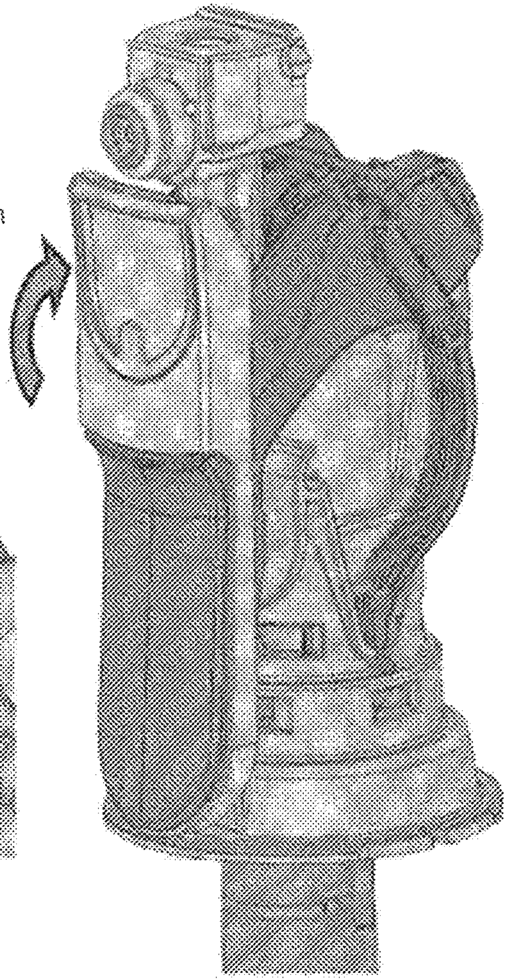

FIG. 36 illustrates the various seals operative in exemplary embodiments of the present invention. As shown, seal 1 is only subject to underpressures, wherein seals 2-5 are subjected to, for example, a maximum pressure of 10 bar. FIGS. 37A and 37B illustrates the dome valve and the dome valve being covered with the dome fixer and the orifice. FIG. 38 illustrates how the dip tube can be affixed; an assembly tool can be created to attach the tube and this tool (a handle held upside down "T" type tool) can be pushed upwards such that the dip tube is attached to the inlet tube. In exemplary embodiments of the present invention, it can be affixed to the inlet tube in such a way that a certain minimum pull out force, such as, for example, 30 N, is required to remove it.

FIGS. 39A-43B illustrate the remaining assembly steps for the trigger and the shroud. With reference thereto, in FIG. 39A, the trigger lock can be hooked under the trigger and then pressed into place, as shown in FIG. 39B. Then, as shown in FIG. 40A, at 2, the trigger can be pushed towards the frame, and at 3*a* in FIG. 40C the trigger lock can be pushed into position. As shown in FIG. 40B at 3*b*, as this is done, it can be made sure that the snap lock of the frame snaps to the trigger lock, as shown in the black circle.

Figure 35A:
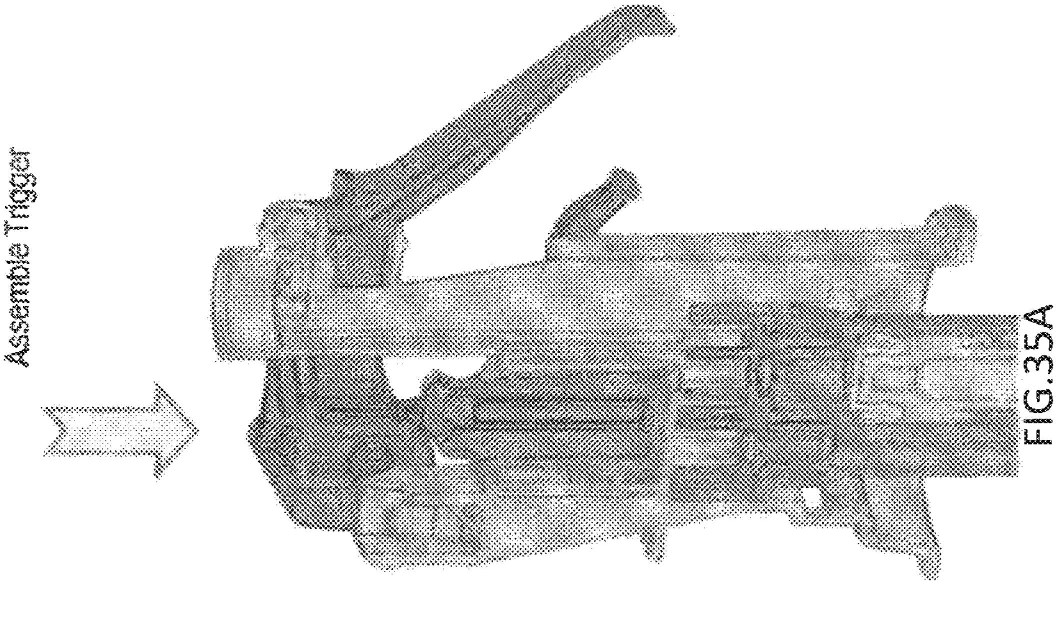
FIGS. 35A through 35C illustrate, respectively, attachment of the trigger to the piston, connecting the piston by pulling the trigger, and providing the trigger springs in place and also connected to the piston.
Figure 35B:
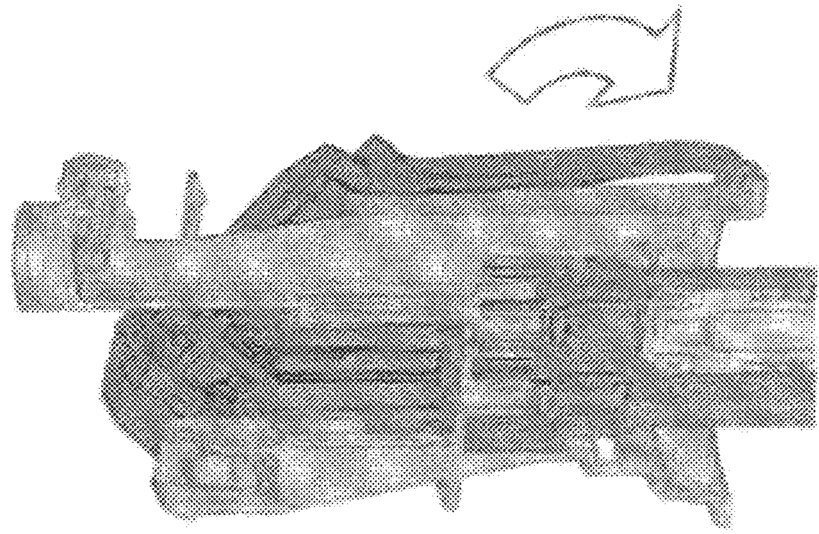
Figure 35C:
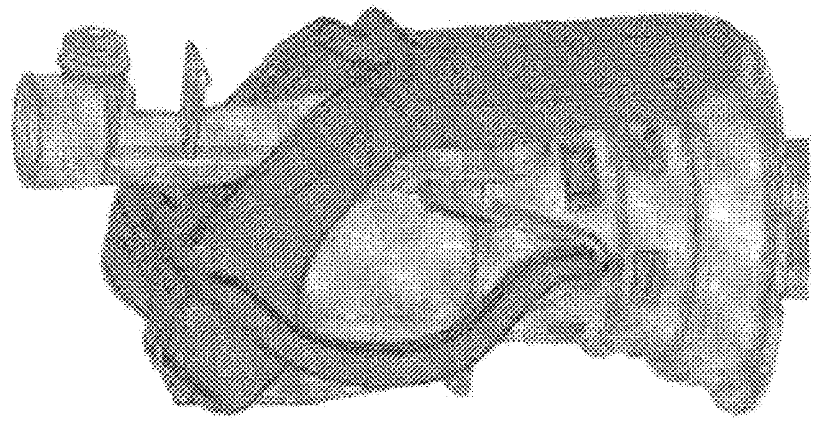
Figure 41A:
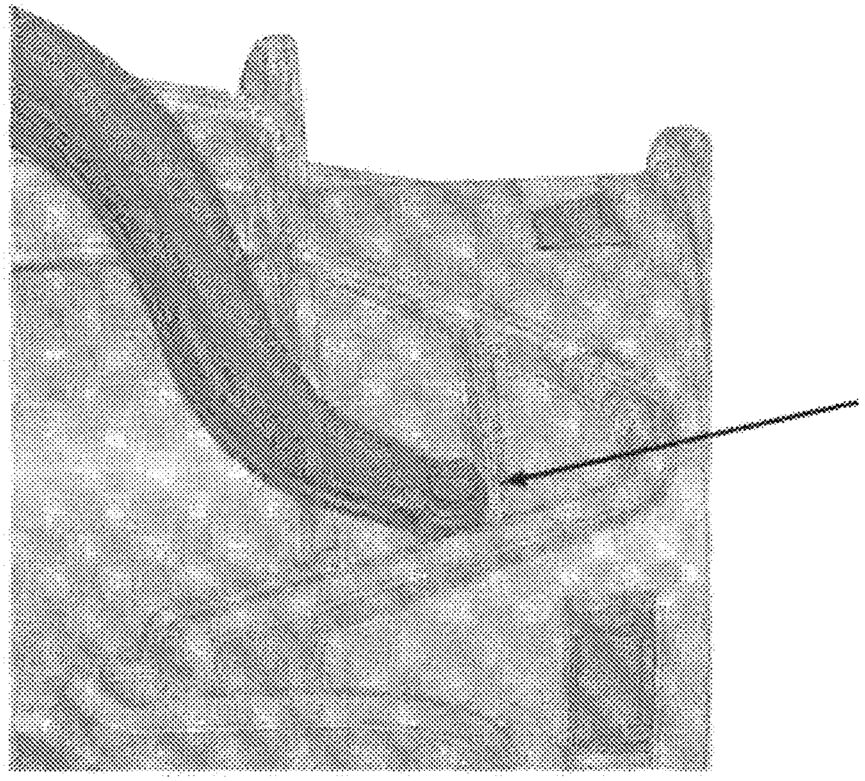
FIGS. 41A and 41B illustrate placement of the trigger springs in the correct position on top of a horizontal rib of the frame, and the frame and trigger after such placement.
Figure 41B:
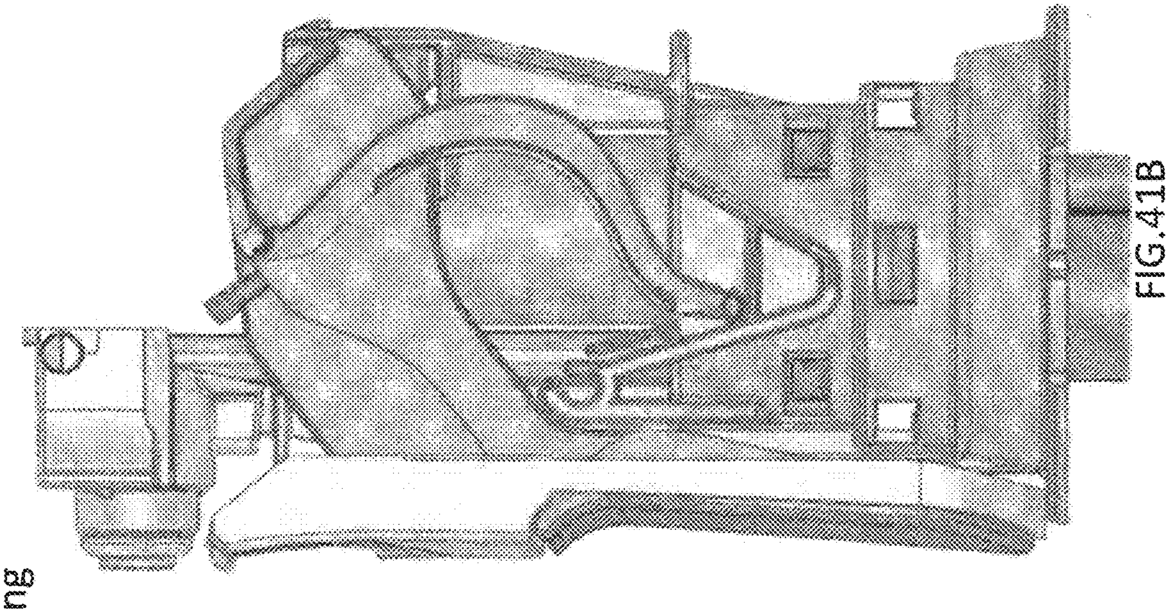
Figure 42A:
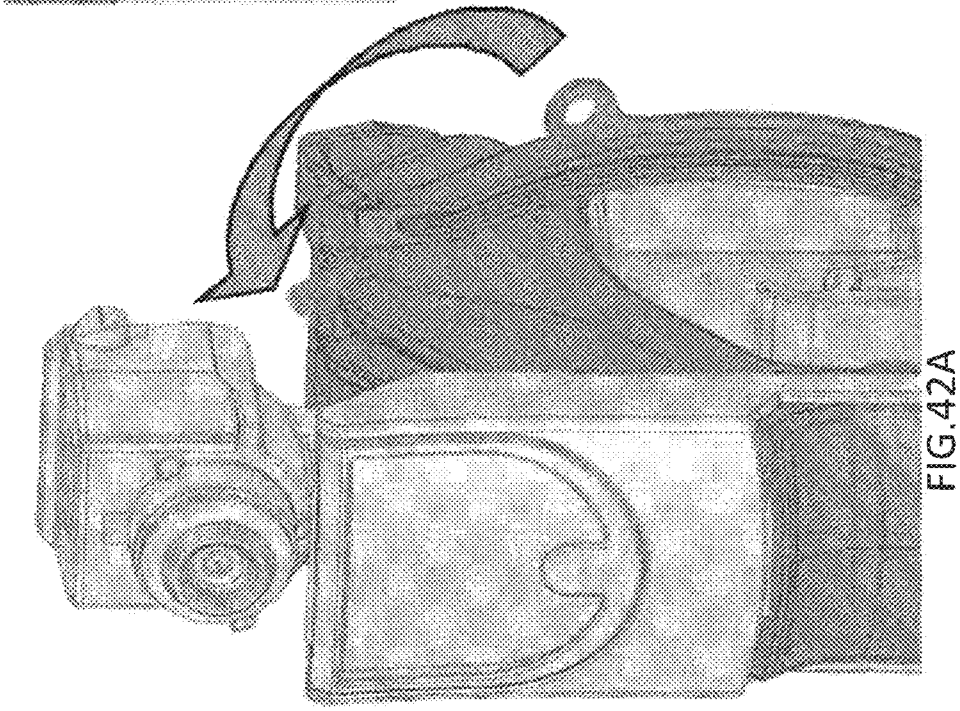
FIGS. 42A through 42C illustrate, respectively, use of plastic strings to attach the bottom of the springs under tension to the top of the trigger so the bottom of the spring can lock into the semi-circular holder at the top of the vortex, and a side view of the string, spring trigger and semi-circular holder.
Figure 42B:
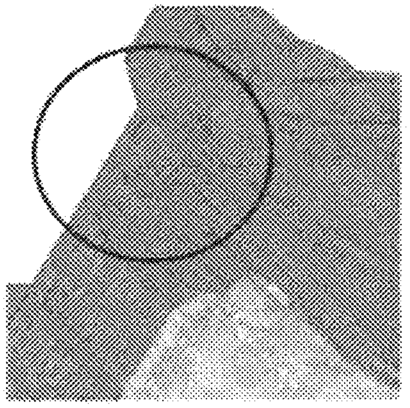
Figure 42C:
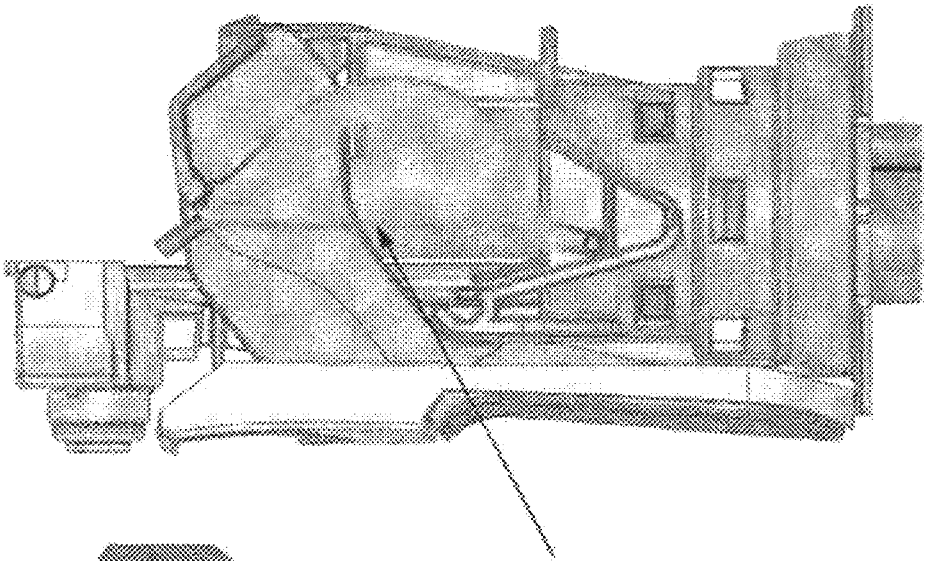
Figure 43A:
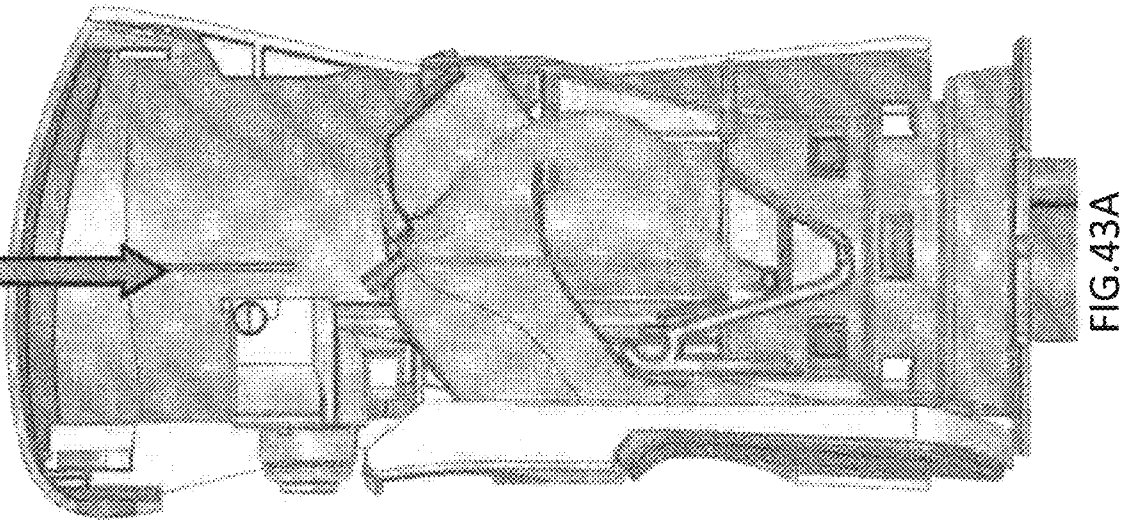
FIGS. 43A and 43B illustrate, respectively, placement of the shrouds.
Figure 43B:
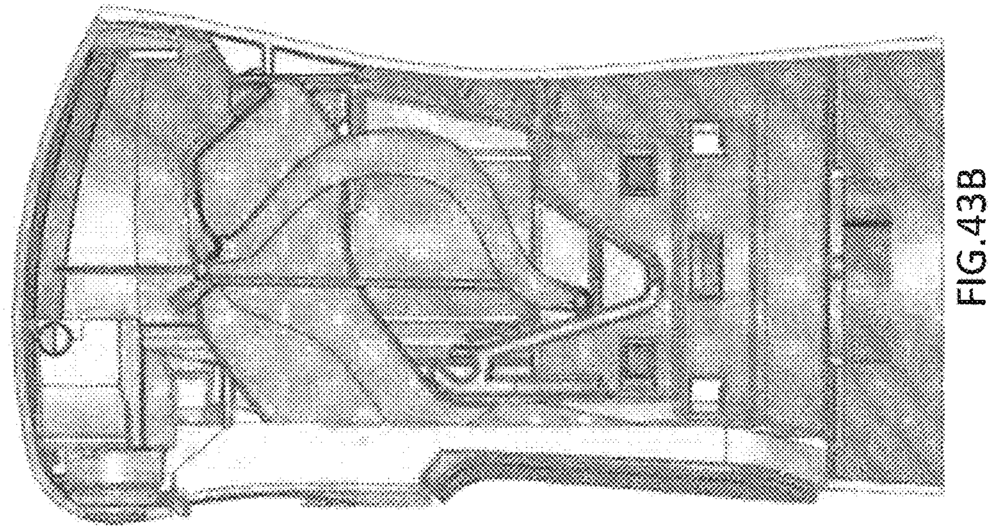
Figure 44B:
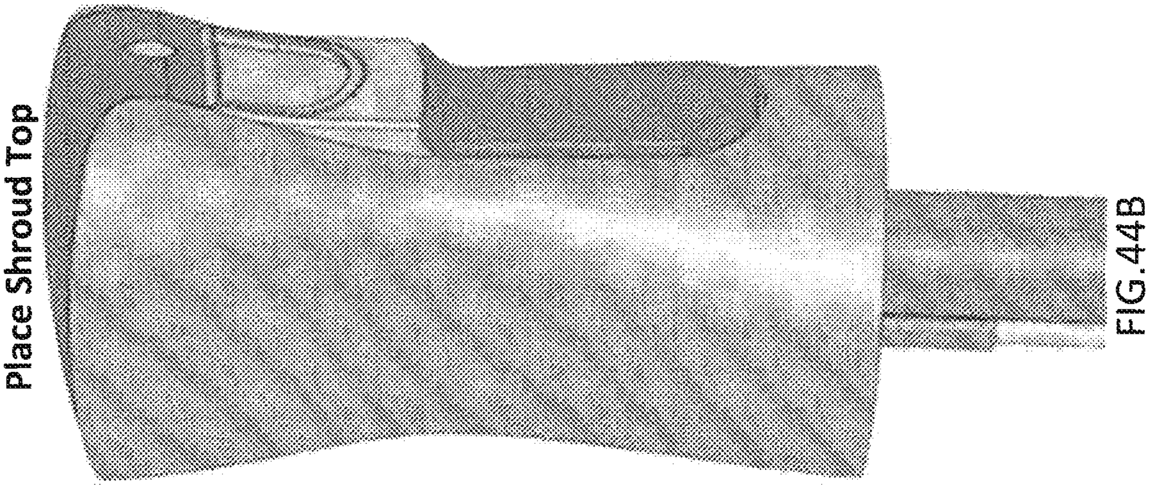
Figure 44A:
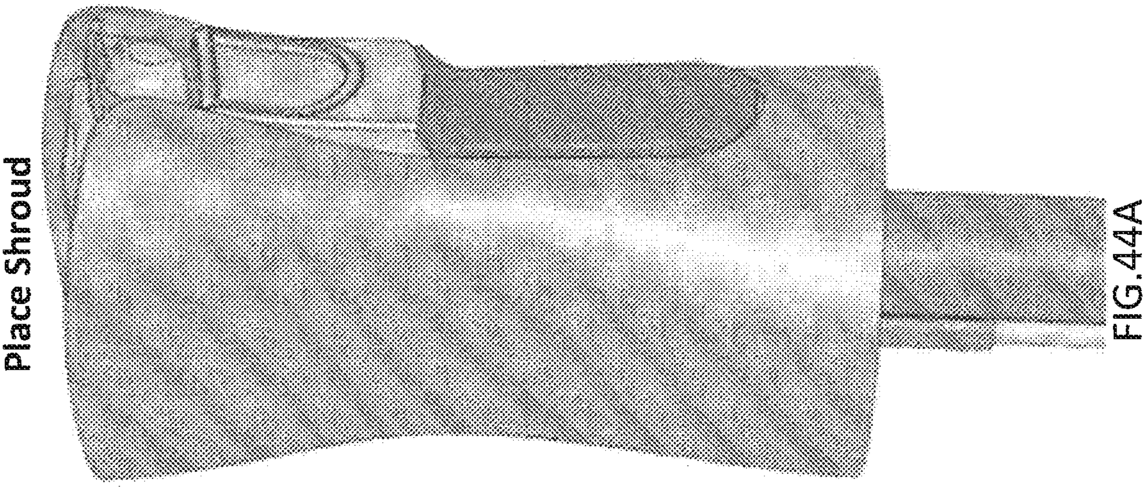
FIG. 44A shows the shroud on the frame.

FIGS. 41A and 41B illustrate exemplary placement of the springs. As noted above, instead of resting initially at the bottom of the vortex of the frame, in alternate exemplary embodiments of the present invention there can be a horizontal rib provided on the frame on which the spring can be initially placed. This is different than what is shown in FIG. 35C. With reference again to FIG. 41A, at 4, the springs of the trigger can be placed In the correct position, on the horizontal rib of the frame, and the finished products are therefore shown in FIG. 41B. With reference to FIGS. 42A through 42C, plastic strings can be used to attach the bottom of the spring under tension to the top of the trigger such that when the process shown above in FIGS. 4A, 4B and 5 is performed by a user, the bottom of the spring can lock into the semi-circular holder at the top of the vortex, as shown in FIG. 5. The strings can be attached to the pins, as shown in FIGS. 42A and 42B, and fixation can be done by welding, for example. Finally, as shown in FIGS. 43A and 43B, shrouds can be placed over the assembly resulting in the device as shown in FIG. 44A. Once the shroud top is subsequently placed on the device, the device as shown in FIG. 44B results. This completes the assembly procedures for an exemplary metered (continuous spray) Flairosol embodiment according to exemplary embodiments of the present invention.

B. Activated Flairosol

Figure 45B:
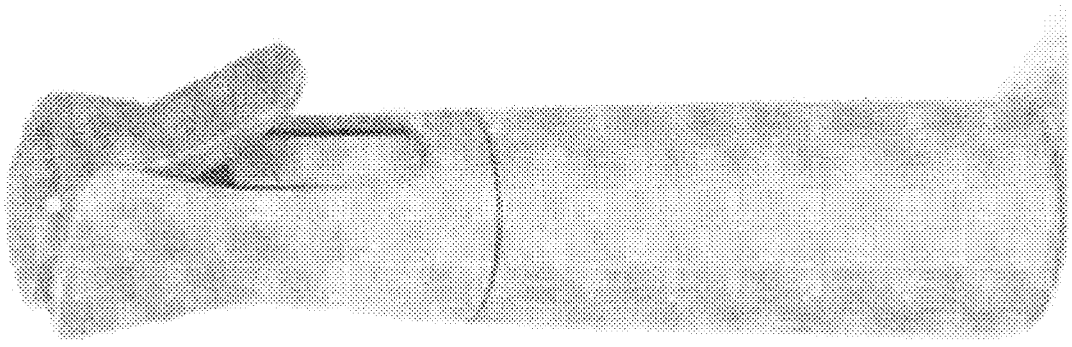
FIG. 45B depicts an exemplary activated Flairosol device according to an exemplary embodiment of the present invention.
Figure 46A:
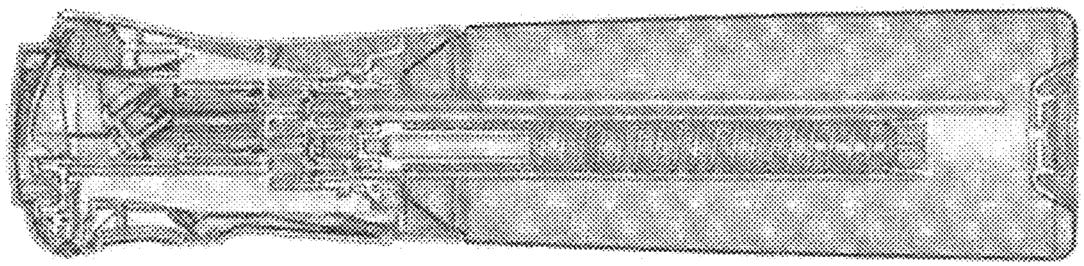
FIGS. 46A, 46B and 46C respectively depict schematic cross-sectional views of an exemplary activated Flairosol dispensing device as attached to a bottle with the trigger lock in place, by itself without the trigger lock with a dip tube, and by itself without the trigger lock and without a dip tube, according to an exemplary embodiment of the present invention.
Figure 46B:
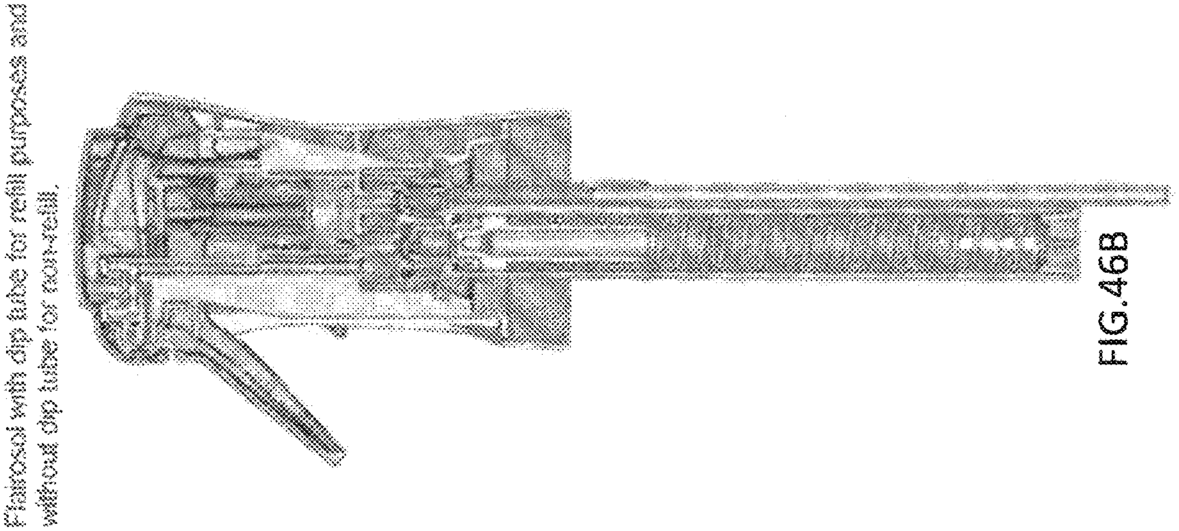
Figure 46C:
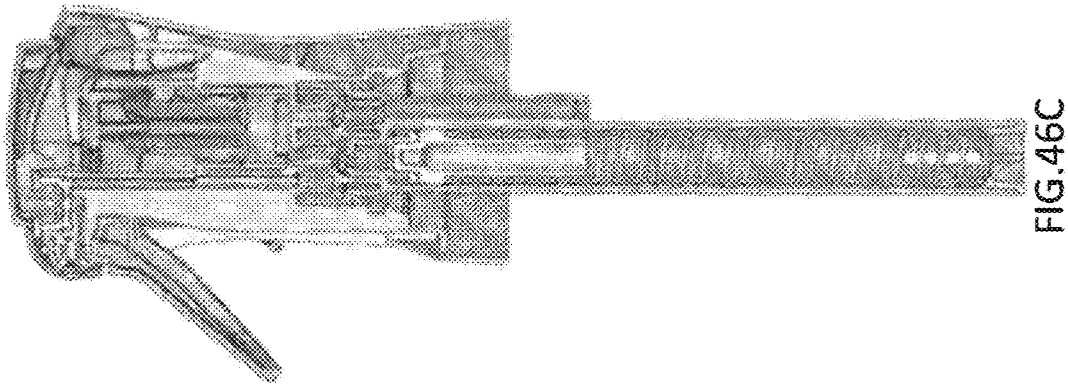
Figure 47:
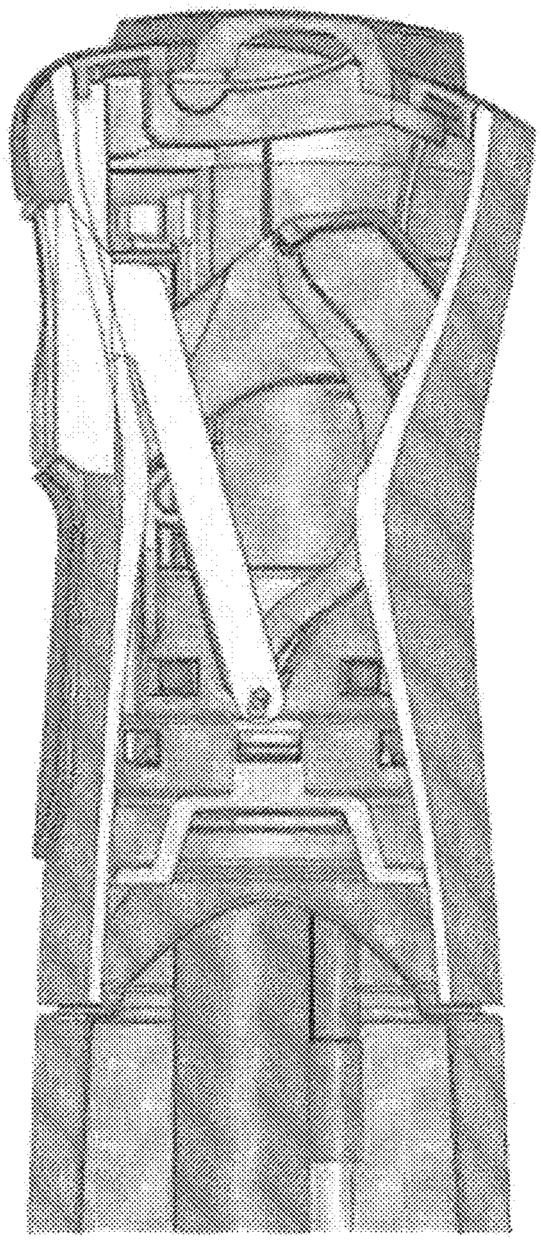
FIG. 47 depicts a cut-away view of the exemplary activated Flairosol dispensing device of FIG. 45 with the trigger lock in place.

FIGS. 45B-60B illustrate an alternative exemplary embodiment of the present invention, known as "activated Flairosol," where a user must actuate the device, even when fully pressurized, to dispense the liquid FIG. 45B shows a completed activated Flairosol device, and FIGS. 46A and 46B show a schematic cut-away, similar to that shown above for metered Flairosol, with an activated Flairosol dispensing head as attached to a liquid filled bottle with a dip tube (FIG. 46A), and then the Flairosol dispensing head shown by itself, both with (FIG. 46B) and without (FIG. 46C) a dip tube, respectively. FIG. 47 illustrates the exemplary activated Flairosol device as normally packaged with a trigger lock in place. It is also noted that this is the alternate exemplary embodiment of the activated Flairosol device where the bottom of the springs sit at the bottom notch or vertex of the frame and not on a horizontal rib as described above (FIGS. 4A-5; FIGS. 43A and 43B).

Figure 48A:
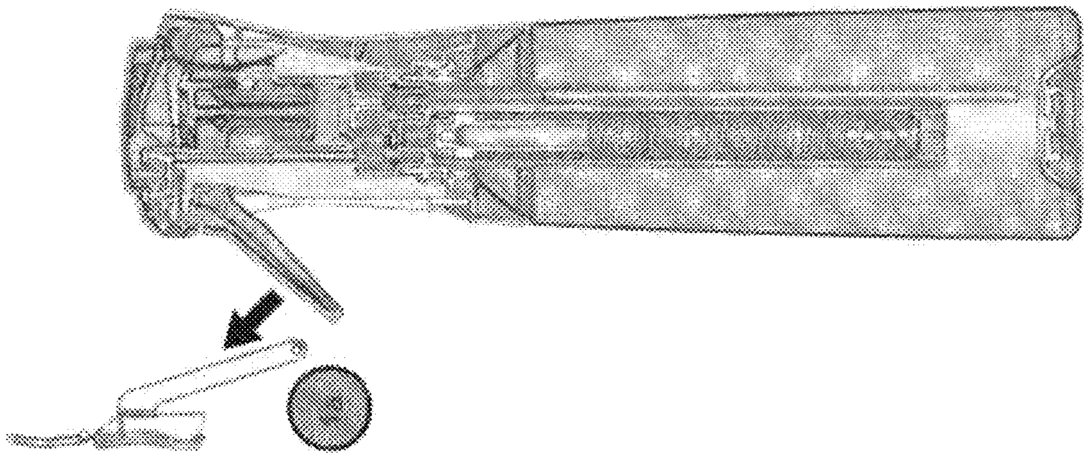
FIGS. 48A and 48B depict the exemplary device of FIG. 45 in stages of removal of the trigger lock and positioning of the trigger springs.
Figure 48B:
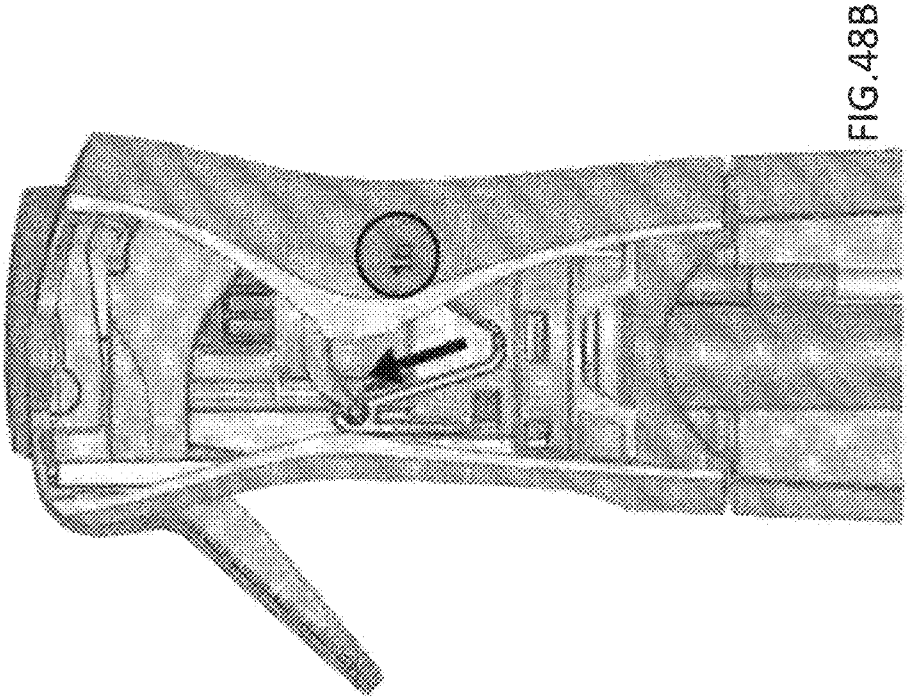
Figure 49:
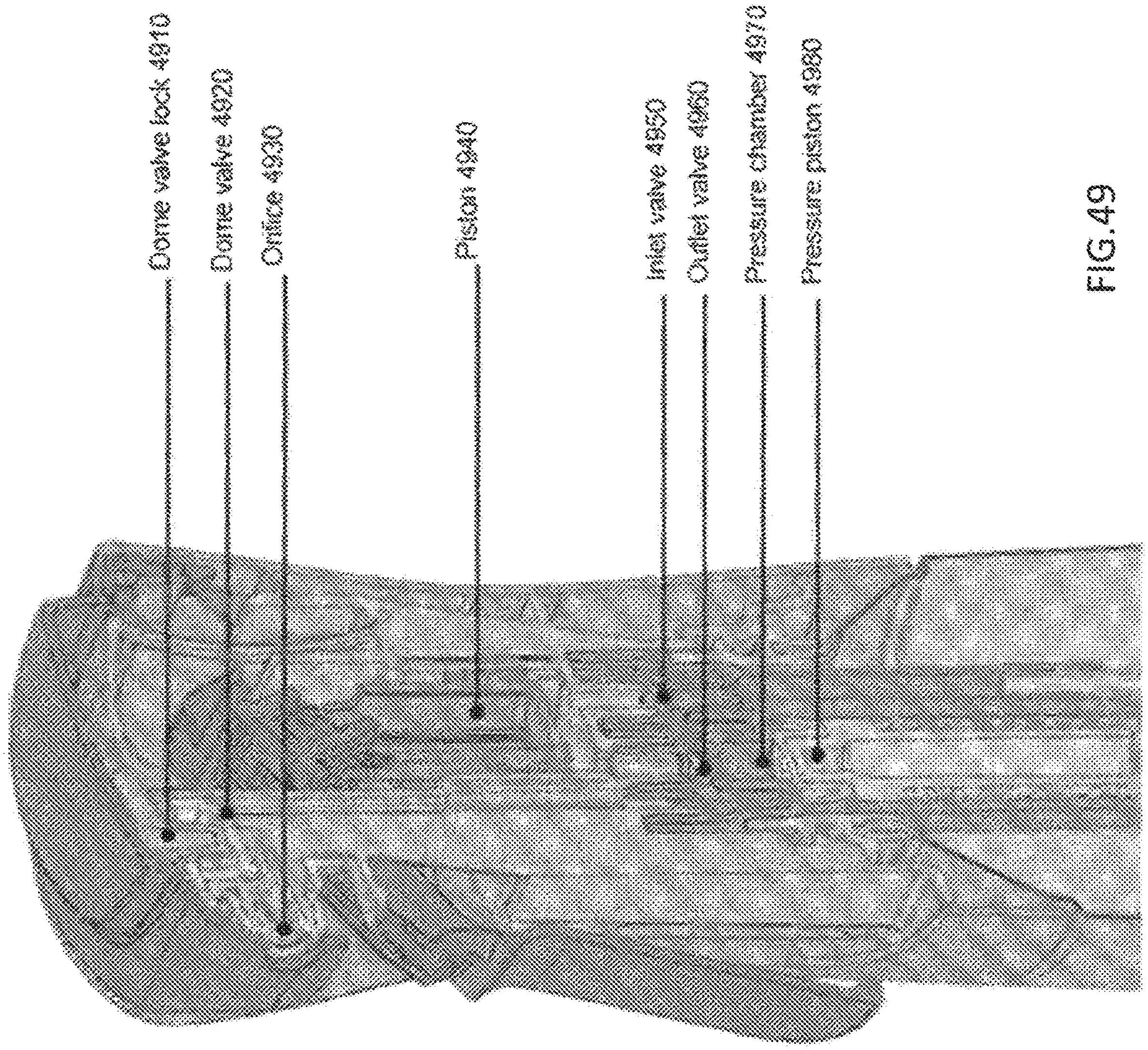
FIG. 49 depicts detail of various elements of the exemplary activated Flairosol device of FIGS. 44A and 44B according to exemplary embodiments of the present invention.

FIGS. 48A and 48B illustrate the trigger lock as being removed as pulled by a user and this process pulling the springs of the trigger into position at 1*b* as shown in FIGS. 48B. FIG. 49 illustrates the exemplary elements of activated Flairosol; they are the same as shown above in connection with FIG. 14, except for dome valve lock 4910 which is an element unique to the activated Flairosol embodiment.

Figure 50B:
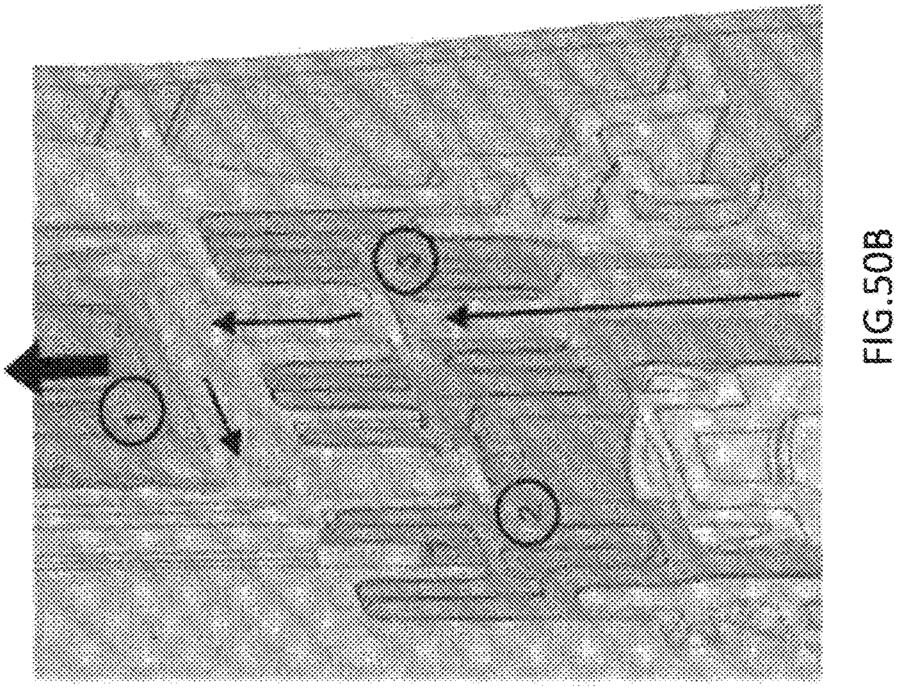
FIGS. 50A and 50B respectively illustrate full and magnified views of a trigger release/liquid draw step of an exemplary activated Flairosol device according to exemplary embodiments of the present invention.
Figure 50A:
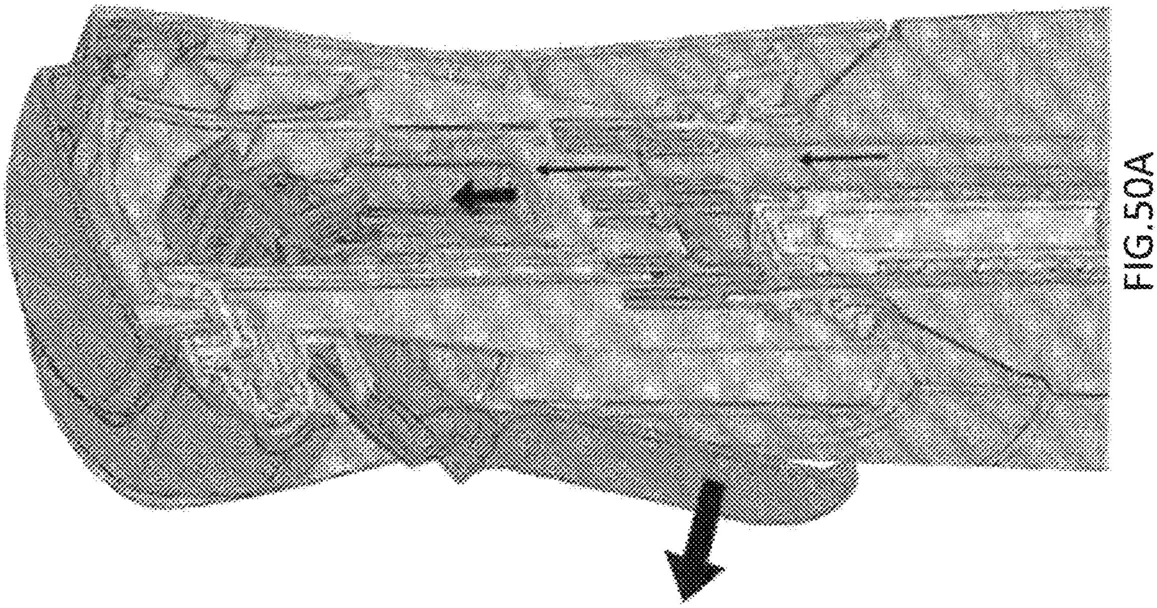

FIGS. 50A-53 illustrate the trigger release liquid uptake and trigger pulled front/liquid piston downstroke cycles according to exemplary embodiments of the present invention. With reference to FIG. 50A, the trigger can be released and moved out which causes, as shown in FIG. 50B at 1, the piston to move up and draw liquid into the piston chamber, and at 2, the outlet valve can be closed due to the underpressure and the inlet valve can be open to let the liquid pass from the Flair bottle into the piston chamber. Here the underpressure moves the inlet valve upwards into its open position.

Figure 51B:
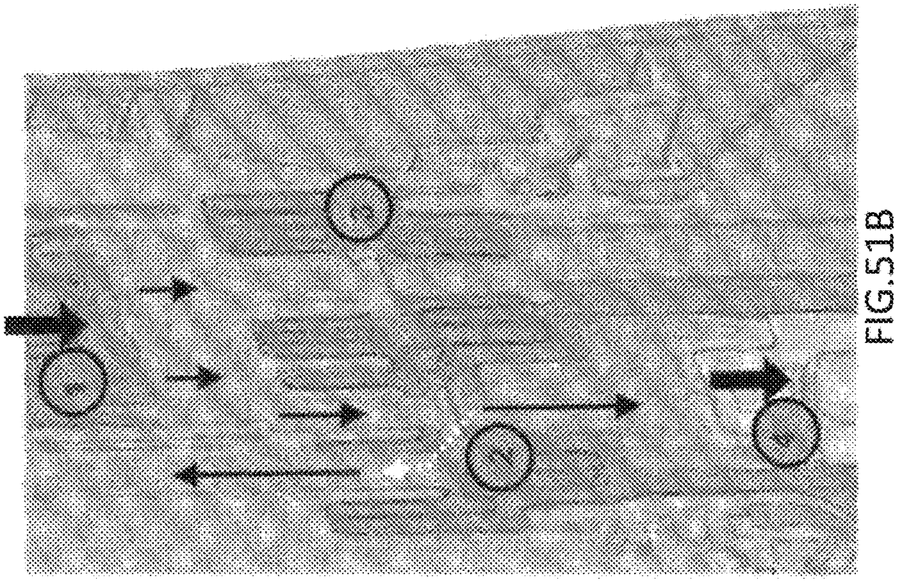
FIGS. 51A and 51B illustrate the exemplary Flairosol device of FIG. 45 where the trigger is pulled, and the liquid passes to the pressure chamber and to the dome valve (which is locked by the dome valve lock), according to exemplary embodiments of the present invention.
Figure 51A:
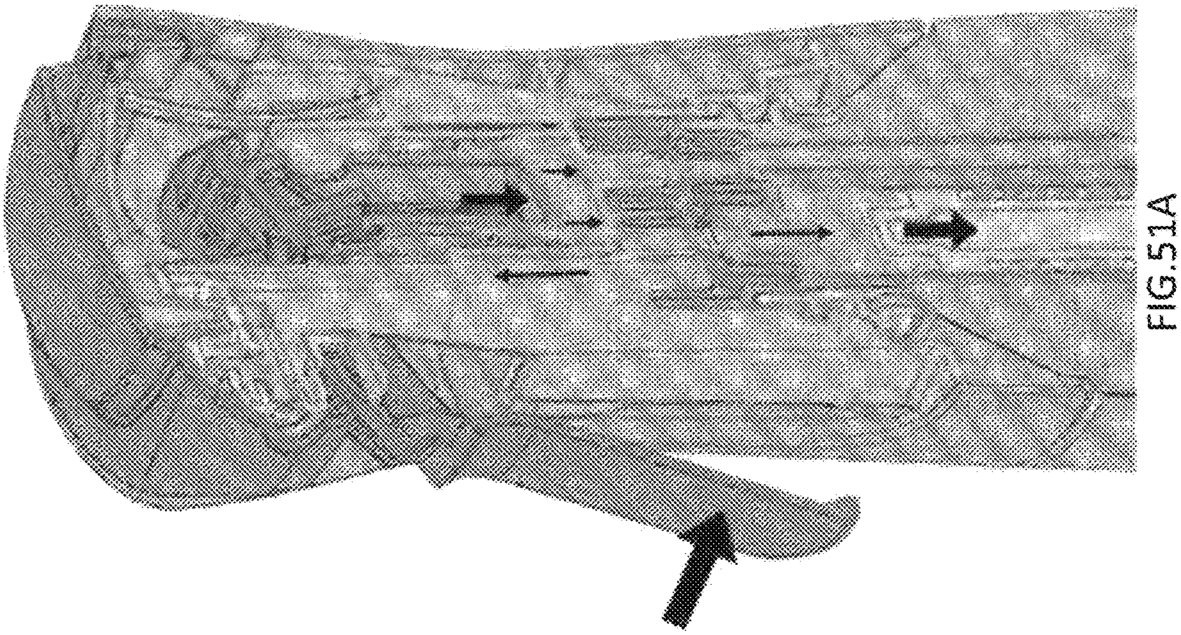

FIGS. 51A and 51B show the trigger pulling, piston downstroke phase, and here, as shown in FIG. 51B, the trigger is pulled and moves inward at 1, the piston moves down and the piston thus pushes liquid into the pressure chamber and toward the dome valve. At 2, the outlet valve is opened, letting the liquid pass to the pressure chamber and to the dome valve. It is noted that pressure moves this outlet valve downward into its open position. At 3, the inlet valve closes, preventing the liquid from being pushed back into the container (the pressure of the liquid being pushed down moves it downwards into closed position). Finally, at 4, the pressure of the liquid pushes down the pressure piston which compresses the spring underneath the pressure piston.

Figure 52B:
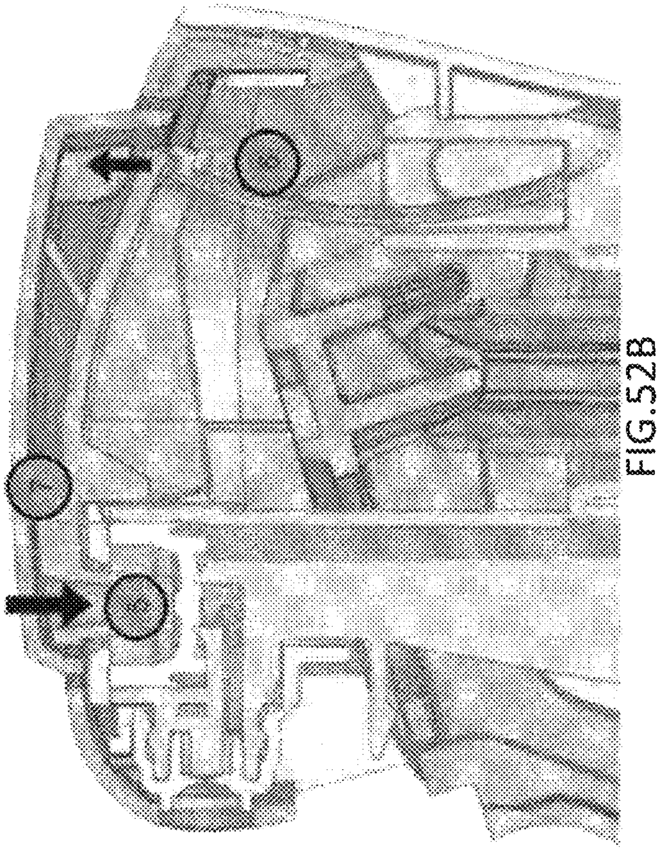
FIGS. 52A and 52B illustrate the dome valve lock preventing the dome valve from opening.
Figure 52A:
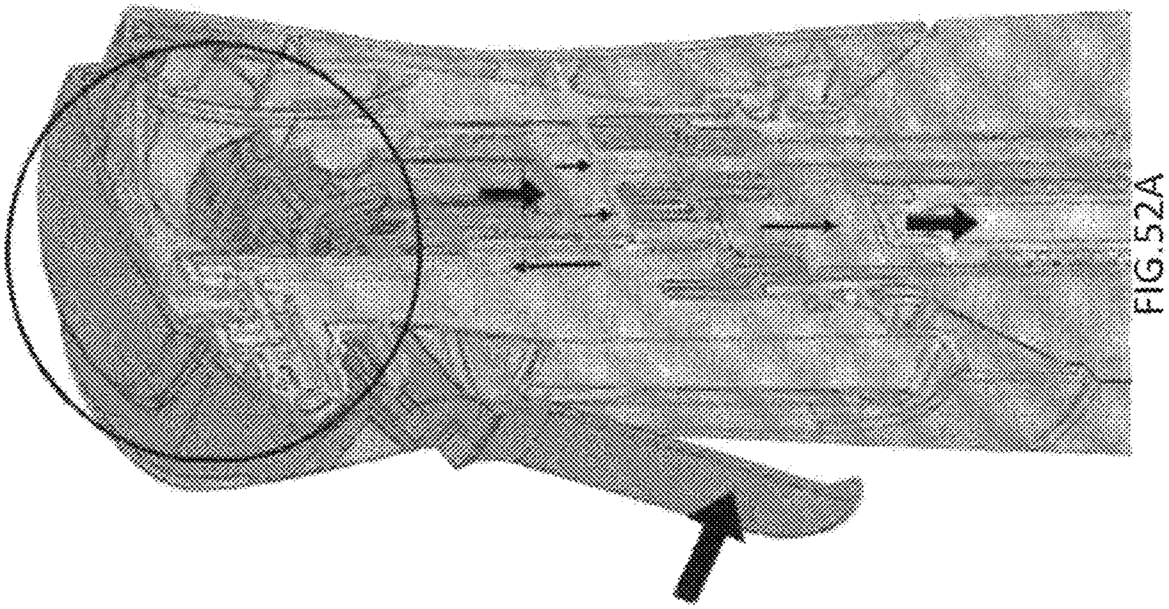

This process continues as shown in FIG. 52B were at 5, for example the dome valve lock, being in its downward position, prevents the dome valve from opening. It acts like a lever. At 6 a spring integrated in the dome lock delivers the necessary force to hold it in the downward position. At 7 it is showing the pivot point of the dome valve lock. In connection with FIG. 53, it is shown that the trigger pulling and trigger release steps are repeated four times to fill up the pressure chamber in order to get a spray for a defined number of seconds, such as, for example, X seconds. This is because, unlike the metered Flairosol embodiment described above, the user first primes the pressure chamber using an activated Flairosol device. Then when he is ready to spray he presses down on the button which releases the dome lock and thus the spray continues without any further pumping as long as he or she holds down the button or other activation device. An activated Flairosol device is simply a metered Flairosol device with the addition of a dome lock, so that a user can, by continuing to push on the dome lock release, create a continuous spray condition by continuing to pump, as well.

Figure 54B:
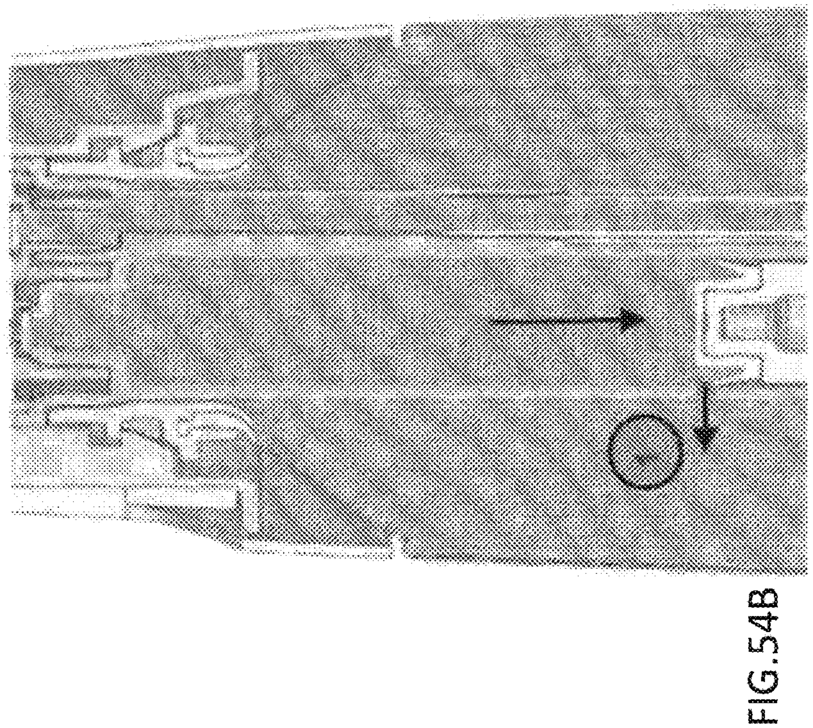
FIGS. 54A and 54B am full and magnified views illustrating an overflow outlet of an exemplary pressure chamber of the exemplary Flairosol device of FIG. 45 according to exemplary embodiments of the present invention.
Figure 54A:
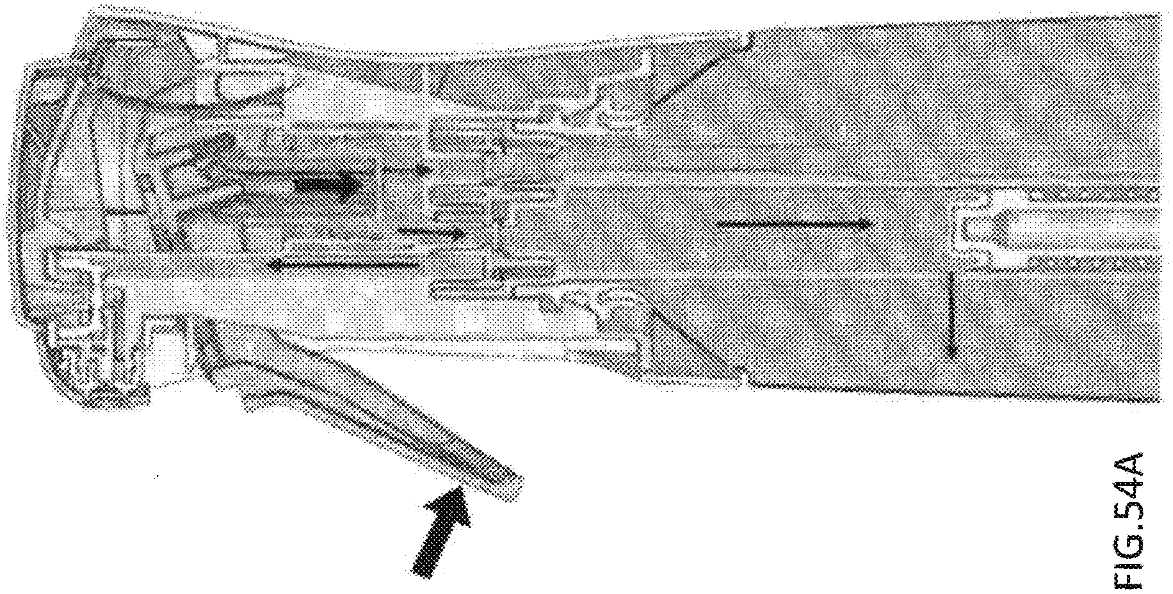

FIGS. 54A and 54B show the familiar liquid overflow condition as described above. Here, of course, in the activated Flairosol exemplary embodiment, the maximum pressure which the liquid in the pressure chamber (and thus the spring) is allowed to reach is generally higher, so that more liquid can be stored in the pressure chamber, so that once the user has filled the pressure chamber, she can spray a significant amount by actuating the device. Therefore the overflow valve is generally placed lower relative to its placement in the metered Flairosol exemplary embodiment, as described above, to lengthen the pressure chamber. For example, in some exemplary embodiments, a metered embodiment can have a 3-4 cc pressure chamber, and an activated embodiment can have, for example, a 5.0-6.5 cc pressure chamber Various other sizes can be utilized.

Figure 55B:
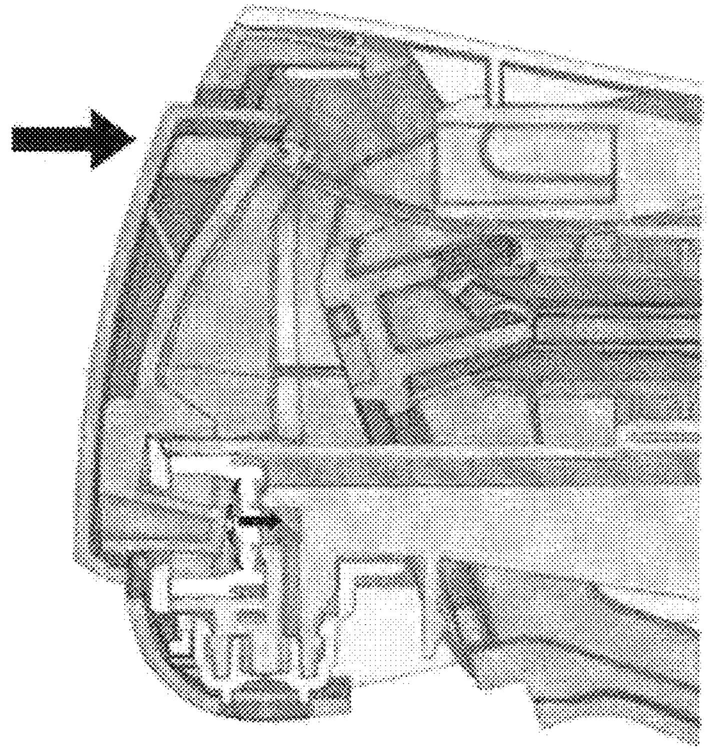
FIGS. 55A and 55B am full and magnified views illustrating the conditions under which the dome valve opens and doses in the exemplary activated Flairisol device of FIG. 45 according to exemplary embodiments of the present invention.
Figure 55A:
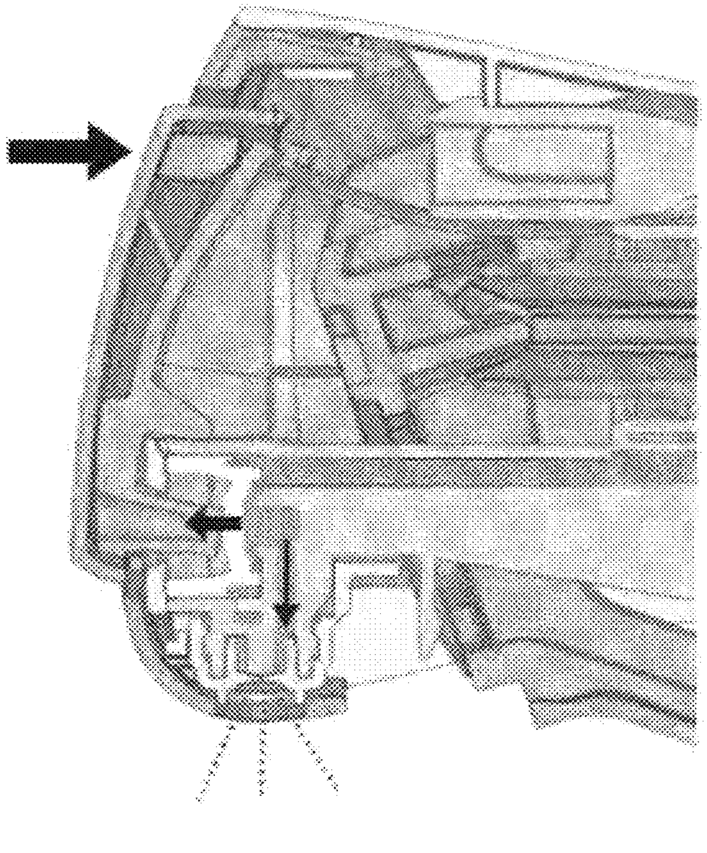
Figure 56:
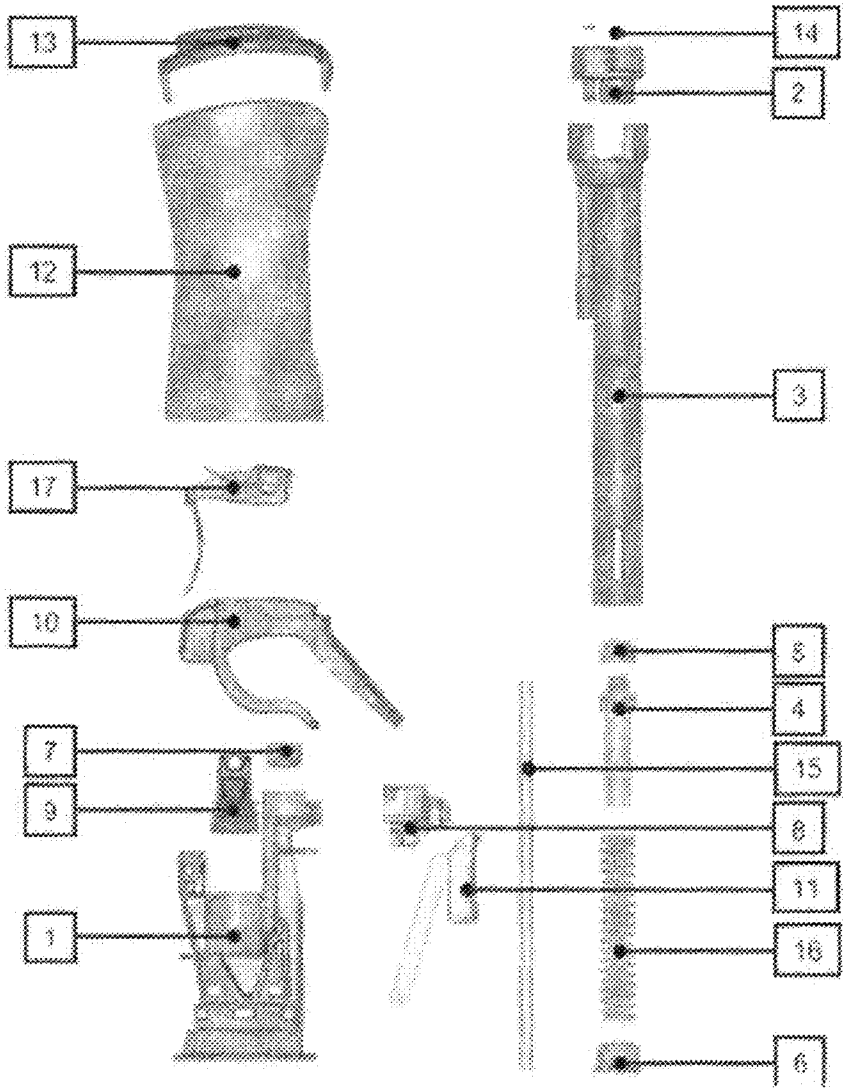
FIG. 56 depicts exemplary parts for an exemplary activated Flairosol embodiment according to exemplary embodiments of the present invention.

FIGS. 55A and 55B illustrate the opening and closing of a dome valve in exemplary activated Flairosol embodiments. With reference to FIG. 55A, when the top button is pushed, the dome valve lock releases the dome valve so that it can open. The liquid pressure in the channel forces the dome valve to open and liquid passes the dome valve to the orifice creating the desired spray. When the button is released by a user, the dome valve lock forces the dome valve to close once again. Similarly, with reference to FIG. 55B, even when the button is pushed, the dome valve will close when the liquid pressure reaches too low a value, just as in the metered Flairosol case, as noted above. The tension of the dome makes it close at a preset pressure value and, as noted above, it can close very suddenly in exemplary embodiments. This is done, as noted, to ensure a good spray pattern from start to finish and to prevent dripping, thus a sharp drop off when closing. FIG. 56 shows exemplary parts of the activated Flairosol embodiment. These parts are the same as those shown above for the metered Flairosol except for the fact that Dome Lock 17 is the novel additional element unique to activated Flairosol.

Figure 57:
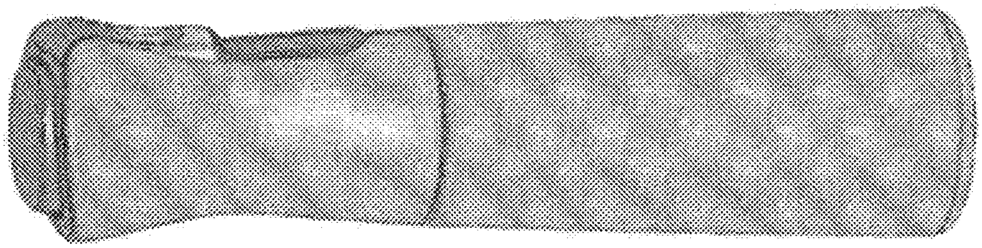
FIG. 57 depicts a fully assembled activated Flairosol device according to exemplary embodiments of the present invention.
Figure 58:
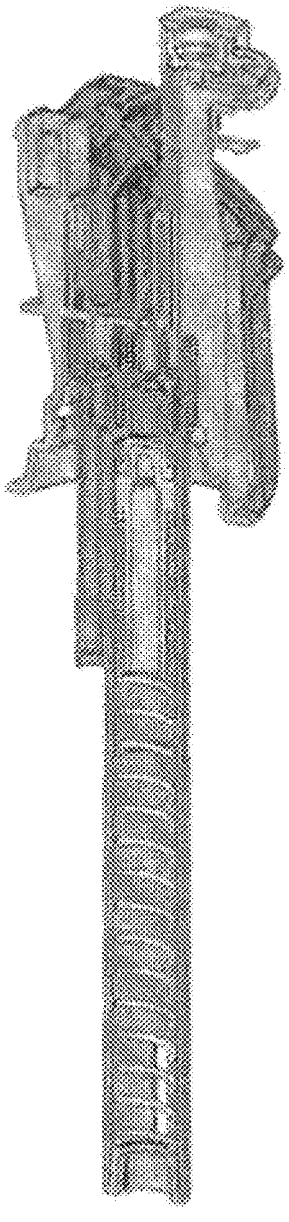
Figure 59A:
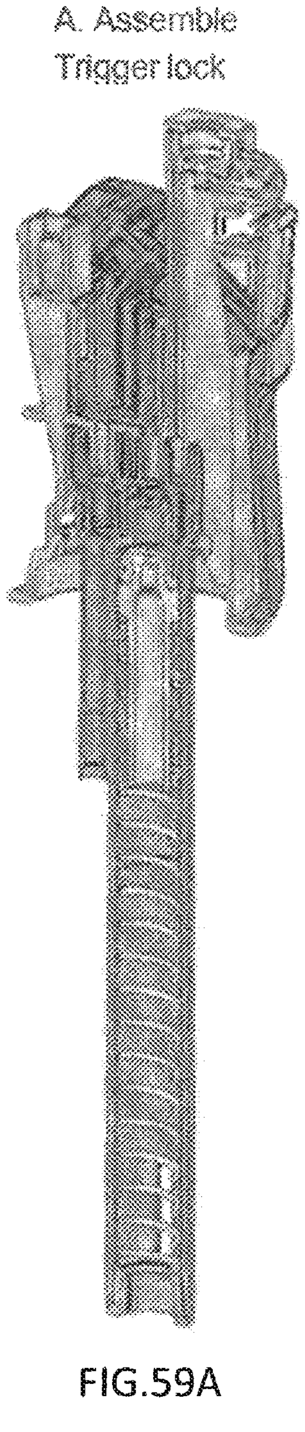
FIGS. 59A through 59C respectively illustrate assembly of the trigger lock, placement of the dome lock, and placement of the shroud.
Figure 59B:
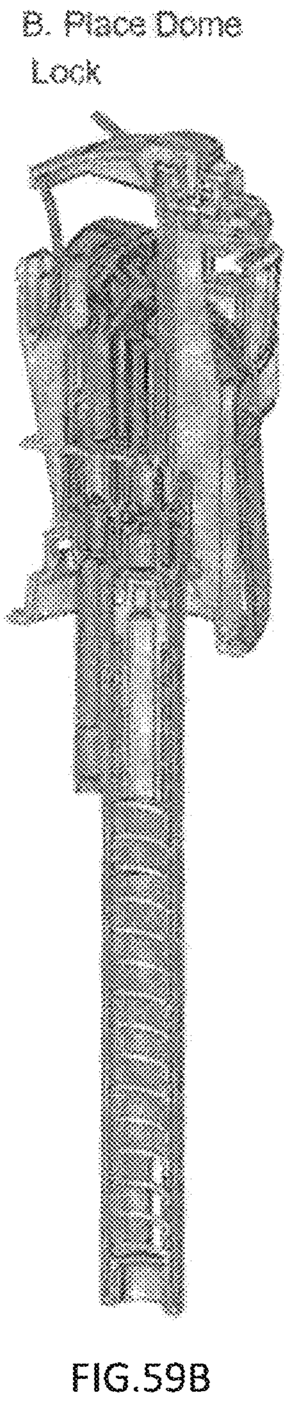
Figure 59C:
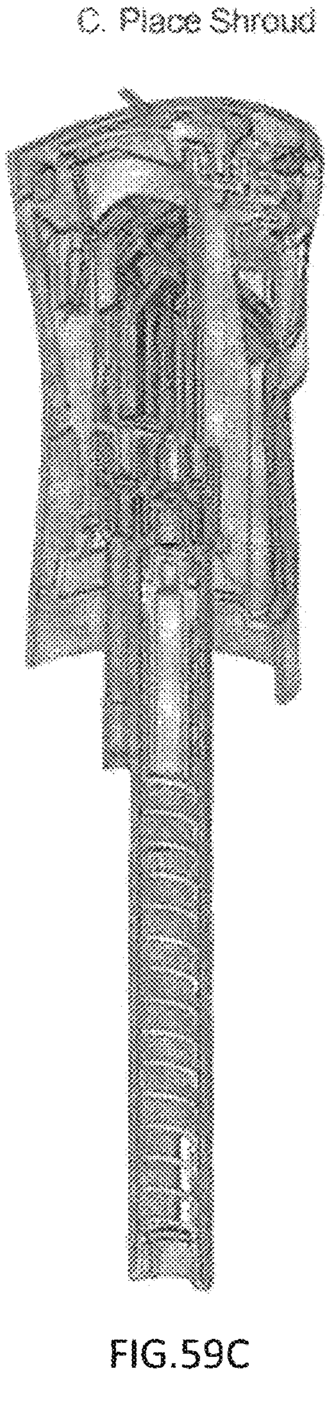
Figure 60A:
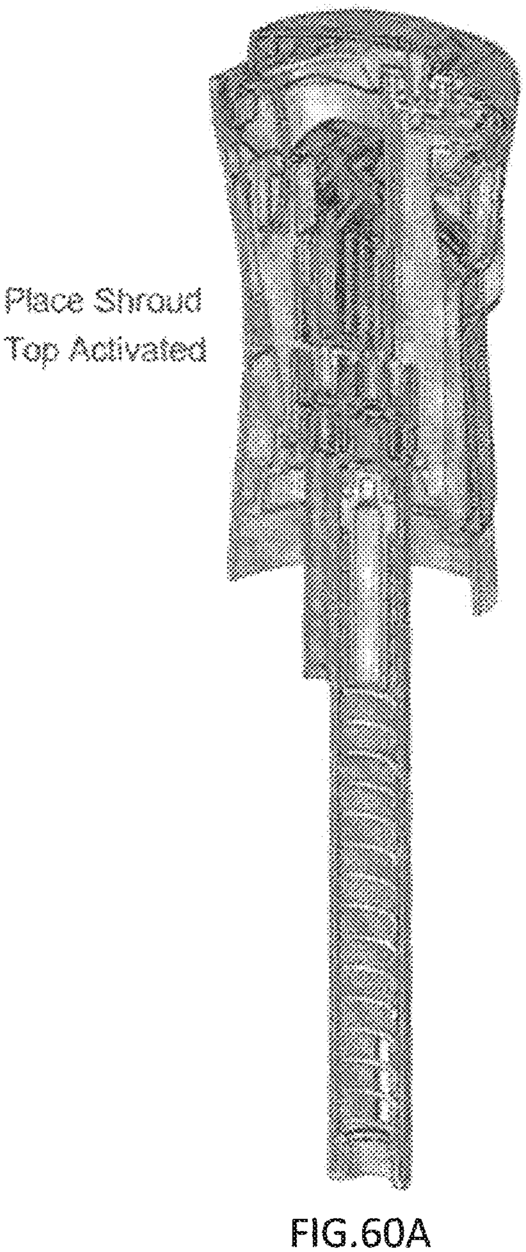
Figure 60B:
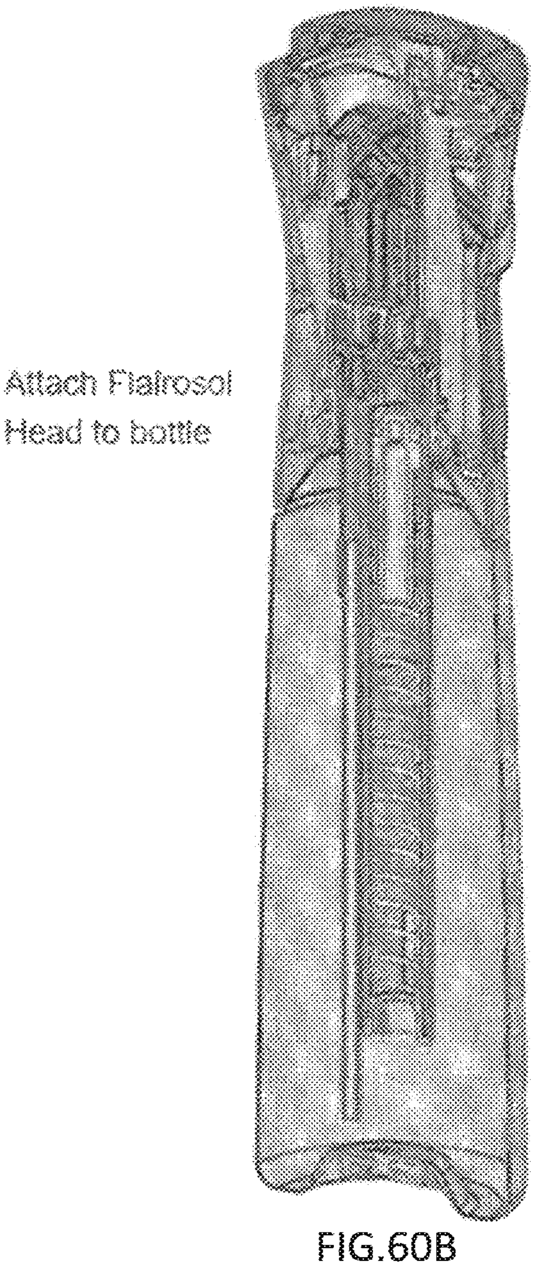

FIGS. 57 through 60B illustrate exemplary steps in assembling an exemplary activated Flairosol embodiment FIG. 57 shows a completely assembled activated Flairosol device, for example. FIG. 58 begins assembly where the assembly procedures are different from those of the metered Flairosol, as described above. As shown in FIG. 58, in the depicted configuration the assembly Is the same except that the length of the reservoir and therefore the length of the metal spring are longer than in the metered Flairosol case. As noted, the activated Flairosol device is designed to store a large amount of liquid in the pressure chamber because liquid is not released unless a user presses on the button and thereby releases the dome lock. With reference to FIGS. 59A through 59C, respectively, after the trigger lock has been affixed, the dome lock is placed on the device with its spring and then the shroud can be placed on the device as noted above. As shown in FIG. 60A the shroud top is attached as described above, and finally the Flairosol dispensing head can be attached to the bottle, as shown in FIG. 60B. This can be done by screwing, bayonet, welding for non-refillable embodiments, or other connection methods.

C. Liquid Seal Embodiments

FIGS. 61A-70, next described, depict aspects of a variant exemplary embodiment according to the present invention, namely a "liquid seal" version of a Flairosol sprayer. The liquid seal Flairosol sprayer is equivalent to the Flairosol sprayers described above, both active and metered, with an additional feature: the addition of various seals to completely isolate the liquid in the pressure reservoir from the metal (or other material) spring which provides the resilient force to the piston in the pressure reservoir. This embodiment will be further described in what follows.

Figure 61C:
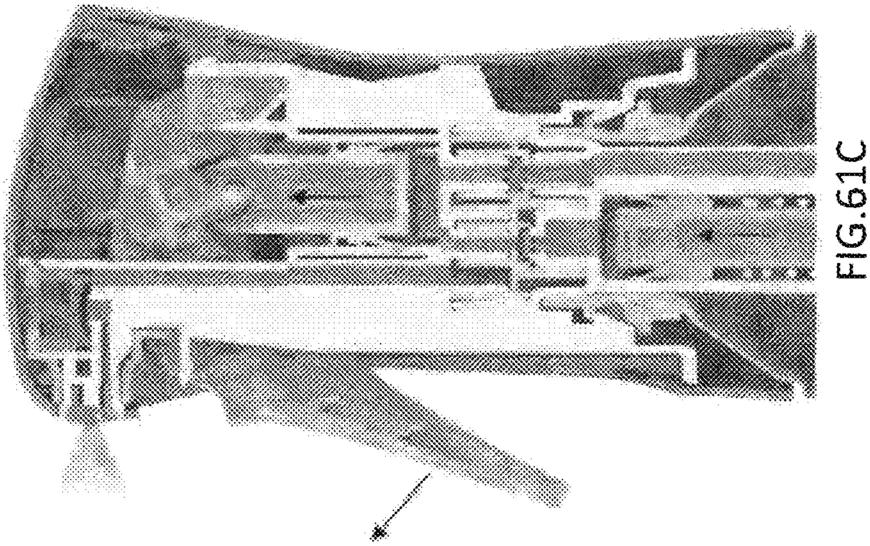
FIGS. 61A through 61C illustrate an alternate “liquid seal” Flairosol sprayer in, respectively, an initial upstroke position, a downstroke configuration, and an upstroke configuration, according to exemplary embodiments of the present invention.
Figure 61B:
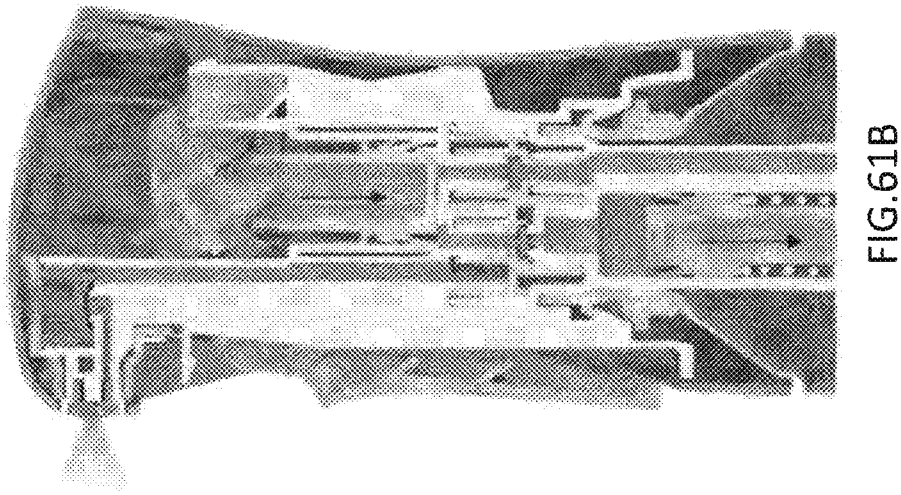
Figure 61A:
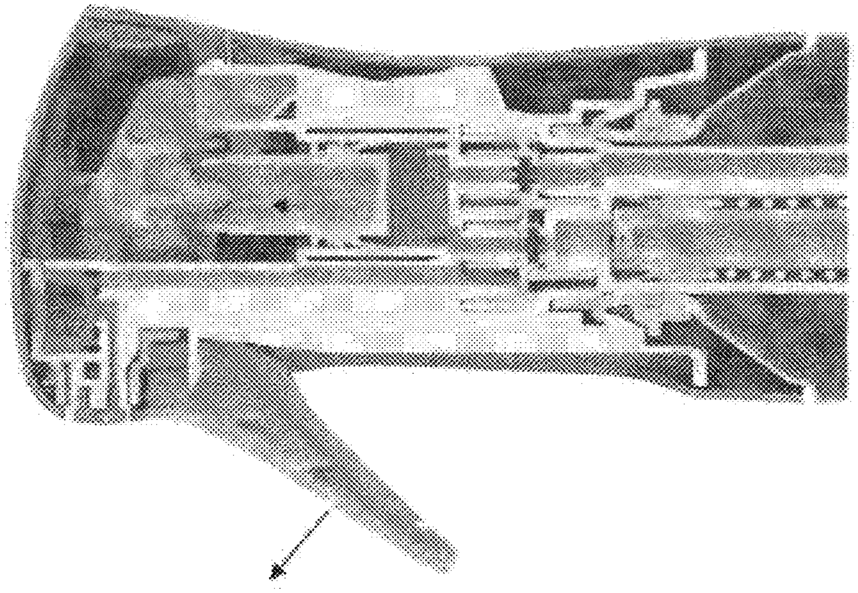

FIGS. 61A through 61C illustrate the liquid seal Flairosol sprayer in, respectively, an initial upstroke position, a downstroke position and a supplemental upstroke position according to exemplary embodiments of the present invention. With reference thereto, FIG. 61A shows the user having released the trigger such that it moves upward under the influence of the interior springs acting upon it, and thus the piston moves upward, beginning to fill the piston chamber with liquid (the liquid is shown in a purple color in the piston chamber at the center of the sprayer head). Also noteworthy in FIG. 61A is that the pressure chamber or bladder provided at the bottom center of FIG. 61A has no fluid in it; therefore the pressure chamber spring is at its maximum extension, holding the pressure chamber piston at the top of the pressure chamber. With reference to FIG. 61B, the user now pushes down on the trigger, causing the piston chamber to expel its contents. As noted above, when this occurs, the piston chamber's contents are pushed into the pressure chamber and also into an outlet channel. As can be seen in FIG. 61B, the pressure chamber has begun to be filled with the purple liquid and, additionally, the outlet channel is also filled with the liquid sufficient pressure to open the dome valve at the top of the sprayer head, causing the liquid to spray out of the device, as shown.

FIG. 61C shows a further upstroke, following the downstroke of FIG. 61B, in which more liquid is drawn from the reservoir into the piston chamber. Because of the pressure in the outlet channel maintained by the pressure chamber, the Flairosol head continues to spray the liquid, as shown. However, as can be seen in FIG. 61C, the pressure piston is now moving upward and therefore the spray will cease once the pressure spring reaches its full extension.

Figure 62A:
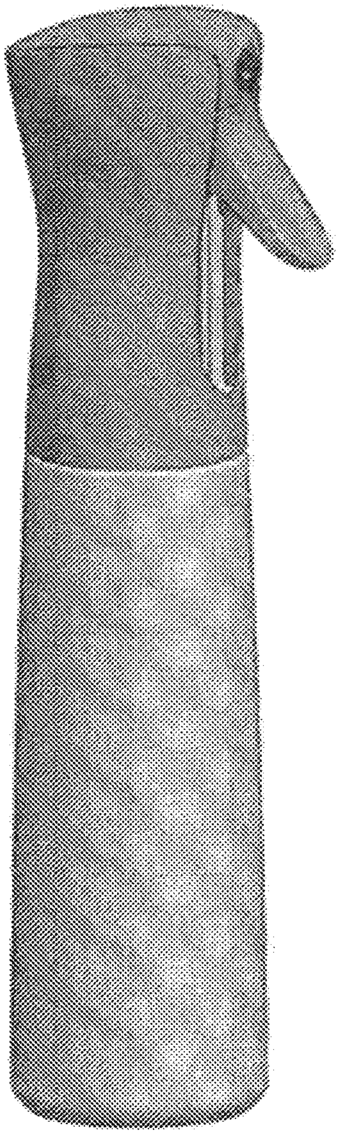
FIGS. 62A and 62B respectively illustrate the “liquid seal” Flairosol embodiment of FIGS. 61A, 61B and 61C with and without a bottle attached to the sprayer head.
Figure 62B:
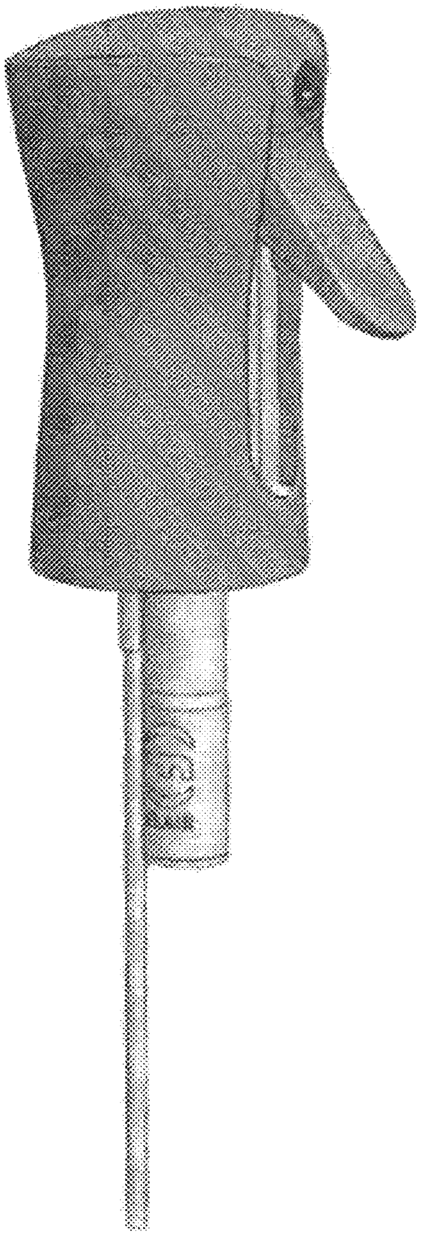

FIG. 62A shows an exemplary liquid seal Flairosol embodiment with attached bottle, and FIG. 62B shows the sprayer head alone with the liquid seal covering (which provides the sealing function, as described below) over the entire pressure chamber. It is noted that the pressure chamber of FIG. 62B is completely enclosed by the seals and therefore never contacts the liquid in the bottle which surrounds it. The only way that liquid can reach the interior of the pressure chamber is by its injection from the piston chamber, as shown in FIG. 61B, and thus the liquid only contacts the seals on top of the pressure pistons, and therefore never comes into contact with the spring or other resilient device providing the resilient force on the pressure chamber.

Figure 63A:
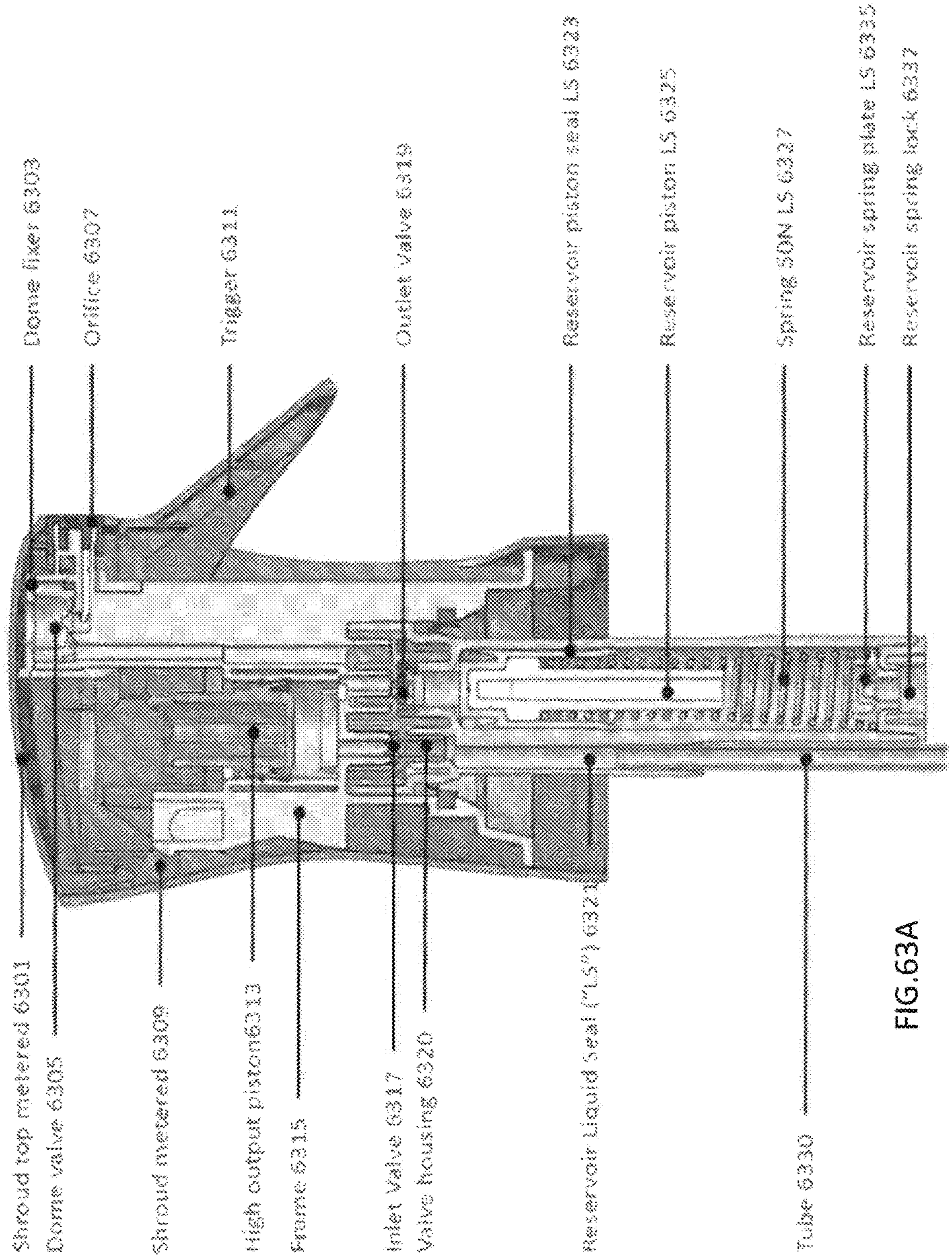
FIG. 63A depicts detail of various elements of the exemplary activated Flairosol device of FIGS. 61A-62B according to exemplary embodiments of the present invention.

FIG. 63 illustrates various component parts of the exemplary Flairosol device of FIGS. 61A-63. With reference to FIG. 63 as shown, there is shown a metered shroud top 6301. This is the type of shroud top that is used for dispensing continuous spray of the liquid as described above (as opposed to an "activated" spray which must be enabled by a user). There is also shown a dome fixer 6303, which holds the dome valve which is the outlet valve for the outlet channel, and the dome valve itself 6305. This dome valve provides pre-compression to the outlet channel, in that the liquid must reach a certain pressure before it will open to allow any dispensing of fluid. Also shown is outlet orifice 6307. Continuing to the left side of the device, there is the metered shroud 6309, the trigger 6311, a high output piston 6313, a frame which holds the interior components 6315, an inlet valve 6317 which controls liquid moving from the pressure reservoir into the piston chamber, valve housing 6320 associated with said inlet valve, and outlet valve 6319 which, of course, controls liquid being expelled from the piston chamber into the reservoir or pressure chamber. Continuing to the bottom portion of the drawing, there is seen a reservoir piston seal of the liquid seal variety (hence the "LS") 6323. This piston seal makes sure that no liquid that has entered the reservoir through the venting holes of the upper portion of the pressure chamber (i.e., above the pressure piston) can reach the spring compartment below. This is further detailed below, with reference to FIG. 70. Additionally, there is a reservoir liquid seal 6321 which is a seal that surrounds the entire pressure chamber as shown in FIG. 62B. Finally, there is shown the reservoir piston itself of the liquid version 6325. This is acted on by the force of spring 6327, for example a 50 Newton spring.

Finally there is shown tube 6330 which draws in liquid from the bottle through the valving and ultimately into the pressure chamber. To hold spring 6327 in place, there is reservoir spring plate LS 6335 and reservoir spring lock 6337. It is noted that in FIG. 63, the term "pressure chamber" is referred to as a "reservoir." These terms are interchangeable herein. However, it should be noted that sometimes the bottle itself can be known as a reservoir because it is the ultimate reservoir of the liquid, not the reservoir of the pressurized liquid. But from the context, it will always be dear what is being referred to by the term "reservoir," which in this case is the pressurized reservoir above the pressure piston.

Figure 64B:
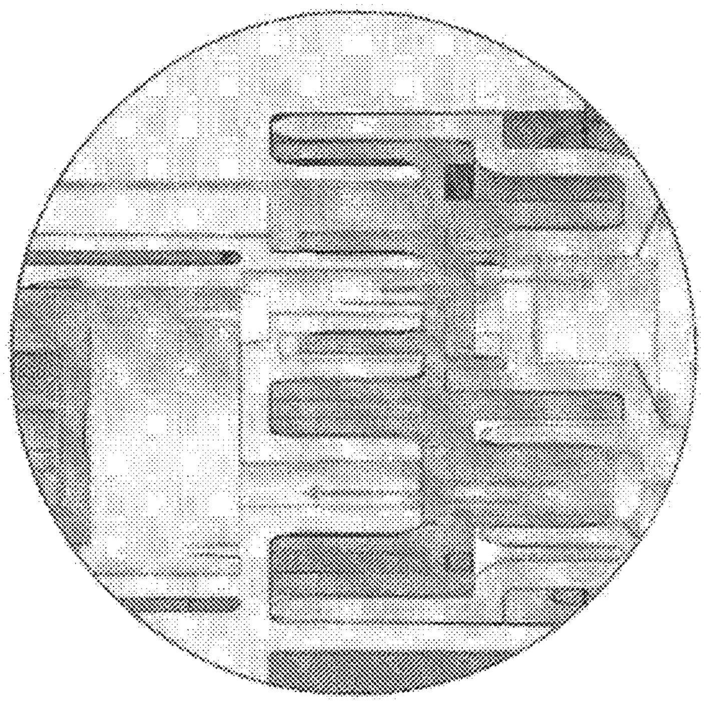
FIGS. 64A and 64B respectively illustrate details of the closure and opening of inlet valves and outlet valves in an exemplary liquid seal Flairosol exemplary embodiment of the present invention.
Figure 64A:
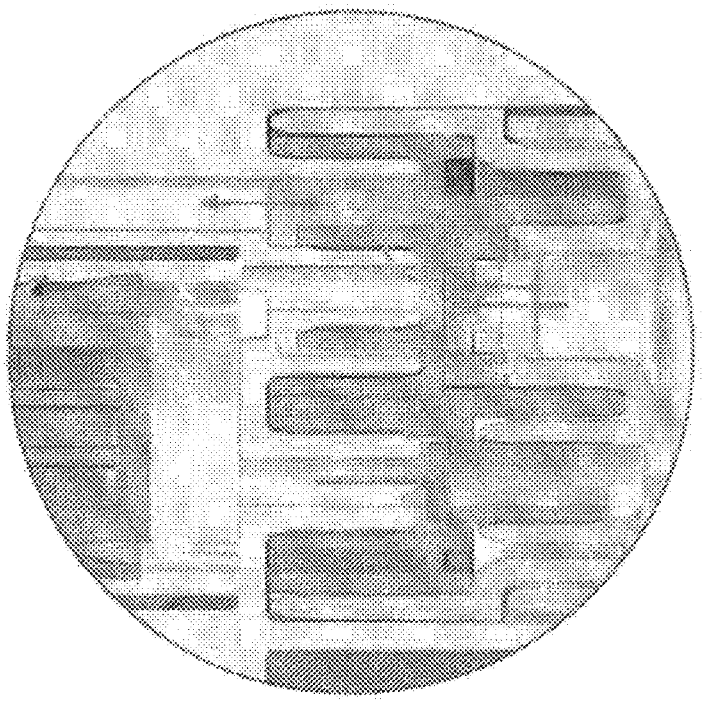

FIGS. 64A and 64B illustrate details of operation of inlet valves and outlet valves in an exemplary liquid seal Flairosol embodiment. With reference to FIG. 64A, it is shown how the inlet valve will close due to the pressure created by the downward motion of the piston in an exemplary downstroke. As can be seen on the left side of FIG. 64A, the red arrow illustrates the inlet valve seated on its lowest position. Similarly, as shown in the right side of FIG. 64A, in an upstroke of the piston (such as is depicted in FIGS. 61A and 61C), the outlet valve will close due to the underpressure that is created by the upward movement of the piston in the piston chamber. This prevents air/liquid from flowing back into the piston bore from the pressure chamber or outlet channel. The air/liquid can flow from the reservoir (i.e., the pressurized liquid reservoir, also referred to herein as the pressure chamber) to the outlet channel by two by-passes, shown by the dotted blue arrow in the far right of the figure. Thus, when the piston moves back up, drawing more liquid into the piston chamber (and then the inlet valve will be open), the underpressure causes the outlet valve to isolate the pressure chamber or reservoir from the piston bore.

With reference to FIG. 64B, at the left side of the figure is shown how the inlet valve will open when the trigger is released by a user, which release begins an upstroke after the user has completed a downstroke, inasmuch as the internal springs loading the trigger push it back up when the user lets go after pushing it down, as shown in FIGS. 61A and 61C. The air flow will lift the valve from its seat (as shown by the red arrow under the valve) and air/liquid can pass through the inlet valve from the bottle (i.e., the main reservoir of unpressurized liquid) into the piston chamber, as shown by the longer and broken blue arrow passing upwards around the valve. As shown at the right side of FIG. 64B, when the trigger is pulled. thus affecting a downstroke, the outlet valve will open, as shown by the red arrow above the outlet valve. The pressure that is created presses the outlet valve downward and air/liquid can pass through into the pressure chamber or reservoir, as shown by the longer and broken blue arrow passing downwards around the valve.

Figure 65A:
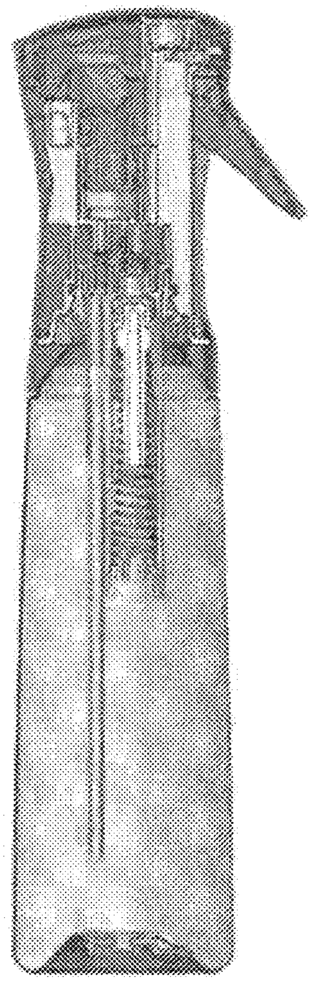
FIGS. 65A and 65B illustrate initial priming of the sprayer device and operation of the various valves during such priming operation according to exemplary embodiments of the present invention.
Figure 65B:
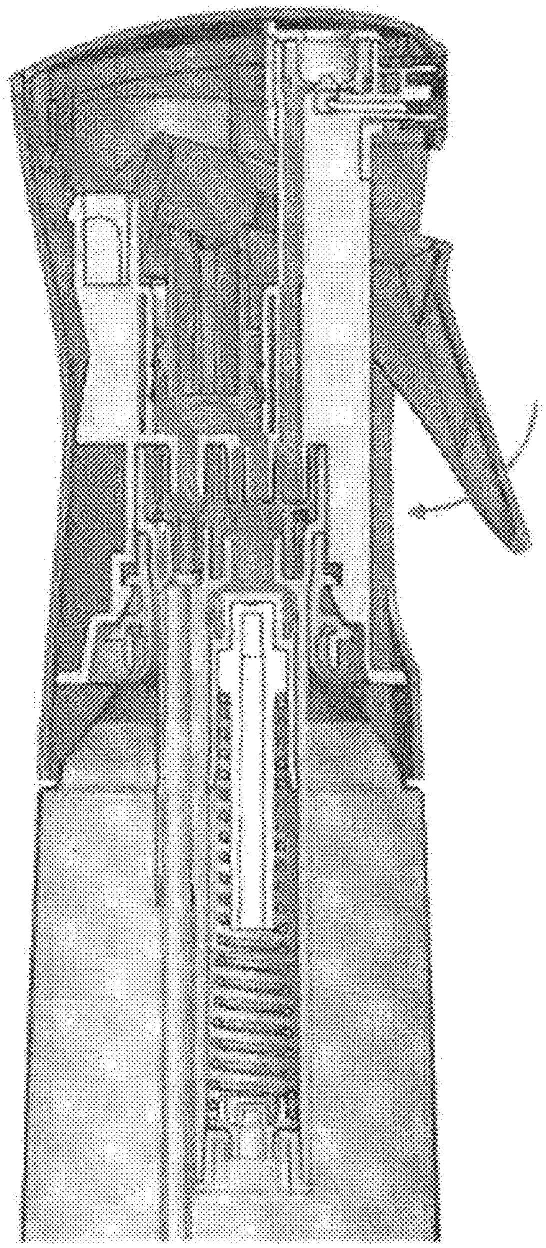

FIGS. 65A-67 illustrate initial priming of tile Flairosol sprayer and operation of the various valves during such priming operation according to exemplary embodiments of the present invention. As shown in FIGS. 65A and 65B, at the first couple of strokes when the device is first used, the system has to be primed. Thus, air inside tile system has to be pumped out and replaced by the liquid to be dispensed. The inlet valve will close due to the downward flow created by the piston stroke. This is shown by the “X” at FIG. 65B (magnified center image). The outlet valve is opened and the air will flow into the reservoir and outlet channel, as shown by the double headed red arrow above the pressure chamber. The dome valve at the top of the outlet channel, however, will, not be opened at this time because the compressed air in the outlet channel does not provide enough pressure to overcome its minimum opening pressure.

Figure 66:
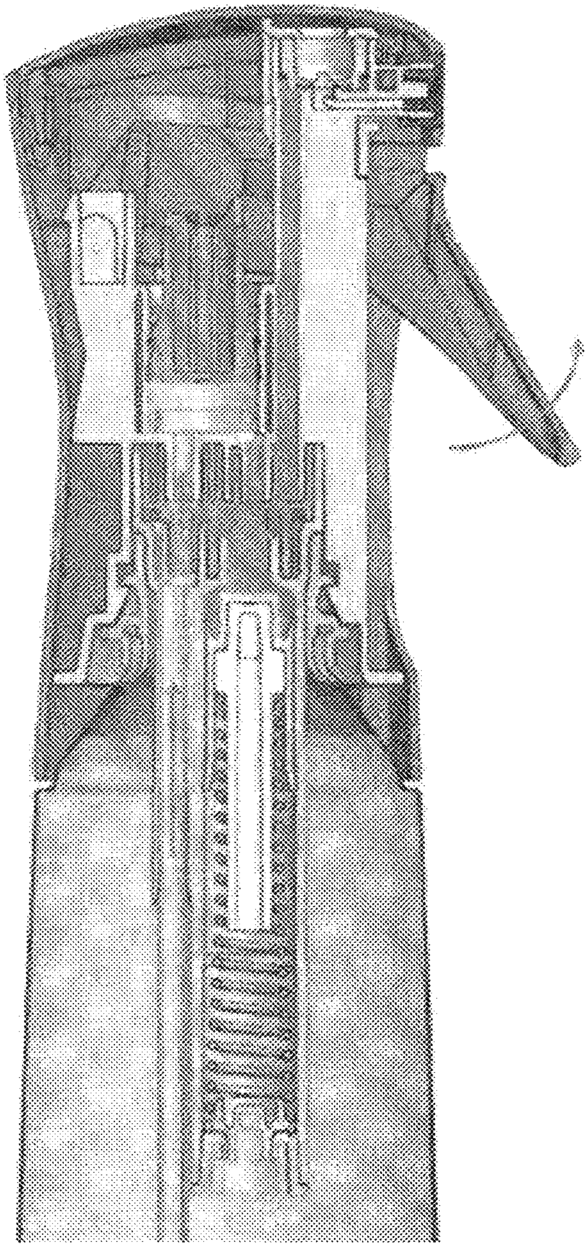
FIGS. 66, 67 and 68 respectively depict an initial upstroke, creating an underpressure that sucks liquid through the inlet valve, followed by a downstroke that forces the sucked in liquid into the reservoir and outlet channel, followed by a second upstroke, respectively, of the liquid seal Flairosol sprayer according to exemplary embodiments of the present invention.

FIG. 66 shows how after the first stroke, the trigger will be forced upwards by the internal springs which are connected to it, thus beginning an upstroke. This will drive the piston upwards which creates an underpressure in the system, opening the inlet valve shown at the left of the figure, and thus drawing liquid up the tube from the bottle, shown by the red arrows pointing upwards in the tube and through the inlet valve, and closing the outlet valve, shown by the red X at the right of the figure over the outlet valve. Thus, the underpressure will open the inlet valve and liquid can be sucked into the piston bore, but the outlet valve closes due to the same underpressure which prevents air from flowing back into the piston bore. As can be seen in FIG. 66, the last of the air is thus being forced out of the system and liquid is beginning to be moved into the system.

Figure 67:
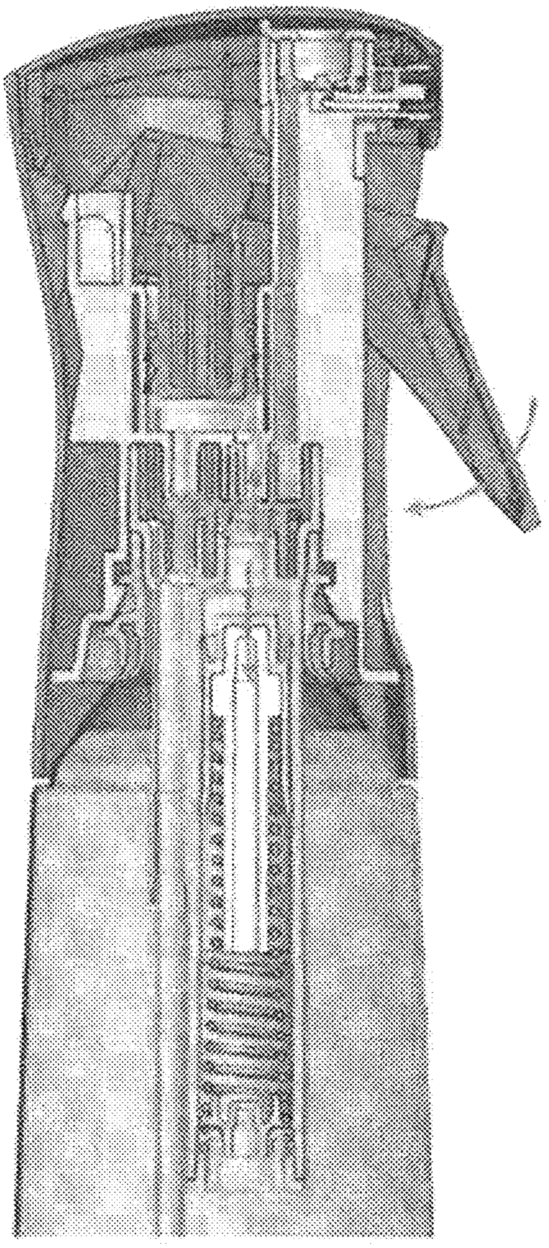

Finally, as shown in FIG. 67, squeezing the trigger again, in a second downstroke, forces the liquid which had been previously sucked into the piston bore, as shown In FIG. 66, into both the reservoir (pressure chamber) and the outlet channel, as shown by the upper and lower single headed red arrows at the right side of FIG. 67. Also seen at the right side center position of FIG. 67 is a double headed red arrow which indicates the opening of the outlet valve from the piston chamber so that such liquid can move both downwards into the pressurized reservoir and upwards into the outlet channel, as described above.

Figure 68:
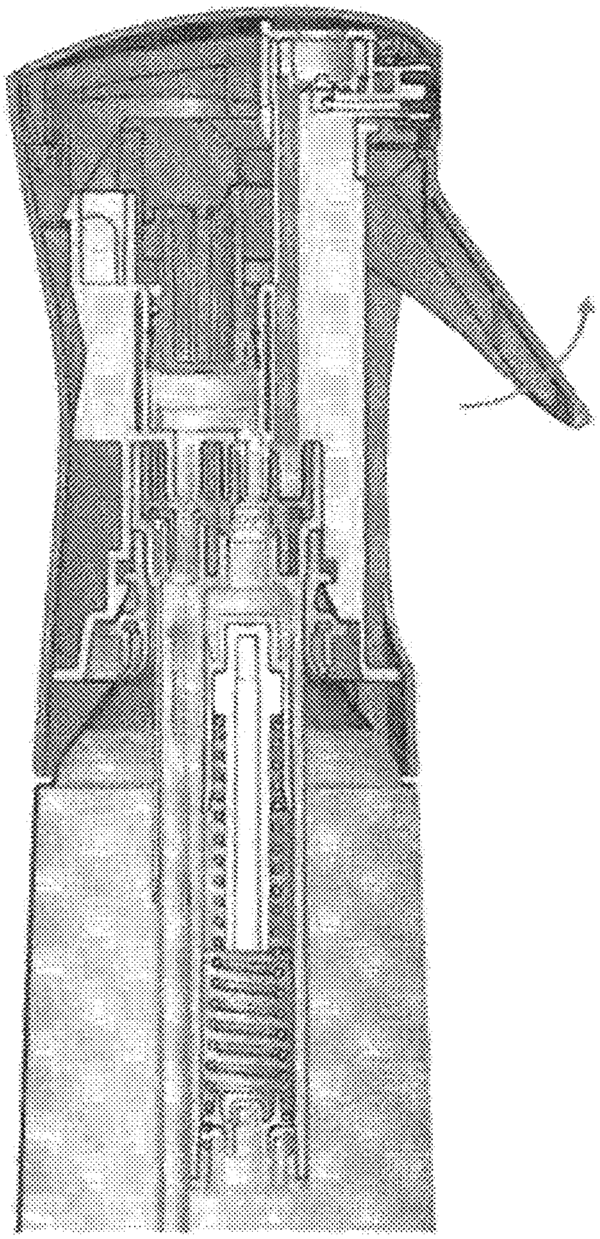

FIG. 68 shows what happens following the situation of FIG. 67 when a user releases the trigger once again, thereby causing a second upstroke which forces the piston upwards and sucks in more liquid through the inlet valve at the left side of FIG. 68, as shown by the upward pointing red arrow. During this operation, the pressurized reservoir is still separated from the piston bore by the closed outlet valve. By looking carefully on the right side of FIG. 68, one can see that the outlet valve is at is uppermost position which it reaches due to the underpressure in the piston bore, as noted above, and thus does not allow any fluid communication through it either downwards or upwards.

Figure 69:
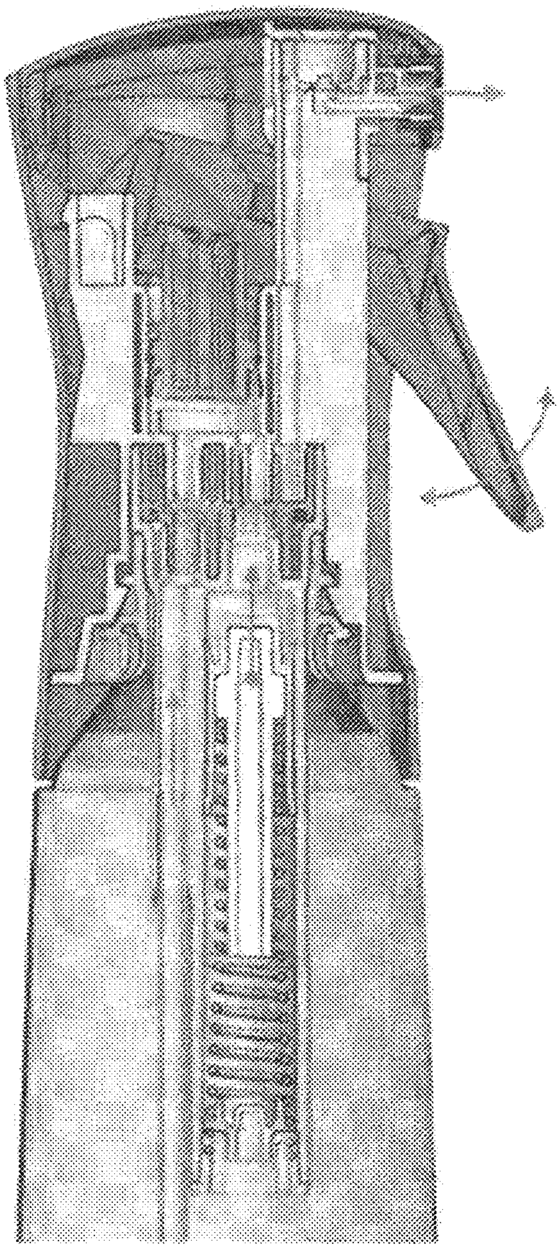
FIG. 69 illustrates an additional activation of the liquid seal Flairosol sprayer trigger by a user, which now increases the pressure sufficiently to cause the liquid to open a dome (output) valve and dispense.

FIG. 69 shows the beginning of spraying, which occurs when a user activates the trigger yet again (i.e., pushes down on it), which forces the reservoir piston (pressure chamber piston) down even farther, thus further compressing the spring or other resilient device (in this description, the term “spring” refers to the functionality, and is not limited to any one physical device, but rather includes any resilient device against which the pressure reservoir can push, thus storing pressurized liquid). Thus, FIG. 69 is analogous to FIG. 67 except that at this point the internal pressure will build up and the dome valve opens. This causes the Flairosol sprayer to start dispensing liquid as shown at the top of FIG. 69. If the trigger will be repeatedly squeezed, the Flairosol device will give a continuous output. This is true as long as the frequency with which the user squeezes the trigger is sufficient to keep up with the dispensing rate of the device. On the other hand, if triggering is stopped by a user, the output will fade and stop once the pressure reservoir or pressure chamber has been fully emptied. Because there is no more trigger activation, there is no more intake of liquid into the piston bore because the device is at u·1e end of its upstroke and is not squeezed yet again.

Alternatively, if the user activates the trigger too quickly, i.e., the frequency of the repeated squeezing is too fast, then the pressure reservoir will be pushed to its maximum downward position, via maximum allowed compression of the spring. This lowest position is determined by the positioning of two or more venting holes at the desired level in the pressure reservoir such that if the piston is pushed to this maximum desired depth, any additional liquid will escape from the pressure reservoir, through the venting holes, into the bottle. This vent hole system vents the excess liquid and prevents the system from being destroyed, which could be the case if a user kept pushing against the pressure of the spring and at some point something would break. More detail on the venting holes is provided in connection with FIG. 70.

Figure 70:
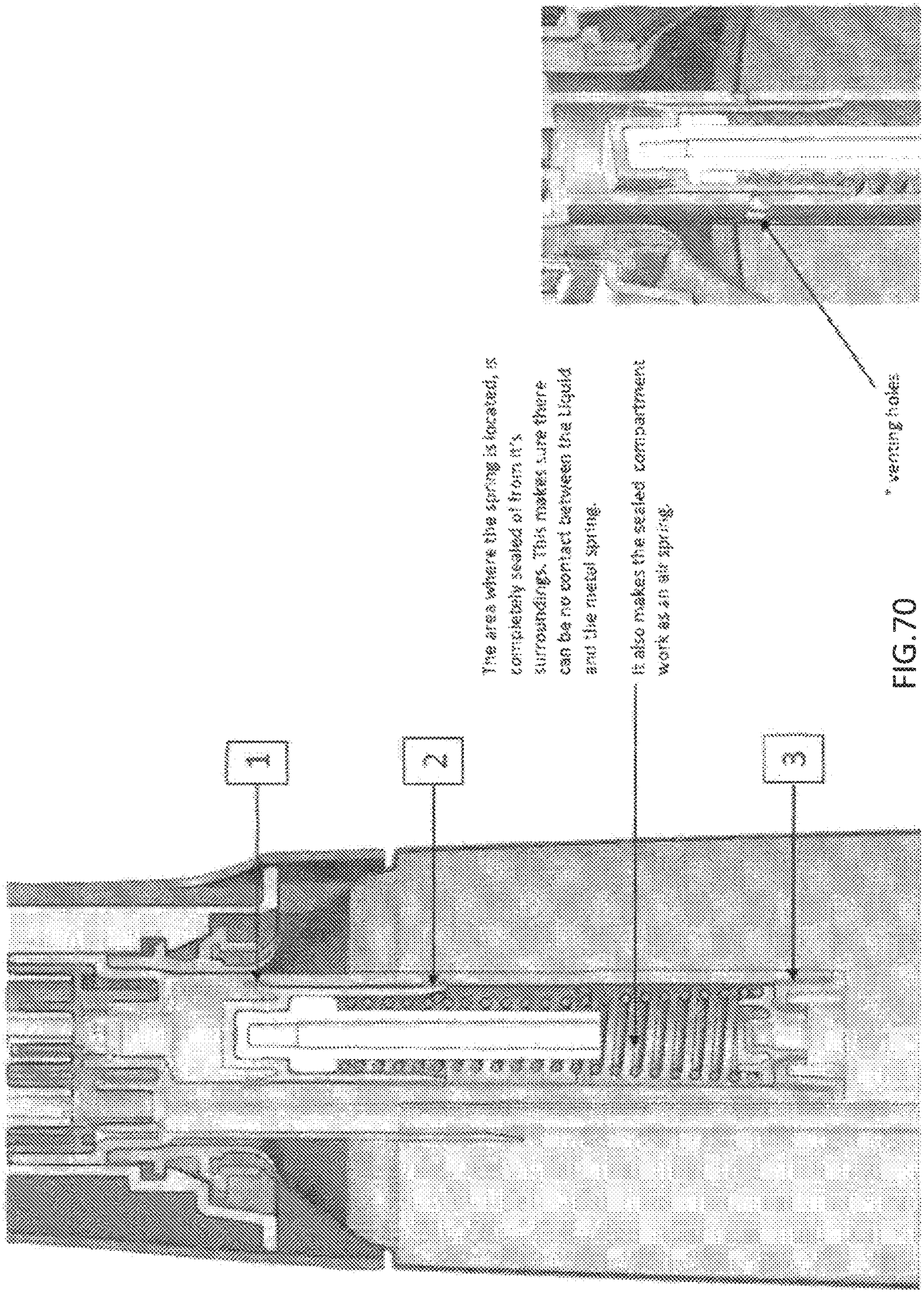
FIG. 70 illustrates various seals used to insulate the liquid circuit of the exemplary liquid seal Flairosol sprayer from the metal spring in the pressure chamber so as to prevent any contact between a liquid and the piston chamber metal spring.

Finally, FIG. 70 illustrates the seals that are critical to the liquid seal version of Flairosol shown in FIGS. 61A-70. With reference to FIG. 70, there are identified three points (labelled 1, 2 and 3) at which these seals are provided. As shown therein, seal 1 seals off the spring compartment from the liquid that is pumped into from above. In other words, seal 1 completely isolates the spring compartment below the pressure piston and the pressure reservoir above the pressure piston. Seal 2 makes sure that no liquid that has entered the reservoir through the venting holes shown in the bottom right of FIG. 70 (and also described above in connection with FIG. 69) can reach the spring compartment and therefore the spring. Finally, seal 3 seals off the bottom of the reservoir chamber such that no liquid from the surrounding bottle can enter through the underside of the pressure piston and contact the spring. As a result, the area where the spring is located Is completely sealed off from its surroundings. This makes sure that there can be no contact between the liquid being dispensed and the metal spring. It also has the result of making the sealed spring compartment work as an air spring; thus, in addition to the spring being compressed, the air that is in the sealed compartment is also being compressed.

It is noted that the liquid seal embodiment of FIGS. 61A-70 allows the dispensing of liquids, such as, for example, foods, cosmetics, medicines, sanitizers, etc., or, for example, other liquids that due to their chemical composition cannot contact the metal or other material being used for the spring in the pressure chamber. Thus, two things follow. First, the liquid remains pure, uncontaminated by any interaction with the metal or other material of the spring, and second, the spring does not become fouled and thus require cleaning due to deposits of liquid, or precipitates from the liquid, or some coating or film resulting from interaction with the liquid, on the spring coils, thus reducing its functionality and its ability to be compressed. In various exemplary embodiments, a liquid seal version of Flairosol may be desired to dispense a variety of liquids that either by law, local regulations or their inherent properties cannot come into contact with metal or other component materials form which spring is made.

It is also noted that in exemplary embodiments of the present Invention, because the Flairosol uses Flair® technology the inner bottle will always be compressed by ambient pressure (or some other displacing medium) so as to shrink as the liquid is sprayed out over time, Thus, as is the case with all Flair® technology, whatever liquid remains in the inner bottle is always available to be drawn by the piston into the piston chamber and then sent into the pressure chamber. No air pockets or gaps develop in the inner Flair® bottle, and there is no need to tie down the inner container at the bottom of the device to prevent crimping. Hence the efficacy of combining Flair® technology with a clean or "green" pressurized liquid spraying functionality akin to an aerosol, as in the various embodiments of the present invention.

What is claimed is:

1. A liquid dispensing device, comprising:

a bladder and a dispensing head, the bladder comprising a bladder intake valve and configured to expand against a resilient force;

the dispensing head comprising:

a piston and a piston chamber;

a channel in fluid communication with the bladder;

a valve provided between the channel and the piston chamber;

an outlet valve; and an outlet channel.

2. The liquid dispensing device of claim 1, further comprising at least one of:

a reservoir containing fluid, said reservoir in fluid communication with said bladder through said bladder intake valve; or a reservoir containing fluid, said reservoir in fluid communication with said bladder through said bladder intake valve, wherein said reservoir comprises an inner bottle within an outer bottle.

3. The liquid dispensing device of claim 2, wherein in a liquid intake operation, the fluid is drawn from the reservoir into the piston chamber, and wherein in a pressurizing operation the fluid is pushed from the piston chamber into the bladder, and wherein in a spraying operation, when the pressure in the channel reaches a minimum value, the fluid sprays out the outlet channel.

4. The liquid dispensing device of claim 1, further comprising an outlet valve lock, and an outlet valve lock release button, wherein if the outlet valve lock is not released, then the outlet valve remains closed, regardless of the pressure in the outlet channel.

5. The liquid dispensing device of claim 1, wherein the resilient force is provided by a resilient means.

6. The liquid dispensing device of claim 1, wherein the volume of the piston chamber is one of (i) greater than the volume of the bladder, (ii) greater than the volume of the bladder by a factor of between 1.5 and 3, and (iii) smaller than the volume of the bladder, such that a continuous spray can occur.

7. The liquid dispensing device of claim 5, wherein the bladder is isolated by means of seals from said resilient means.

8. The liquid dispensing device of claim 1, wherein the outlet valve is a pre-compression valve, configured to open only when the liquid in the outlet channel is equal to or greater than a pre-defined pressure.

9. The liquid dispensing device of claim 8, wherein the outlet valve is a dome valve.

10. The liquid dispensing device of claim 1, further comprising a trigger coupled to the piston, the trigger having a home position where the piston is at a first end of the piston chamber, where the piston chamber has a maximum volume, and an extended position where the piston is at a second position, where the piston chamber has a minimum volume.

11. The liquid dispensing device of claim 10, wherein in an upstroke of the piston a fluid is drawn from a liquid source into the piston chamber, and in a downstroke of the piston the fluid is pushed form the piston chamber into both the bladder and into the outlet channel.

12. The liquid dispensing device of claim 11, wherein the upstroke and the downstroke of the piston are respectively a first upstroke and a first downstroke, and wherein during a second upstroke of the piston that follows the first downstroke, the fluid is pushed from the bladder into the outlet channel under the resilient force.

13. The liquid dispensing device of claim 1, wherein a volume of the bladder is sufficiently large such that it cannot be fully dispensed through the outlet channel during a single downstroke of the piston, and wherein there is an excess volume of the liquid ejected into the bladder during each downstroke.

14. The liquid dispensing device of claim 1, wherein the bladder is configured to accommodate an internal pressure of one of:

from 3-5 bar, from 10-20 bar, or from 500-800 millibar.

* * * * *